United States Patent

Hashimoto et al.

[11] Patent Number: 6,072,526
[45] Date of Patent: *Jun. 6, 2000

[54] IMAGE SENSING DEVICE THAT CAN CORRECT COLORS CORRESPONDING TO SKIN IN A VIDEO SIGNAL

[75] Inventors: Nobuo Hashimoto, Ashiya; Keizou Ochi; Gen Sasaki, both of Takatsuki; Kenji Mizumoto, Osaka; Hiroaki Kubo, Nagaokakyo; Yoshihiko Azuma, Aira-Gun; Takehiro Katoh, Nara; Hiroshi Ootsuka, Sakai, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/887,792

[22] Filed: Jul. 3, 1997

Related U.S. Application Data

[62] Division of application No. 08/208,791, May 9, 1994, which is a continuation of application No. 07/776,173, Oct. 15, 1991, abandoned.

[30] Foreign Application Priority Data

| Oct. 15, 1990 | [JP] | Japan | 2-276646 |
| Oct. 15, 1990 | [JP] | Japan | 2-276647 |
| Oct. 15, 1990 | [JP] | Japan | 2-276648 |
| Jul. 31, 1991 | [JP] | Japan | 3-68297 U |
| Aug. 1, 1991 | [JP] | Japan | 3-216288 |
| Aug. 6, 1991 | [JP] | Japan | 3-222083 |

[51] Int. Cl.$^7$ ................................. H04N 9/73
[52] U.S. Cl. ................... 348/223; 348/649; 348/652
[58] Field of Search ............................. 348/222, 223, 348/228, 229, 225, 226, 649, 650, 652, 653, 647, 719; 358/518, 519, 520, 522, 523, 516; H04N 5/228, 9/73

[56] References Cited

U.S. PATENT DOCUMENTS

| 4,922,279 | 5/1990 | Hamada et al. . | |
| 4,969,045 | 11/1990 | Haruki et al. . | |
| 4,987,482 | 1/1991 | Imai et al. . | |
| 5,043,804 | 8/1991 | Sugiura | 348/226 |
| 5,130,935 | 7/1992 | Takiguchi | 358/518 |
| 5,196,923 | 3/1993 | Ueda et al. | 348/647 |

FOREIGN PATENT DOCUMENTS 399585  4/1991  Japan .

Primary Examiner—Tuan Ho
Attorney, Agent, or Firm—Price Gess & Ubell

[57] ABSTRACT

An automatic exposure control apparatus comprises a skin color extracting circuit for extracting a skin-colored portion from an input video signal and a focus condition detecting circuit for detecting a focus condition of the skin-colored portion. Exposure is controlled based on outputs of the two circuits. That is, when a skin-colored portion is extracted and it is detected that the skin-colored portion is in an in-focus condition, exposure is controlled so as to be appropriate with respect to the skin-colored portion. A skin color correction unit can correct colors corresponding to the skin color from the video signal.

6 Claims, 41 Drawing Sheets

Direction Code

Fig. 20

| Code | Change Point |
|---|---|
| 5 | 0 |
| 5 | 1 |
| 6 | 0 |
| 6 | 1 |
| 7 | 1 |
| 6 | 1 |
| 7 | 0 |
| 7 | 1 |
| 1 | 1 |
| 2 | 1 |
| 1 | 0 |
| 1 | 1 |
| 2 | 1 |
| 3 | 1 |
| 2 | 1 |
| 3 | 1 |
| 4 | 1 |
| 4 | 0 |

12 points

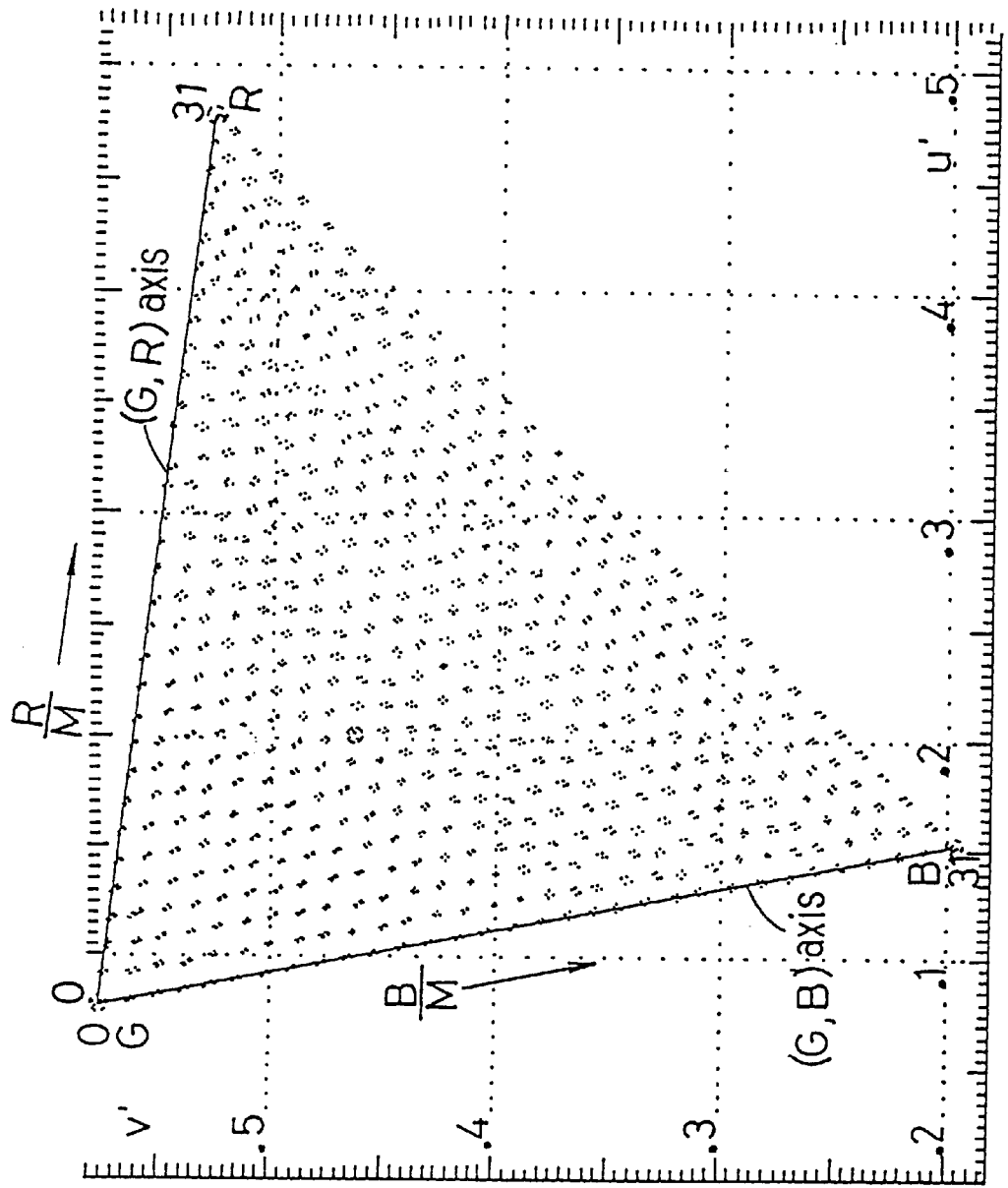

IMAGE SENSING DEVICE THAT CAN CORRECT COLORS CORRESPONDING TO SKIN IN A VIDEO SIGNAL

This is a division of pending U.S. Ser. No. 08/208,791, filed on May 9, 1994, which is a continuation of U.S. Ser. No. 07/776,173, filed on Oct. 15, 1991 (abandoned).

BACKGROUND OF THE INVENTION

1. Field of the Invention

The present invent ion relates to an automatic exposure control apparatus employed for a color video camera, etc.

2. Description of the Prior Art

In FIG. 1, portions other than the portions represented by the numerals 215, 216, 217, 218, 219, 220, 221 and 222 correspond to a prior art. The prior art will be described. Light having passed through a taking lens 201 is directed to an image sensor device 204 such as a CCD, etc. after its light quantity being settled by an iris 202. After amplified by an amplifier 205, a output signal of the image sensor device 204 is detected by a detecting circuit 212. The iris 202 is driven by an iris driving portion 213 so that the level of the detecting output is constant, that is, so that the CCD (sensor device 204) is at an optimal operating point.

After amplified by a variable gain amplifier 206, a signal output from an image sensor device 204 is divided in two directions. One is directed to a color separating circuit 207, where a color signal which is coated with a color filter attached to the image sensor device 204 is separated, and is color-signal-processed at a color signal processing circuit 208 to be converted into color difference signals R-Y and B-Y. The other is directed to a luminance signal processing circuit 210, where a luminance signal component thereof is luminance-signal-processed, and is inputted to an encoder circuit 209. The color difference signals of the former are balanced-modulated by the encoder circuit 209 and added with a luminance signal to be converted into a composite video signal 214. The output of the luminance signal processing circuit is detected by a detecting circuit 211 and returned to the variable amplifier 206 to settle a gain of the variable gain amplifier 206 so that the level of the output of the detecting circuit 211 is constant.

Final level of the video signal is determined by the variable gain amplifier 206. At lower illumination, since the level of a luminance signal is low even if an iris 202 is opened to its maximum value, a gain of the variable gain amplifier 206 is increased so that the level of the luminance signal becomes constant.

As described above, exposure has been conventionally controlled not according to a color signal but by controlling a luminance signal level so as to be constant.

Other than the above-described example, some conventional automatic exposure control apparatuses detect an object position by a difference among luminances or high-frequency components inside and outside of a photometry area within a shooting image plane to automatically follow the photometry area (see Japanese laid-open Patent Application No. H1-120178 and Japanese laid-open Patent Application No. H1-120181).

However, since none of the above-described control apparatuses sets exposure considering what is a main object, an exposure level is sometimes inappropriate particularly when a person is a main object.

When exposure of a video camera is manually set, it is well-known that a desirable reproduction is obtained if exposure is set: (1) so that a signal level of a highlighted portion in an image plane is 100IRE (Institute of Radio Engineers); and (2) so that a signal level of a color of person's skin is between 55IRE to 75IRE.

As described above, an appropriate exposure level differs according to whether a person is a main object or not. Hence, with the conventional exposure controlling method, a signal level of a person's skin is not always appropriate even if a luminance signal level in an image plane is constant, particularly when a person is backlit or a when the background is dark and a person is highlighted.

In order to obtain an appropriate exposure level when a person is a main object, it is considered that a skin-colored portion is extracted to make a signal level thereof constant.

However, even if there is a skin-colored portion, the skin-colored portion is not always a main object. Consequently, although the skin-colored portion is adequately exposed, the entire image plane is sometimes inadequately exposed, for example, when a person shot is located in a corner, when a person passes across an image plane, or when there are a plurality of persons.

Moreover, even if a skin color is detected in an image plane, an appropriate exposure level differs according to whether the person is a main object or not.

SUMMARY OF THE INVENTION

An object of the present invention is to provide an automatic exposure control apparatus where in order to obtain an appropriate exposure level, a skin color is detected, and when the video camera is in focus on the skin-colored portion, exposure is controlled determining that a person is a main object and when the video camera is not in focus on the skin-colored portion or there is no skin-colored portion, exposure is controlled so that the landscape is adequately exposed.

To achieve the above-described object, the present invention is provided with: skin color extracting means for extracting a skin-colored portion from an input video signal; focus condition detecting means for detecting a focus condition of the skin-colored portion; exposure controlling means for controlling exposure so as to be appropriate with respect to the skin-colored portion based on outputs of said two means when a skin-colored portion is detected and it is detected that the skin-colored portion is in an in-focus condition.

BRIEF DESCRIPTION OF THE DRAWINGS

This and other objects and features of this invention will become clear from the following description taken in conjunction with the preferred embodiments with reference to the accompanied drawings in which:

FIGS. 18, 19 and 20 are explanatory views of the person detection routine;

FIG. 36 is CIE1976UCS chromaticity diagram;

DETAILED DESCRIPTION OF THE PREFERRED EMBODIMENT

Figure 1:
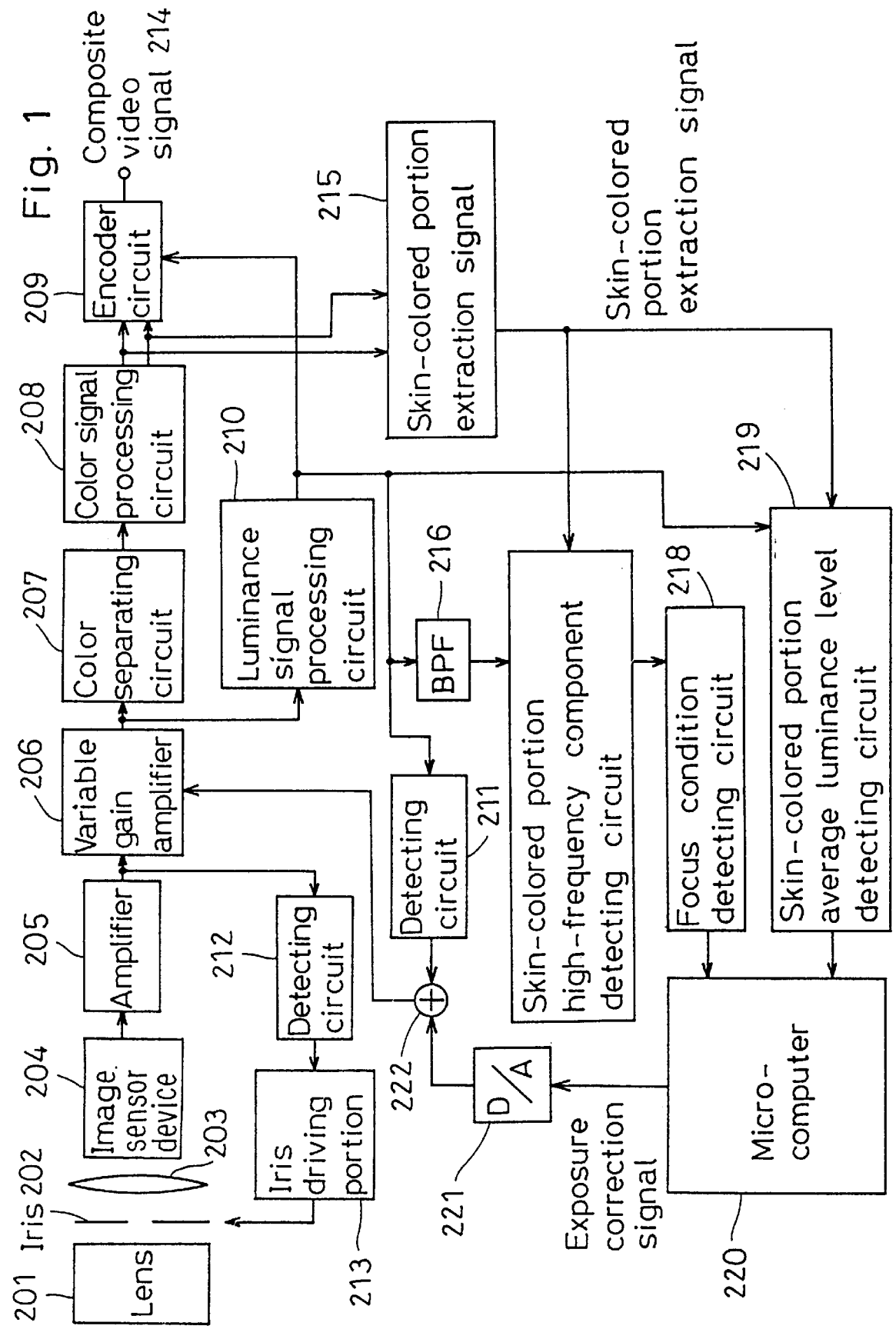
FIG. 1 is a block diagram of a first embodiment of the present invention.

FIG. 1 is a block diagram of a video camera which is a first embodiment of the present invention. After its light quantity being settled by an iris 202, light having passed through a taking lens 201 is directed to an image sensor device 204 such as a CCD, etc. through a lens 203 to be formed into an image thereon. After amplified by an amplifier 205, a signal output of the image sensor device 204 is detected by a detecting circuit 212. The iris 202 is driven by a driving portion 213 so that the level of the detecting output is constant, that is, so that the CCD is at an optimal operating point. If the image sensor device 204 has an electronic shutter function, shutter speed may be controlled.

After amplified by a variable gain amplifier 206, a signal output from an image sensor device 204 is divided in two directions. One is directed to a color separating circuit 207, where a color signal which is coated with a color filter attached to the image sensor device 204 is separated, and is color-signal-processed at a color signal processing circuit 208 to be converted into color difference signals R-Y and B-Y. The other is directed to a luminance signal processing circuit 210, where a luminance signal component thereof is luminance-signal-processed, and is inputted to an encoder circuit 209. The color difference signals of the former are balanced-modulated by the encoder circuit 209 and combined with a luminance signal to be converted into a composite video signal 214. The luminance signal process output is detected by a detecting circuit 211 and returned to the variable amplifier 206 to settle a gain of the variable gain amplifier so that the level of the output is constant.

In addition to the above portions, this video camera is provided with a skin-colored portion extracting circuit 215 for extracting a skin-colored portion from an input video signal. It is also provided with a band pass filter 216, a skin-colored portion high-frequency component detecting circuit 217 and a focus condition detecting circuit 218 for detecting a focus condition of a skin-colored portion. Moreover, for settling exposure based on outputs of the above-described two circuits 215 and 218, a skin-colored portion average luminance level detecting circuit 219 and a microcomputer 220 are provided. An output of the microcomputer 220 is provided to an adder 222 through a D/A (digital to analog) converter 221 together with an output of a detecting circuit 211, and by an output of the mixer 222, a variable gain amplifier 206 is feedback-controlled.

An operation of this video camera will be described. After a color signal processing by the color signal processing circuit 208, a skin-colored portion is extracted from the video signal by the skin-colored portion extracting circuit 215. The skin-colored portion is extracted, for example, by designing the level of an output of the skin-colored portion extracting circuit 215 so as to be high when a "ratio" and "values" of color difference signals R-Y and B-Y are within predetermined ranges, respectively. Of the luminance signals from a luminance signal processing circuit 210, a high-frequency component is extracted by the band pass filter 216. The skin-colored portion high-frequency component detecting circuit 217 detects a high-frequency component of the skin-colored portion from the high-frequency component of the luminance signal in response to the skin-colored portion extraction signal. When a skin-colored portion is within an angle of view and the video camera is in focus on the skin-colored portion, a large amount of high-frequency components are extracted. When there are no skin-colored portions, or when the video camera is not in focus on the skin-colored portion, no high-frequency components are extracted. The focus condition detecting circuit 218 detects a focus condition by determining whether or not the high-frequency components have a predetermined level, and transmits a signal to the microcomputer 220. The skia-colored portion average luminance level detecting circuit 219 receives a skin-colored portion extraction signal and detects an average of the luminance signal level of the skin-colored portion. The detected level is converted into a digital format and is transmitted to the microcomputer 220.

When a focus condition detection signal output of the skin-colored portion represents an in-focus condition, the microcomputer 220 determines whether or not an average luminance level of the skin-colored portion on which the video camera is in focus is proper. An exposure correction signal is outputted based on a result of the determination. Added with an output of the detecting circuit 211, the exposure correction signal feedback-controls the variable gain amplifier 206 to correct exposure. For example, when a luminance level of a skin-colored portion is between 55IRE and 75IRE, it is determined that the exposure value is proper, and when it is equal to or lower 55IRE, an exposure _correction signal is outputted so that a luminance level of the skin colored portion becomes higher than 55IRE. When a luminance level of the skin-colored portion is equal to or higher than 75IRE, an exposure correction signal is outputted so that the level becomes lower than 75IRE. Thus, when the video camera is in focus on the skin-colored portion, since exposure is controlled so that a luminance level of a skin-colored portion is proper, a proper exposure is obtained.

On the other hand, when the video camera is not in focus on a skin-colored portion, it being determined that a landscape is a main object, exposure is controlled by a normal feedback circuit so that the landscape is properly exposed without exposure level being corrected.

Figure 2:
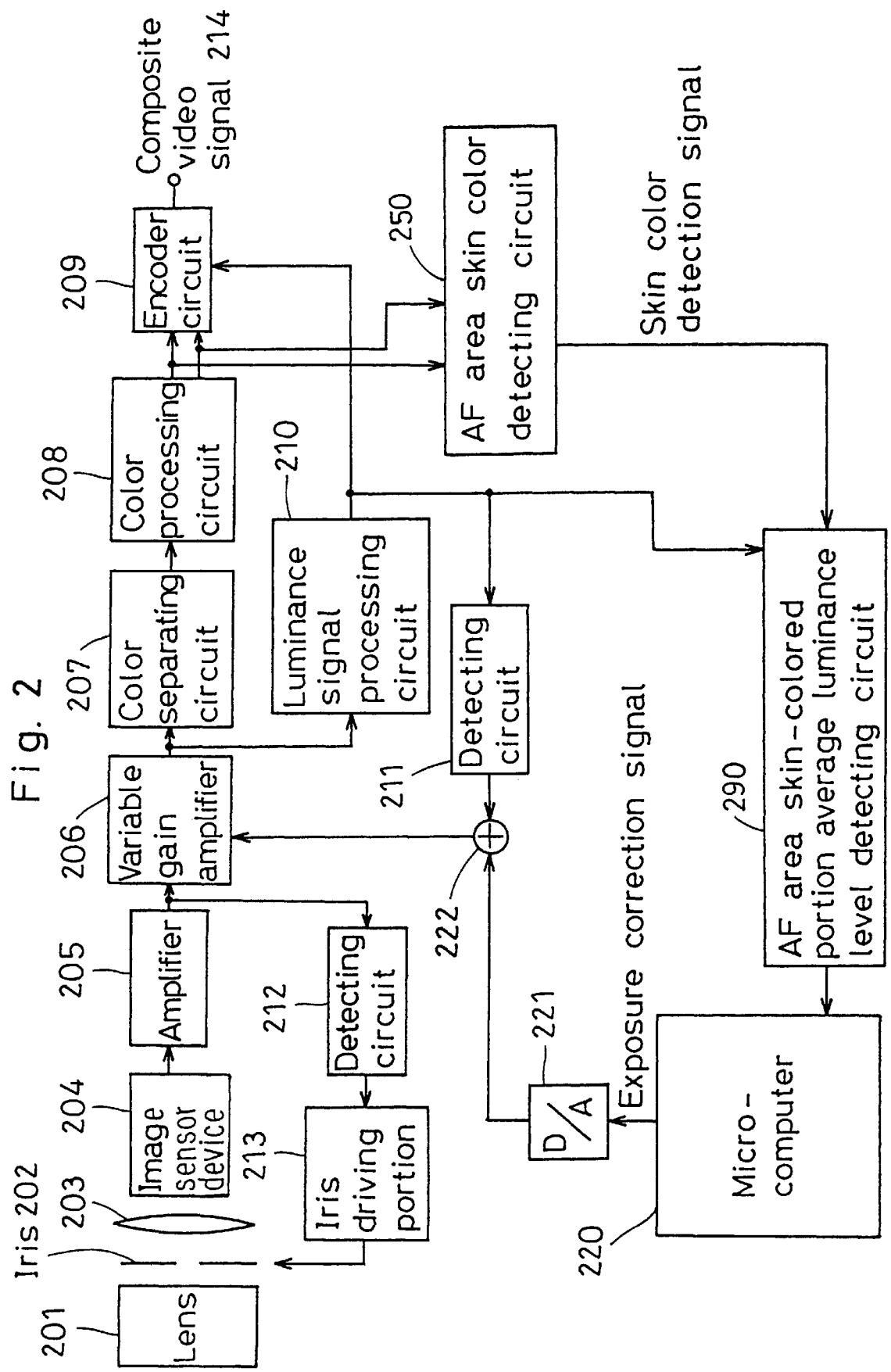
FIG. 2 is a block diagram of a second embodiment of the present invention.

FIG. 2 shows another embodiment. In this embodiment, an AF area skin color detecting circuit 250 and an AF area skin-colored portion average luminance level detecting circuit 290 are provided. The AF area skin color detecting circuit 250 receives a signal from the color signal processing circuit 208 and detects whether or not the color of an object in an AF area is skin color. The skin color detection signal outputted by the circuit 250 is transmitted to the AF skin-colored portion level detecting circuit 290. An output of the circuit 290 is provided to the microcomputer 220.

In this embodiment, it is determined that the user intends to shoot (take) a person when the color of an object Ain an AF area ia skin color. Hence, exposure is controlled so that the skin-colored portion is properly exposed when a skin color detection signal is outputted. Moreover, when no skin-colored portions are detected in an AF area, it is not required to correct exposure level.

Many variations of the above-mentioned embodiments are possible. For example, instead of correcting exposure level by the variable gain amplifier 206 as described above, exposure level may be corrected by controlling aperture value or time value or by controlling both.

Figure 3:
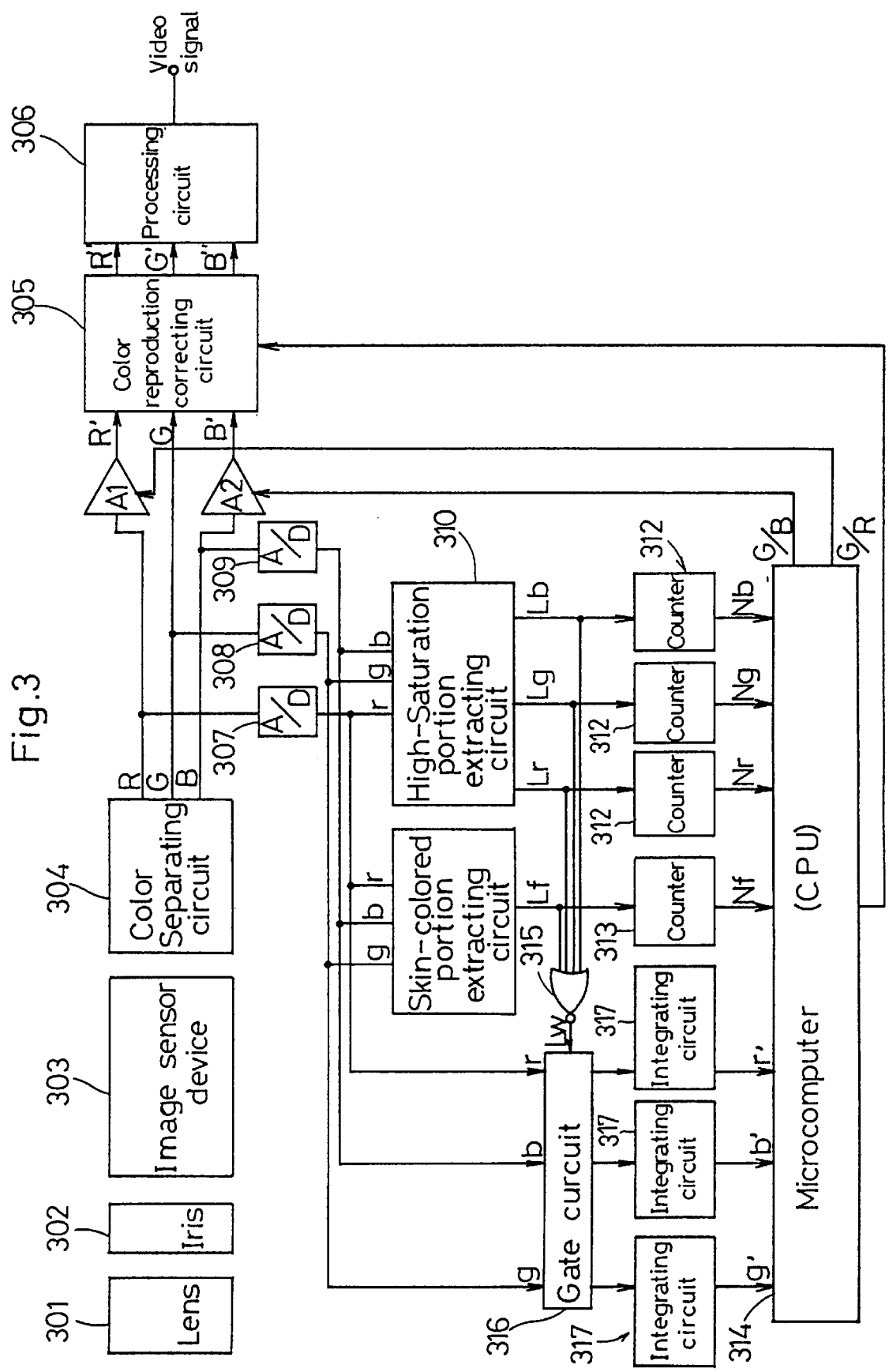
FIG. 3 is a block diagram of a third embodiment of the present invention.

FIG. 3 is a block diagram of a video camera which is a third embodiment of the present invention.

This video camera is provided with a taking lens 301, an iris 302, an image sensor device 303 consisting of CCD (charge coupled device), etc., a color separating circuit 304 for separating input video signals into R, (red) G (green) and B (blue) signals, a color reproduction correcting circuit 305 for correcting color signals to change color reproduction, and a processing circuit 306. Further, this video camera is provided with A/D (analog to digital) converters 307, 308 and 309, a high-saturation portion extracting circuit 310, a skin-colored portion extracting circuit 311, counters 312 and 313, and a microcomputer (CPU (central processing unit)) 314. Moreover, for white balance adjustment, it is provided with a NOR circuit 315, a gate circuit 316, and integrating circuits 317.

In this embodiment, a video output which has passed through the lens 301 and the iris 302 to be formed into an image on the image sensor device 303 is converted into color signals R, G and B at the color separating circuit 304. Although the signals are the signals R, G and B in this embodiment, they may be signals Y, R and B. Each of these color signals is A/D-converted (the A/D-converted signals will be referred to as signals r, g and b), and whether or not the level of each signal is equal to or higher than a predetermined signal level is determined at the high-saturation portion extracting circuit 310. Signals Lr, Lg and Lb which are results of the above determination become "H" at a high saturation, and are counted by the counters 312. Since the counters 312 are reset every field period, a count value of each of the signals r, g and b for one image plane is stored in the counters 312. This value corresponds to an area of the high-saturation portion.

Similarly at the skin-colored portion extracting circuit 311, a signal Lf which is a result of the above determination becomes "H" when a ratio of the signal r to the signal g to the signal b is a ratio which corresponds to skin color, and the signal Lf is counted by the counter 313.

On the other hand, corresponding to a portion which is nearly white, a signal Lw which is "H" is obtained from a I NOR circuit 315 which receives the signals Lf, Lr, Lg and Lb. When the signal Lw is "H", the gate circuit 316 opens to output the signals g, r and b. These signals g, r and b are entered into the integrating circuits 317 which integrate digital data of the signals g, r and b. The integrating circuits 317, which are reset every field a period, output integration values g', r' and b', respectively.

The CPU 314 receives, every field period just before the counters are reset, an output of each of the counters 312, 313 and the integrating circuits 317, that is, count values Nr, Ng, Nb corresponding to areas of a high-saturation portion and a skin-colored portion of each primary color and the integration values 'r, 'g and 'b of the levels of the signals r, g and b of a portion which is nearly white.

At the CPU 314, first, a white balance signal is obtained from the integration values 'r, 'g and 'b of the signals r, g and b. That is, the CPU 314 calculates g/b and g/r, and from these data, it outputs predetermined white-balance-adjusted data GIB and G/R. According to the outputs, variable gain amplifiers A1 and A2 which are inserted into R and B signal input lines of the color reproduction correcting circuit 305 are gain-controlled. Thus, the gains of signals R', G and B' inputted to the color reproduction correcting circuit 305 are nearly equal to one another. As described above, with respect to a portion which is nearly white, a ratio of the signal R to the signal G to the signal B is controlled so as to be equal. When there are no portions which are nearly white in an image plane, the levels of the signals GIB and G/R become predetermined levels, and the gains of the variable gain amplifiers A1 and A2 become predetermined gains.

Moreover, by determining from the count values Nr, Ng, Nb and Nf whether or not there are many high-saturation portions or whether or not there are many skin-colored portions, the CPU 314 outputs data for correcting color reproduction to the color reproduction correcting circuit 305. This process will be described. The CPU 314 determines a color distribution in an image plane from the count values Nr, Ng and Nb of a high-saturation portion. For example, when the count value Ng is higher than a predetermined value and the count values Nr and Nb are lower than the predetermined value, the CPU determines that there are many green portions in the image plane. Moreover, when the count values Nr and Nb are higher than the predetermined value and the count value Ng is lower than the predetermined value, the CPU determines that there are many yellow portions in the image plane. Thus, when there are many portions of specific color in an image plane, a problem is arisen that white balance is deteriorated by the specific color and that a color of a person' skin is not naturally reproduced.

To solve this problem, when an area of a skin-colored portion obtained from the count value Nf of the skin-colored portion is equal to or larger than a predetermined value, it being determined that the skin-colored portion is affected, skin-colored portion correction is made. That is, a high-saturation portion is corrected so as to be more vivid and the skin-colored portion which is influenced by the high-saturation portion is corrected so that the influence of the a high-saturation portion is removed.

Figure 5:
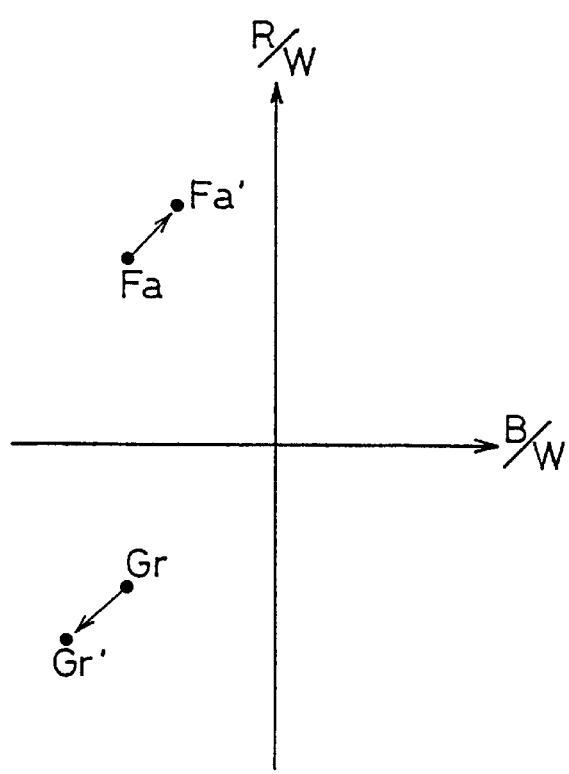
FIGS. 5 and 6 are explanatory views of effects by a conversion of chromaticity coordinates according to the third embodiment.

FIG. 5 shows chromaticity coordinates for explaining the above-described correction. In the figure, W=R+G+B and Gr is a chromaticity point of green. When it is assumed that there are many green portions such as leaves and that a person is greenish because of an influence of the green portion, the chromaticity point Gr of green is converted into a chromaticity point Gr' of more vivid green as shown in the figure. On the other hand, a chromaticity point Fa of skin color is converted into a chromaticity point Fa' of more desirable skin color.

The CPU 314 reads out data for converting chromaticity points from a memory provided in the CPU 314 as predetermined data, and transfers them as correction data for the color reproduction correcting circuit 305. In the color reproduction correcting circuit 305, the input signals R', G and B' are converted into signals R", G' and B". The signals R", G' and B" are gamma-, or matrix-processed in the processing circuit 306 to be converted into video signals.

Figure 4:
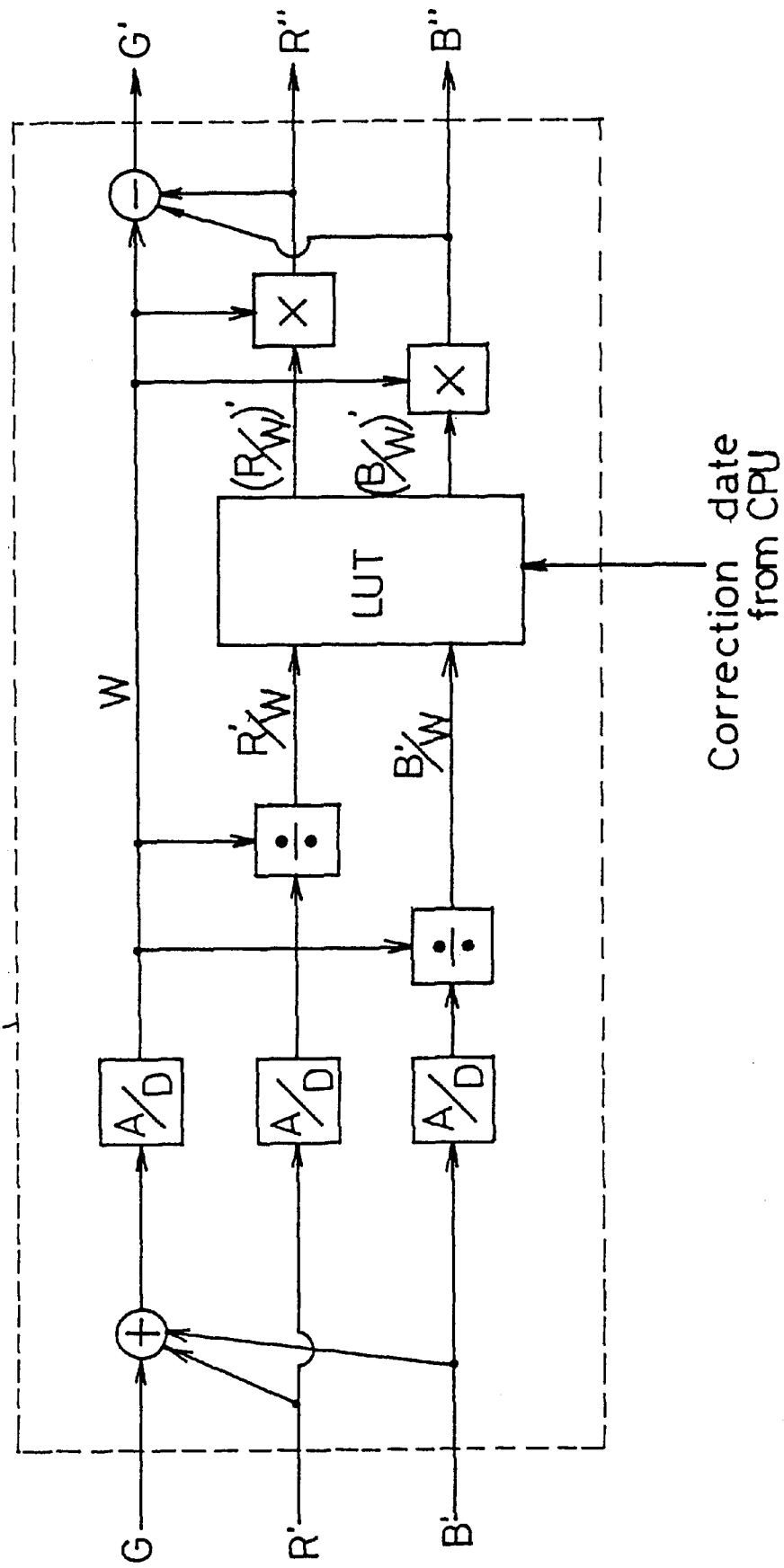
FIG. 4 shows a specific example of a color reproduction correcting apparatus of the imaging apparatus shown in FIG. 3.

FIG. 4 shows a specific example of the color reproduction correcting circuit 305. In the color reproduction correcting circuit 305, the inputted signals R', G and B' are added to be converted into a signal W. After A/D-converted, the signal W. and the signals R' and B' are divided to be converted into R'/W and B'/W signals. At a look up table (LUT) consisting of a RAM (random access memory), chromaticity points are converted based on the correction data from the CPU 314. The (R/W)' and (B/W)' signals obtained by the conversion is inverted to the signals G', R" and B".

Figure 6:
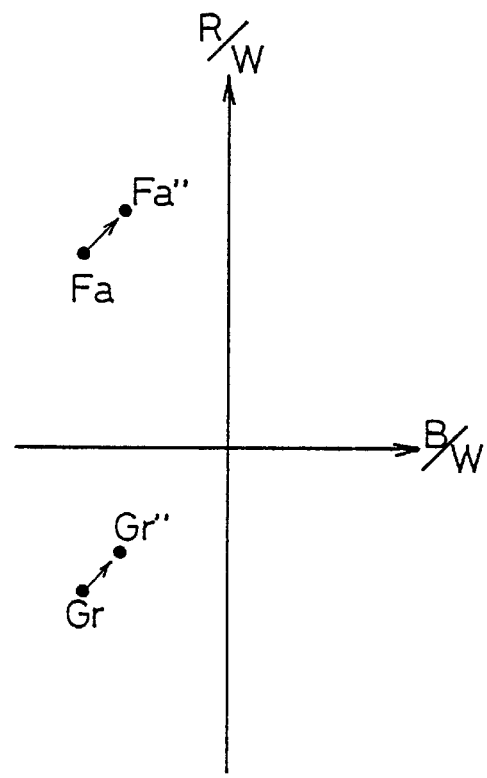

FIG. 6 an example of color reproduction in a case where shooting is performed under the above-described condition by a conventional TTLWB (through the lens white balance) method. The TTLWB method has an entire image plane averaging method and a white portion extracting method. In this case, since the entire image plane is greenish because of reflected light of leaves, etc., the chromaticity points are moved so that the green in the entire image plane is lightened, that is, in a direction shown by the arrows in either method. In the white portion extracting method, white balance correction is stopped when there are no white portions. In such case, the image plane remains greenish. The skin color becomes more natural as the green in the entire image plane is lightened. However, even the green of the leaves is lightened, so that vividness is not reproduced.

On the contrary, according to the present invention, since correction is made so that a more desirable color reproduction is obtained according to a color distribution in an image plane as described above, when a person against green trees is shot, the skin of a person is naturally, and green of trees is vividly reproduced.

Figure 7:
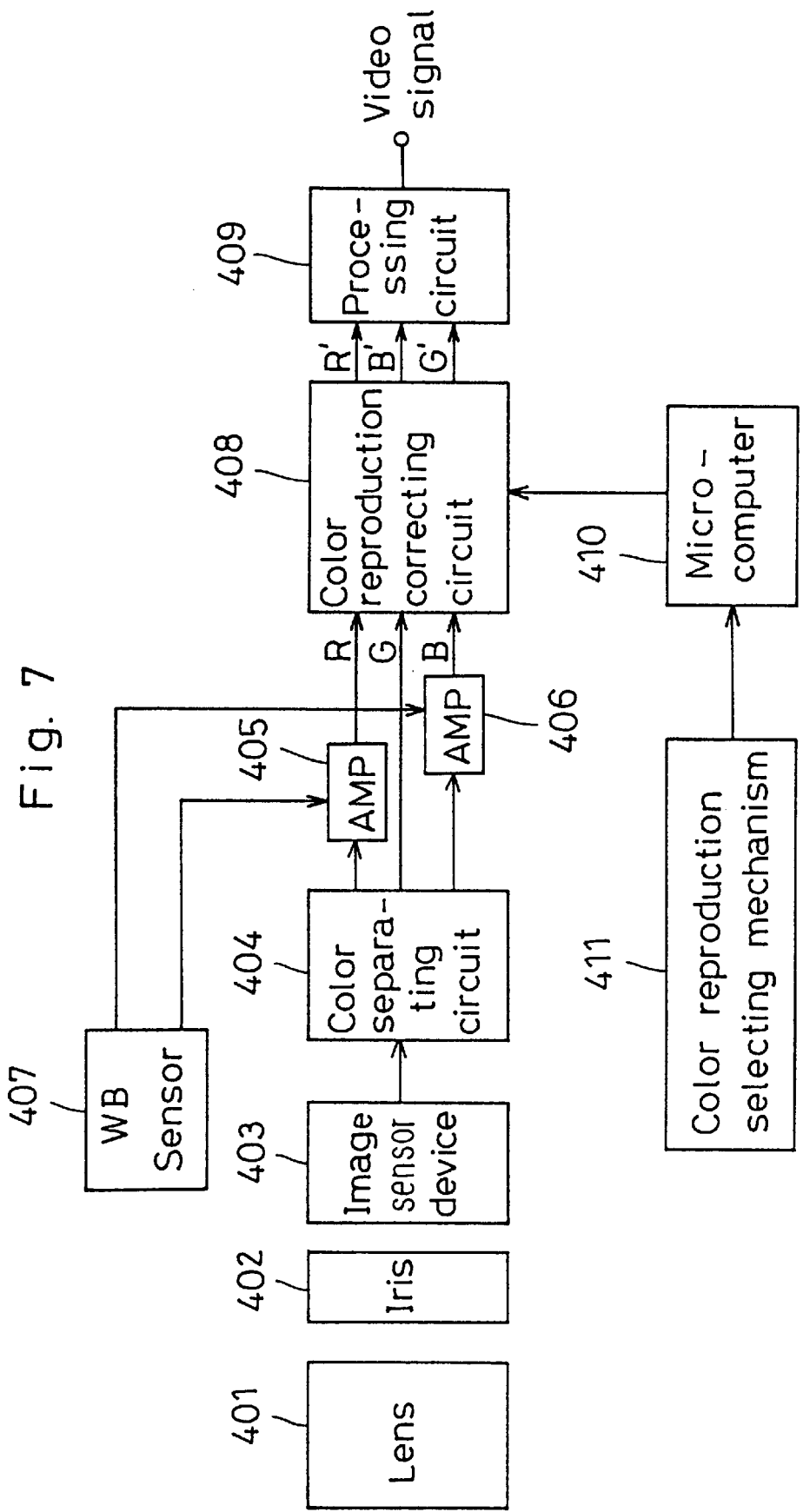
FIG. 7 is a block diagram of a fourth embodiment of the present invention.

FIG. 7 is a block diagram of a video camera which is a fourth embodiment of the present invention.

This camera is provided with a taking lens 401, an iris 402, an image sensor 403 consisting of a CCD (charge coupled device), etc., a color separating circuit 404 for separating input video signals into signals R (red), G (green) and B (blue), amplifiers 405 and 406 which are inserted into signal lines, a white balance (WB) sensor 407 for detecting a color temperature of external light and providing a control signal to the amplifiers 405 and 406, a color reproduction correcting circuit 408 for changing color reproduction by correcting color signals, a processing circuit 409. This camera is further provided with a microcomputer 410 for controlling the color reproduction correcting circuit 408 and a color reproduction selecting mechanism 411 for providing a signal to the microcomputer 410.

In this embodiment, light having passed through the lens 401 and the iris 402 is formed into an image on the image sensor device 403. Each picture element of the sensor device 403 is provided with a color filter, and in a device output, a signal where a color signal is multiplexed is obtained. The signal is color-separated at the color separating circuit 404 to obtain the signals R, G and B. The white balance sensor 407 outputs signals B/G and R/G according to a color temperature. The signals R and B are gain-controlled by the signals B/G and R/G from the white balance sensor 407 at the amplifiers 405 and 406 so that the level of each of the signals R, G and B is proper when a white object is taken.

Each of the signals is inputted to the color reproduction correcting circuit 408 where the signal are controlled so that a desirable skin color is obtained under a control of the microcomputer 410 as hereinafter described. Correction data are selected by the color reproduction selecting mechanism 411. According to a selected selection signal, the microcomputer 410 transfers correction data stored in an internal memory to the color reproduction correcting circuit 408. In the color reproduction correcting circuit 408, color reproduction is corrected based on the correction data. After the color reproduction correction, signals R', G' and B' are signal-processed by the processing circuit 409 to be converted into a video signal.

Figure 8:
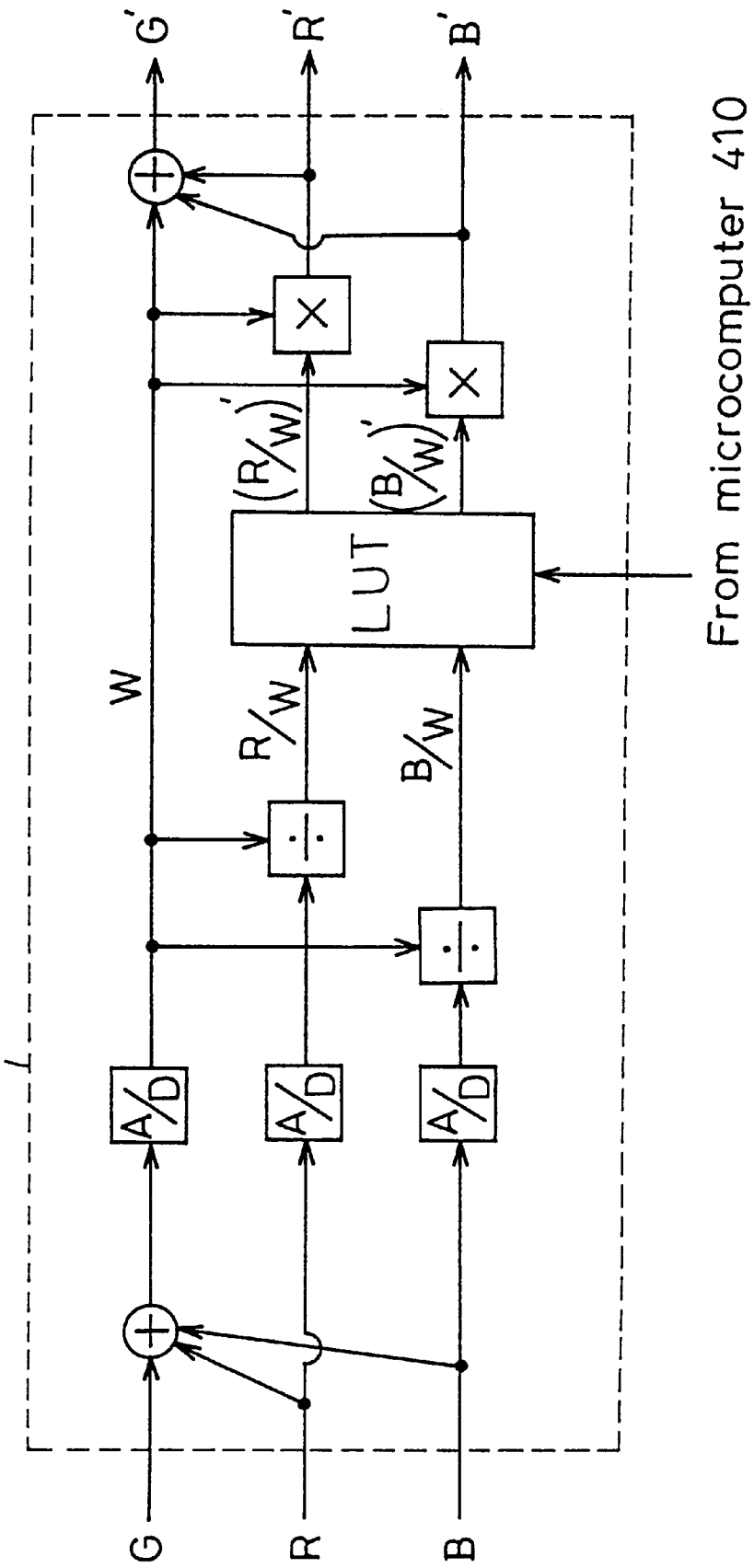
FIG. 8 shows a specific example of a color reproduction correcting apparatus of the imaging apparatus shown in FIG. 7.

FIG. 8 shows a specific example of the color reproduction correcting circuit 408.

In the circuit 408, the input signals R, G and B are added to be converted into a signal W. After A/D-converted, the signals W, R and B are divided by a divider to be converted into chromaticity signals R/W and B/W. A look up table (LUT) consists of a RAM (random access memory), and digital values R/W and B/W are applied to an address line. RAM data of an address specified by the signals R/W and B/W are read out and are converted into signals (R/W)' and (B/W)'. The data of the RAM, which are data previously written through the microcomputer 410, can succeed the chromaticity data R/W and B/W. In this case, when a slightly reddish skin color is desired, a value of R/W of chromaticity data (R/W, B/W) which represent a color which is nearly a skin color is set to a high value.

After multiplied by the signal W and inverted, the signals (R/W)' and (B/W)' are converted into signals G', R' and B'. As described above, a desirable color reproduction of a skin-colored portion can be set without deteriorating color reproduction of primary colors and white.

Figure 9:
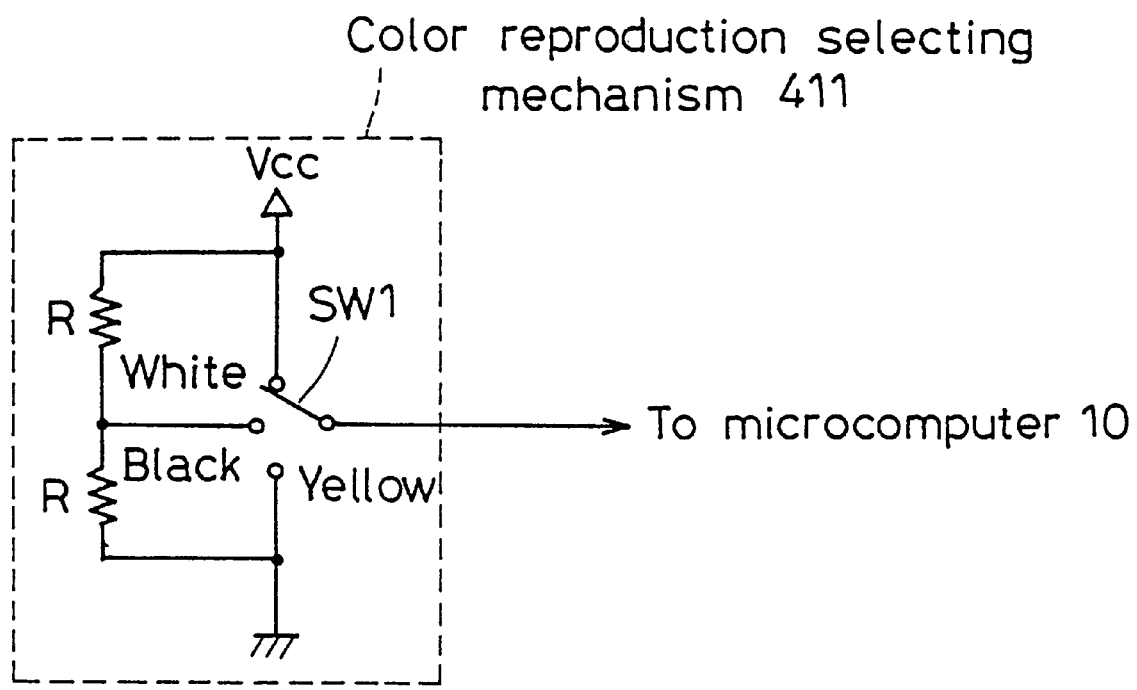
FIGS. 9, 10 and 11 show examples of a color reproduction selecting mechanism in FIG. 7.
Figure 10:
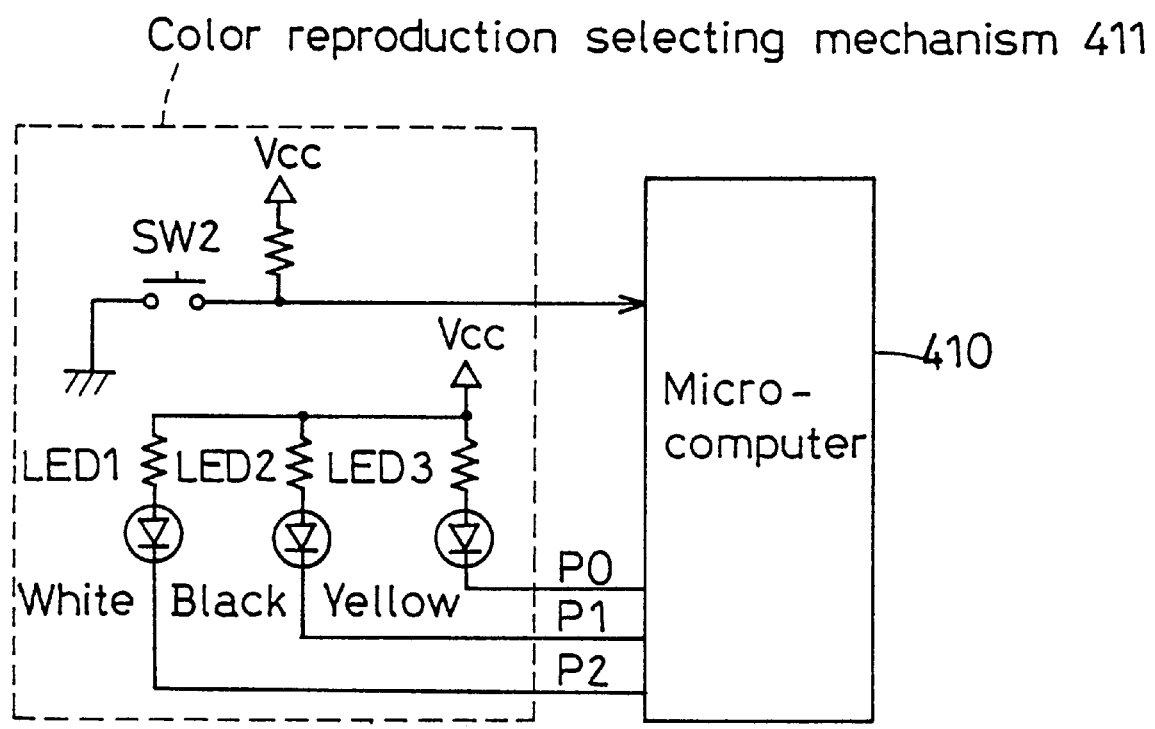
Figure 11:
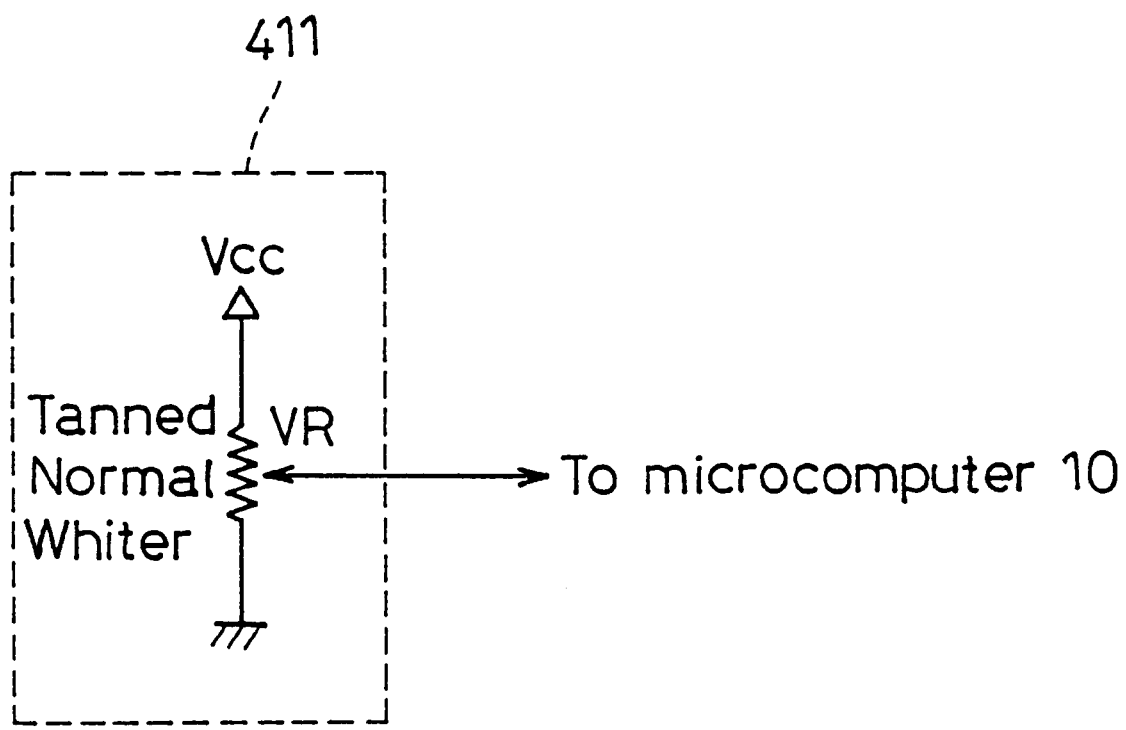

FIGS. 9, 10 and 11 show examples of the color reproduction selecting mechanism 411 for the user to obtain a favorite skin color. In FIG. 9, a resistor R is selected by a switch SW1 to select color reproduction of a skin color which suites a taste of each of the white, black and yellow races. In this example, a signal is transmitted to the microcomputer 410 at three levels of "H", "M" and "L". In the microcomputer 410, an input level is determined by an A/D converter provided in the microcomputer 410. It is easy to prepare more modes by this method.

FIG. 10 shows an example where color reproduction of a skin color is selected by a push-button switch SW2. A mode selected at present is displayed when any of output ports PO to P2 of the microcomputer 410 is "L" to turn on any of LEDs (light emitting diodes) 401 to 403. Every time the switch SW2 is pushed, a skin color is selected in order of white→black→yellow→white→ . . . .

FIG. 11 shows an example where color reproduction of a skin color is adjustable. According to a position of a variable resistance VR, a skin color can be set to a color more tanned or whiter than the actual color. A selected signal is transmitted to the microcomputer 410 as a voltage, and a level thereof is determined by the A/D converter provided in the microcomputer 410.

Figure 12A:
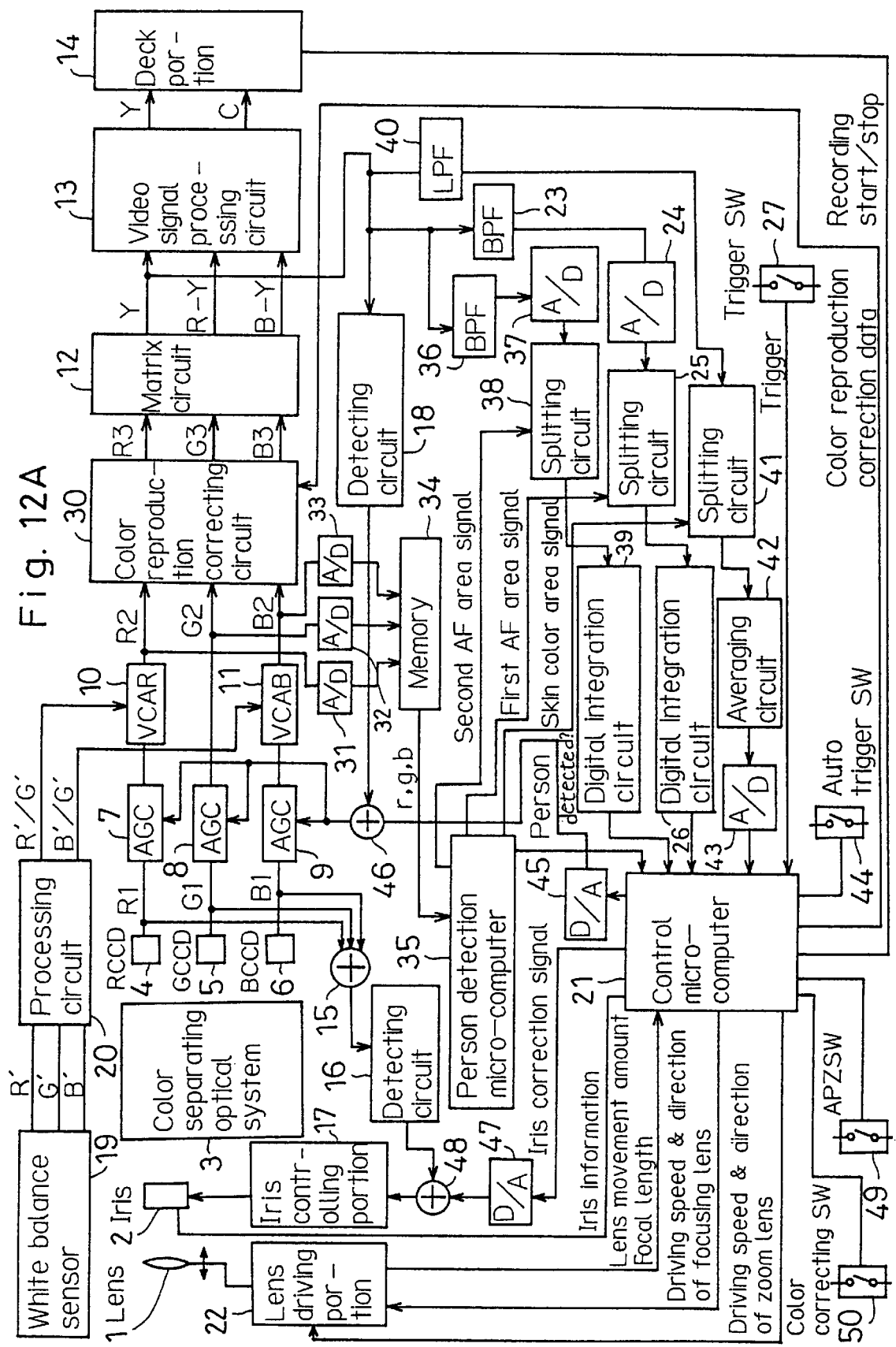
FIG. 12A is a block circuit diagram of a fifth embodiment of the present invention.
Figure 12B:
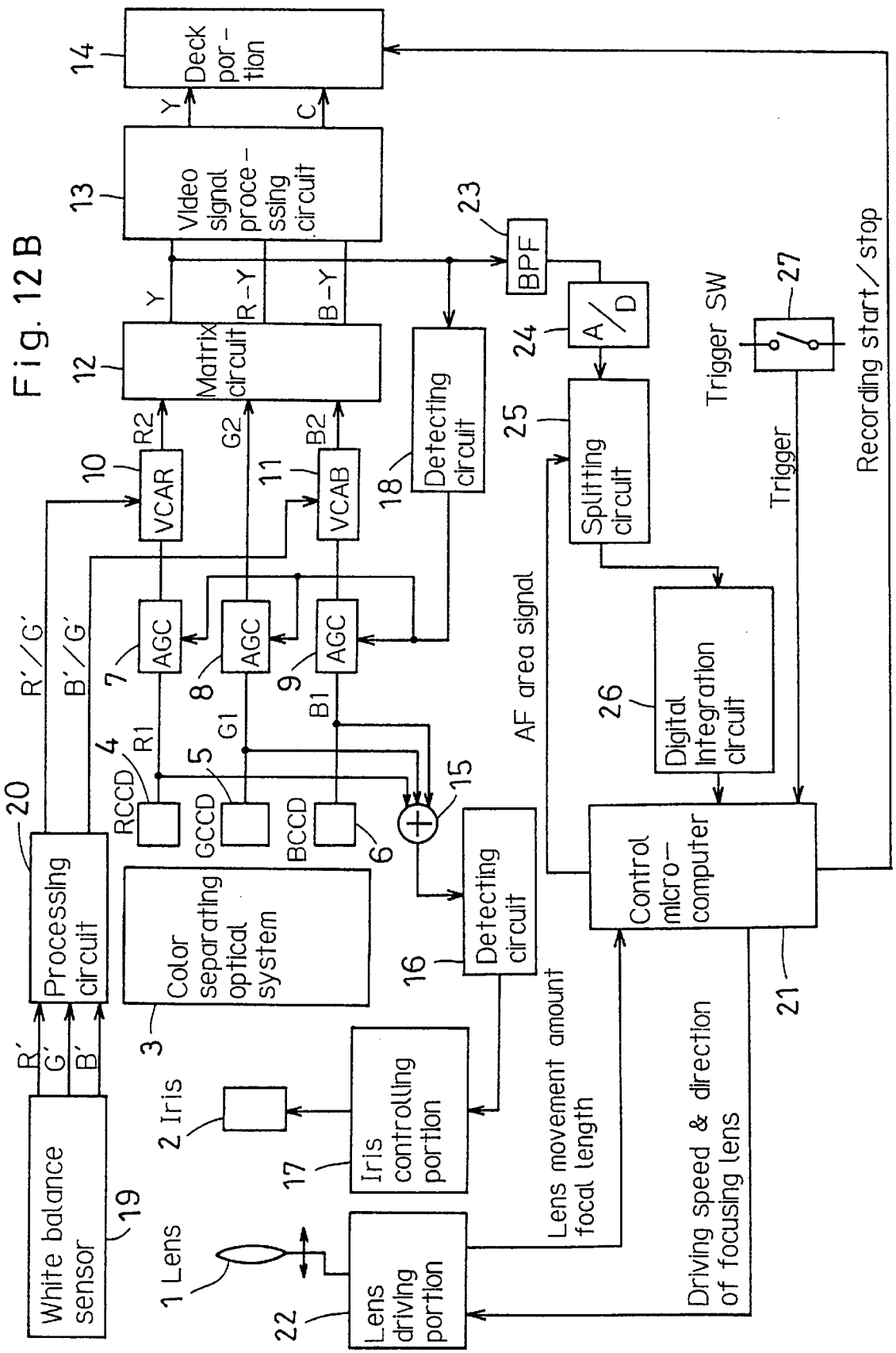
FIG. 12B is a block circuit diagram of a part of the embodiment of FIG. 12A.

FIG. 12A is a block circuit diagram of a video camera of a fifth embodiment of the present invention. FIG. 12B is a block circuit diagram showing portions other than main portions of FIG. 12A for easier understanding of the description thereof. In FIG. 12B, the numeral 1 is a taking lens and the numeral 2 is an iris. The taking lens 1 includes a focusing lens and a zoom lens although it is illustrated as a single lens in the figure. The numeral 3 is a color separating optical system for separating ambient light into red (R), green (G) and blue (B) light and outputting it. The color separating optical system consists of, for example, a color transmission prism.

The numerals 4, 5 and 6 are CCDs (charge coupled devices) which respectively respond to the light R, G and B provided by the color separating optical system 3. The CCDs 4, 5 and 6 generate electric signals R1, G1 and B1 corresponding to light signals of R, G and B, respectively. The CCD output signals R1, G1 and B1 are, after added at an appropriate rate by an adding circuit 15, detected by a first detecting circuit 16. A detection output thereof is supplied to an iris controlling portion 17 to control the iris 2. The iris 2 is controlled, with a feedback loop where the CCD output signals R1, G1 and B1 increase when an object is bright so that a detection output voltage increases to close the iris 2, so that the output voltage of the detecting circuit 16 is constant.

The numerals 7, 8 and 9 are AGC (automatic gain control) circuits, which is controlled by an output of a detecting circuit 18 for level-detecting a luminance signal Y outputted by a matrix circuit 12 to be subsequently described. The numerals 10 and 11 are voltage controlled amplifiers for white balance inserted into channels R and B. Gains of the amplifiers 10 and 11 are respectively controlled by signals R'/G' and B'/G' obtained by processing outputs R', G' and B' of a white balance sensor 19 with a processing circuit 20. For example, when color temperature is low, since an output of the white balance sensor 19 is R'>G'>B' in photographing a white object, the two outputs of the processing circuit 20 are R'/G'>1 and B'/G'<1, respectively. According to the ratios R'/G' and B'/G', the gain of the amplifier 10 of the channel R decreases and that of the amplifier 11 of the channel B increases so that R2=G2=B2.

The numeral 12 is the matrix circuit, which produces the luminance signal Y and two color difference signals R-Y and B-Y from primary color signals R2, G2 and B2. A video signal processing circuit 13 provided at the next step adds a synchronizing signal to the luminance signal Y, and processes the signals R-Y and B-Y through a quadrature-modulation, adds a color burst thereto and outputs them as chroma signals C. Each of the signals is provided to a deck portion 14 which includes a recording/reproducing apparatus.

The numeral 21 is a microcomputer for various controls (hereinafter referred to as control microcomputer). One of its functions is to move the lens 1 for focusing, etc. through a lens driving portion 22. Moreover, the control microcomputer 21 receives information such as a focal length of the lens, a movement amount of the lens, etc. from the lens driving portion 22.

Although an infrared ray AF (auto focus) method and a phase difference detection AF method have conventionally been employed for a video camera as an AF method, a video signal AF method where video signals are used, which is the most advantageous in decreasing the size of a video camera is most frequently employed. The circuit shown in FIG. 12B employs this method.

Figure 15:
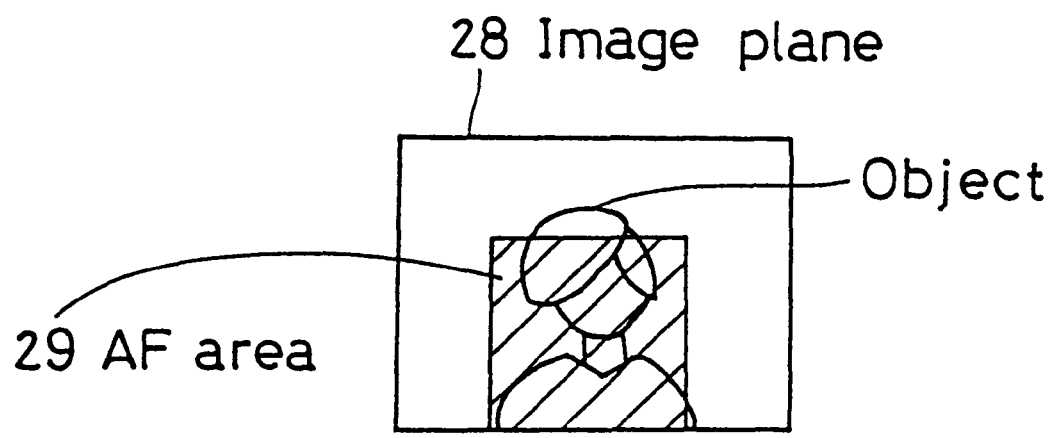
FIG. 15 is an explanatory view of a part of FIG. 12B.

In FIG. 12B, a high frequency component of the luminance signal Y after matrix is separated with a band pass filter 23, and a signal level thereof is A/D (analog to digital)-converted with an A/D converter 24. A splitting circuit 25 is controlled by an AP area signal from the control microcomputer 21. The center of an image plane 28 shown in FIG. 15 is set as an AF area 29, and the data within the area 29 are integrated by a digital integration circuit 26.

Thus, when an in-focus condition is obtained, the output data of the digital integration circuit 26 is of high value so that a high AF evaluation value is obtained, and when an in-focus condition is not obtained, it is of low value so that a low evaluation value is obtained. The data are integrated and read out every field under a control of the control microcomputer 21.

Figure 13:
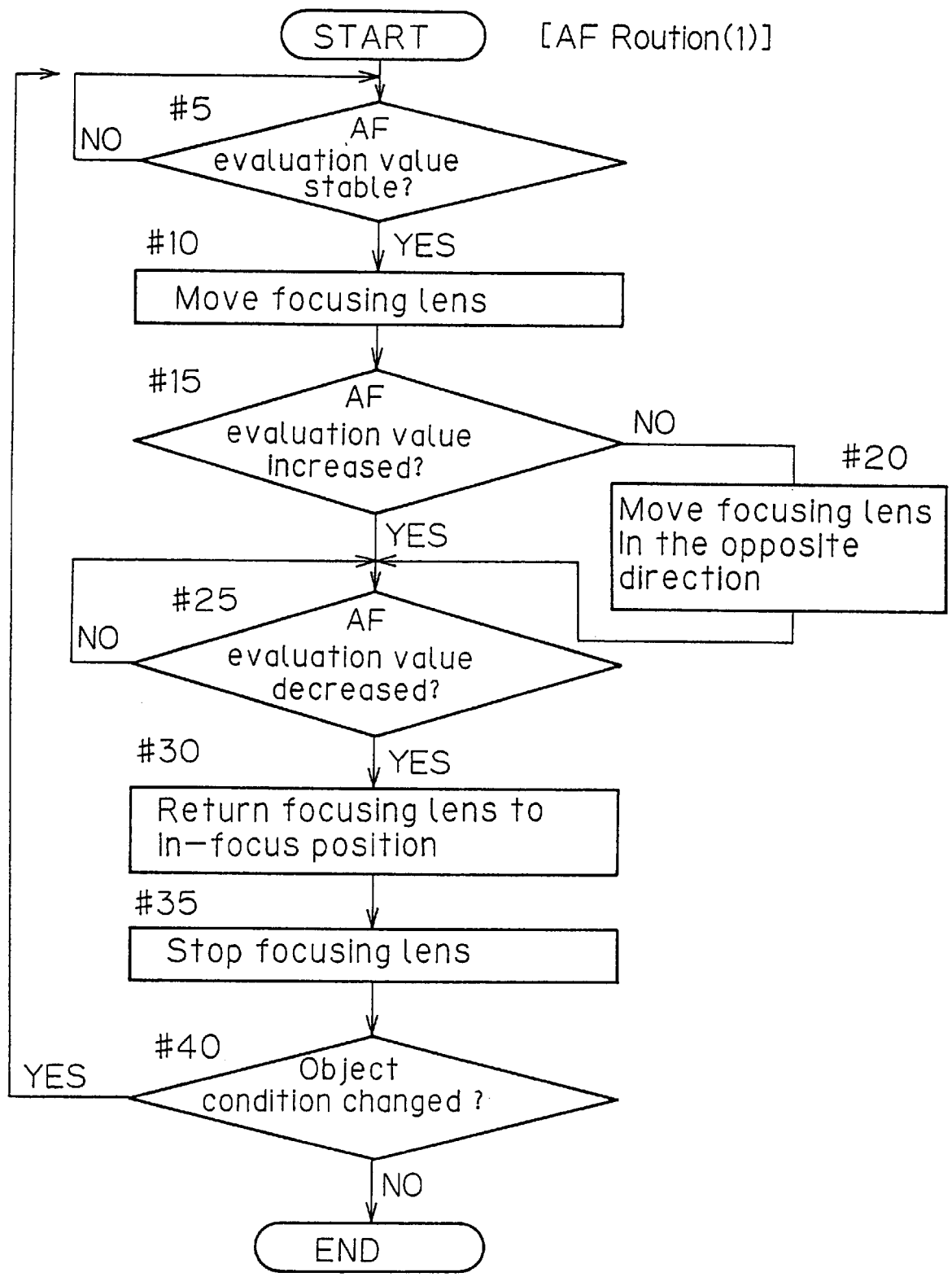
FIG. 13 is a flow chart of an AF control routine where a video signal employed for the circuit shown in FIG. 12B is used.

FIG. 13 is a flow chart of an AF control operation (AF routine (1)) executed by the control microcomputer 21. When the routine is called, first, the process waits until an AF evaluation value obtained based on output data of the digital integration circuit 26 becomes stable at step #5. Then, the lens 1 (a focusing lens in this case) is moved (step #10), and whether or not the AF evaluation value has increased due to the lens movement is determined (step #15). When the AF evaluation value has increased, the process proceeds to step #25, where the lens 1 is moved until the AF evaluation value decreases. When the AF evaluation value starts to decrease, the lens 1 is returned to an in-focus position at step #30, and the leas 1 is stopped at step #35.

Figure 14:
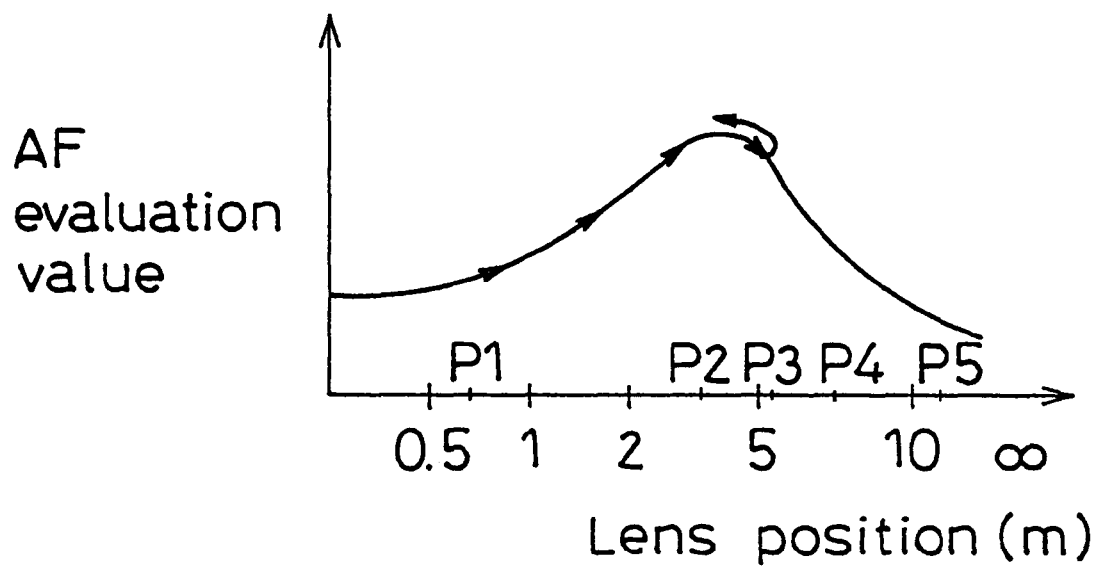
FIG. 14 is an explanatory view of FIG. 13.

The above operation will be explained with reference to FIG. 14. When the lens 1 is located at a position P1 before moved, if it is moved toward the infinity side, the AF evaluation value gradually increases, and after the lens passes an in-focus position P2, the evaluation value decreases. For this reason, the lens is moved in the opposite direction (toward the near side in this case) at a position P3 and is returned to the in-focus position P2.

When it is determined that the AF evaluation value has not increased at step #15 in FIG. 13, assuming an in-focus position is on the opposite side, the process proceeds to step #20, where the lens is moved in the opposite direction (toward the near side). The lens is moved until the AF evaluation value decreases at step #25, and after returned to the in-focus position (step #30), the lens is stopped (step #35). This operation will be explained with reference to FIG. 14. When the lens is located at a position P4 before moved, and it is moved toward the infinity side, the AF evaluation value does not increase. For this reason, the lens is moved in the opposite direction on the way at a position P5, and is moved until the evaluation value decreases. In this case, it is when the lens passes the in-focus position P2 that the evaluation value starts to decrease. The lens is again moved in the opposite direction (toward the infinity side) until it returns to the in-focus position P2, and is stopped.

In the above, a case was described where the lens is moved at first (that is, at step #10) toward the infinity side. A similar operation is performed in a case where the lens is moved toward the near side at step #10. In this case, the lens is also returned to the in-focus position P2.

At step #40, whether or not a condition of an object which is once in focus has changed is determined. When it has changed, the process returns to step #5, where the AF operation is performed over again from the beginning. When it has not changed, the flow is completed.

Returning to FIG. 12B, the numeral 27 is a trigger switch. When the trigger switch 27 is turned on, the control microcomputer 21 senses it to change a condition of the deck portion 14. That is, when the deck portion 14 is under a recording condition before the switch 27 is turned on, recording is stopped. When it is not under a recording condition, recording is started.

Next, the implementations of FIG. 12A will be described.

In the following description of a circuit shown in FIG. 12A, a description of portions represented by the same numerals as those in FIG. 12B is omitted. In FIG. 12A, the numeral 30 is a color reproduction correcting circuit for correcting color reproduction of the primary color signals R2, G2 and B2 which have been automatic-gain-controlled and white-balance-adjusted based on color reproduction correction data from the control microcomputer 21. The color reproduction correcting circuit 30 is provided to adjust color so as to suit the user's intention through an operation of a color correcting switch 50 to be subsequently described. The circuit 30 may be inserted at the next step of the matrix circuit 12 where it works on the signals R-Y and B-Y instead of a position, shown in FIG. 12A, where it works on the signals R2, G2 and B2.

The numerals 31, 32 and 33 are A/D converters for digitizing the primary color signals R2, G2 and B2, respectively. The converted signals are read in by a memory 34 as signals r, g and b. After read in by the memory 34 and read out from the memory 34, the signals r, g and b are processed by a microcomputer 35 for person detection (hereinafter referred to as person detection microcomputer). The memory 34 has a two-field image memory for each color. Reading out and writing (reading in) by the memory are repeated every field. The person detection microcomputer 35 provides a skin color (a color of human skin) area signal to a third splitting circuit 41 as well as provides a first AF area signal to a first splitting circuit 25 and a second AF area signal to a second splitting circuit 38.

The second splitting circuit 38 gates a digitized high frequency component of the luminance signal Y through a band pass filter 36 and an A/D converter 37 based on the second AF area signal from the person detection microcomputer 35, and provides it to a digital integration circuit 39. An output, which shows an AF evaluation value of a second AF area, of the digital integration circuit 39 is transmitted to the control microcomputer 21 as an AF signal. While the band pass filter 23, the A/D converter 24, the splitting circuit 25 and the digital integration circuit 26 described with reference to FIG. 12B relate to signals in a first AF area, the band pass filter 36, the A/D converter 37, the splitting circuit 38 and the digital integration circuit 39 relate to signals in a second AF area. The structures of the band pass filter 36, the A/D converter 37, the splitting circuit 38 and the digital integration circuit 39 are the same as those of the band pass filter 23, the A/D converter 24, the splitting circuit 25 and the digital integration circuit 26, respectively.

The third splitting circuit 41 controlled by the skin color signal from the person detection microcomputer 35 gates a low-pass component of the luminance signal Y extracted from a low-pass filter 40. After averaged by an averaging circuit 42, the gate output is digitized by an A/D converter 43 and transmitted to the control microcomputer 21 as an exposure level signal.

From the iris 2, an opened value information thereof is transmitted to the control microcomputer 21. From the control microcomputer 21, an iris correction signal is transmitted to the iris controlling circuit 17 through a D/A (digital to analog) converting circuit 47 and an adding circuit 48.

An AGC correction signal is provided from the control microcomputer 21 to the AGC circuits 7, 8 and 9 through a D/A converter 45 and an adding circuit 46.

The numeral 44 is an auto trigger switch. The numeral 49 is an APZ (advanced program zoom) switch. The numeral 50 is the color correcting switch 50. The auto trigger switch 44 controls an ON/OFF of auto trigger. When it is ON, an ON/OFF of the deck portion 14 is automatically controlled by a start/stop signal from the control microcomputer 21. The APZ switch 49 controls an ON/OFF of auto zoom. When it is ON, the control microcomputer 21 outputs a zoom lens control signal to move the lens 1 (zoom lens in this case), whereby an angle of view is automatically adjusted. The color correcting switch 50 is for turning on/off a color correcting function. When it is ON, the color reproduction correction data are provided from the control microcomputer 21 to the color reproduction correcting circuit 30.

One feature that the circuit of FIG. 12A is distinguished from that of FIG. 12B is a person detection function. As image data for person detection, digital data are used which is obtained by A/D-converting the white-balanced primary color signals R2, G2 and B2 with the A/D converters 31, 32 and 33. The digital data are written and read out every field by the memory 34. Based on the data read out from the memory 34, the person detection microcomputer 35 executes a person detection operation shown in FIGS. 16 and 17.

When a person detection routine is called, the person detection microcomputer 35 determines whether or not a person was detected in the previous operation at step #100. Since there is no previous operation in the first operation, the process proceeds to step #105, where the number of picture elements in a skin-colored portion is calculated.

In the calculation, picture element data $r_{ij}$, $g_{ij}$ and $b_{ij}$ of the memory 34 are loaded into the person detection microcomputer 35 in the order, a ratio of $r(i, j)$, $g(i, j)$, $b(i, j)$ is calculated, and letting the picture elements determined to be in the skin-colored portion be $f(i, j)=1$ and letting those determined to be in other portions be $f(i, j)=0$, the number of picture elements determined to be in the skin-colored portion is counted.

At step #110, whether or not the number of picture elements in the skin-colored portion is equal to or higher than a predetermined number is determined. When it is equal to or higher than the predetermined number, an outline of the skin-colored portion is detected at step #115 and straightness of the outline is calculated at step #120. The outline of the skin-colored portion is detected by calculating the outline of the skin-colored portion as an example with the following algorithms:

$$f(i, j) - f(i-1, j) = \delta 1 \quad f(i, j) = 1 \text{ when } \delta 1 = 1$$
$$f(i, j) = 0 \text{ when } \delta 1 \neq 1$$
$$f(i, j) - f(i, j-1) = \delta 2 \quad f(i, j) = 1 \text{ when } \delta 2 = 1$$
$$f(i, j) = 0 \text{ when } \delta 2 \neq 1$$

Moreover, since it is considered that a wall or a floor which is nearly skin-colored is detected when an outline has a lot of straight portions, whether or not the outline has a lot of straight portions is calculated.

Figure 18:
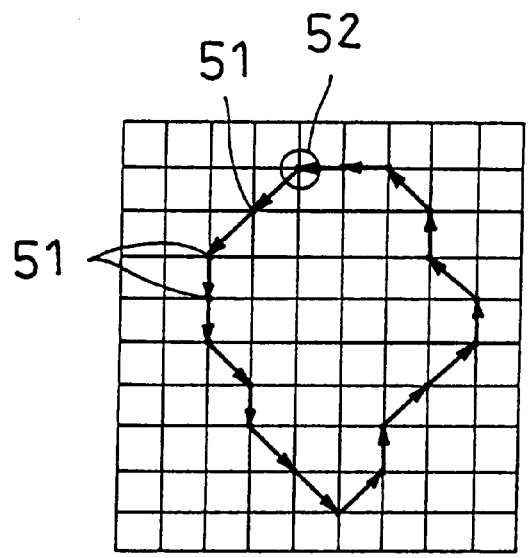
Figure 19:
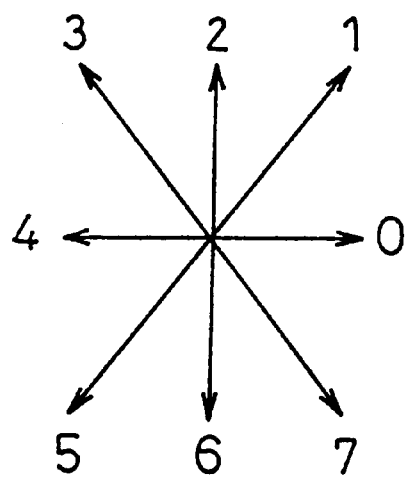

In FIG. 18, picture elements on a detected outline are represented by black dots 51. Each point of intersection represents a coordinate. A direction of the next outline picture element on the outline in a memory is stored counterclockwise from a picture element, shown by a circle 52, which is in the upper left of the image plane according to a direction code shown in FIG. 19. In this example, the code is stored as shown in FIG. 20. Letting a picture element whose code is changed be 1 and that whose code is not changed be 0, a number NB of the picture elements whose code is changed is calculated. Since a portion where the code is changed is a curved portion, the more the portion is, the closer to a curved line the outline is.

At step #125, whether or not an outline which is nearly circular is detected is determined. This determination is based on a theory that an outline which is nearly circular can be considered to be an outline of a person. In this determination, a ratio NB/NA of the number NB of changed picture elements to the number NA of the whole picture elements on the outline is calculated, and when the ratio is equal to or higher than a predetermined value, it is determined that an outline which is nearly circular (an outline of a person) is detected.

When it is determined that an outline which is nearly circular is detected at step #125, the area of a skin-colored portion within the outline which is nearly circular is calculated at step #130. The area is easily calculated by counting the number of picture elements in the outline. At step #135, whether or not the area of the skin-colored portion is equal to or larger than a predetermined area is determined. When it is not equal to or larger than the predetermined area, it means that the person is located far away or the outline is a noise. When it is equal to or larger than the predetermined area, whether or not there are plural skin-colored portions whose areas are equal to or larger than the predetermined area is determined at step #140. When there is only one portion, since a person is detected (identified), the person detection microcomputer 35 sets the first AF area signal including a skin-colored portion at step #145, and provides the first AF area signal to the first splitting circuit 25. With this operation, the above-described AF routine (1) shown in FIG. 13 is executed at step #150 to control the AF evaluation value in the area so as to be maximum. The AF routine (1) is controlled by the control microcomputer 21.

Figure 21:
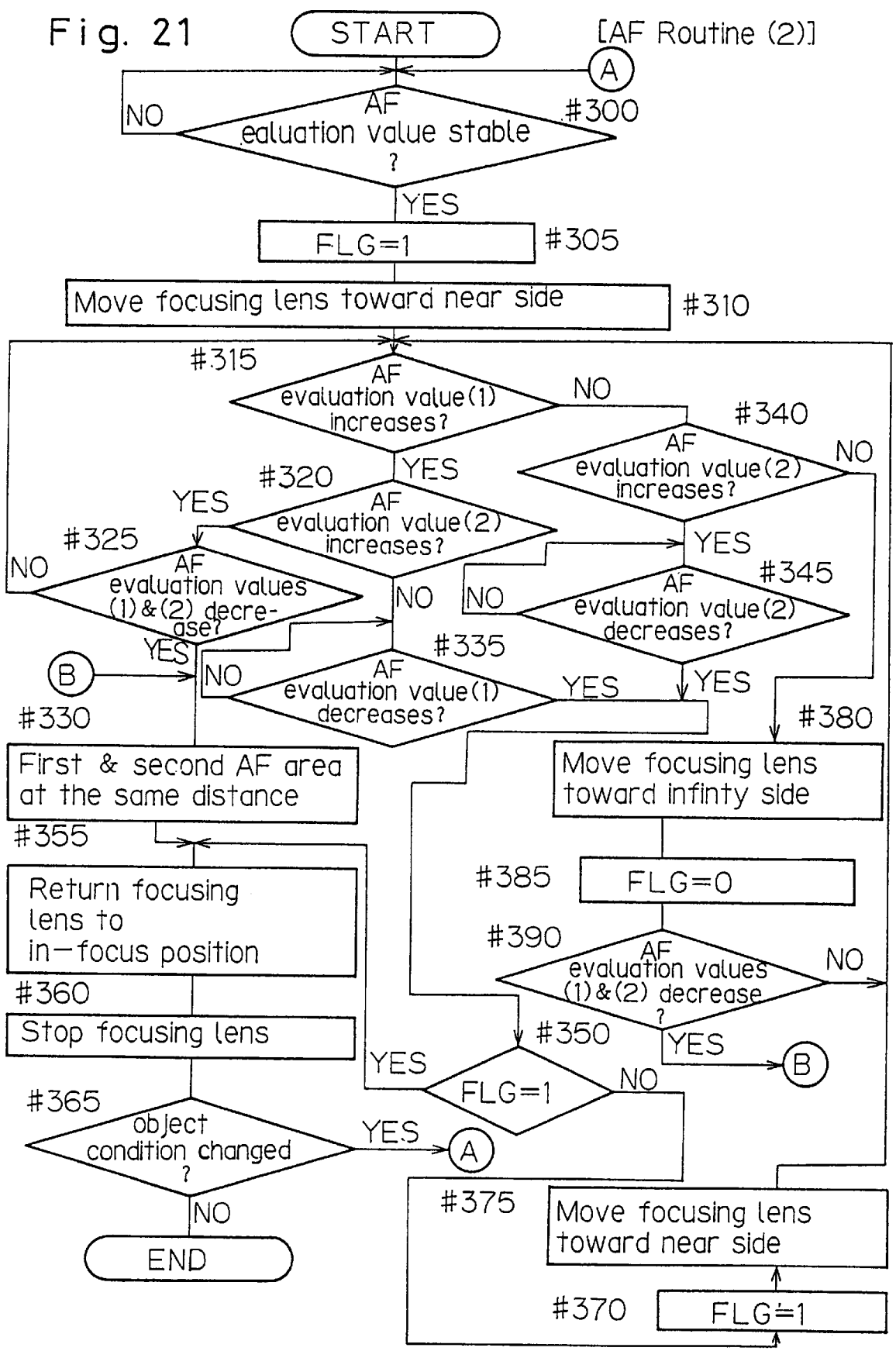
FIG. 21 is a flow chart of an AF control routine when there are plural persons.
Figure 22:
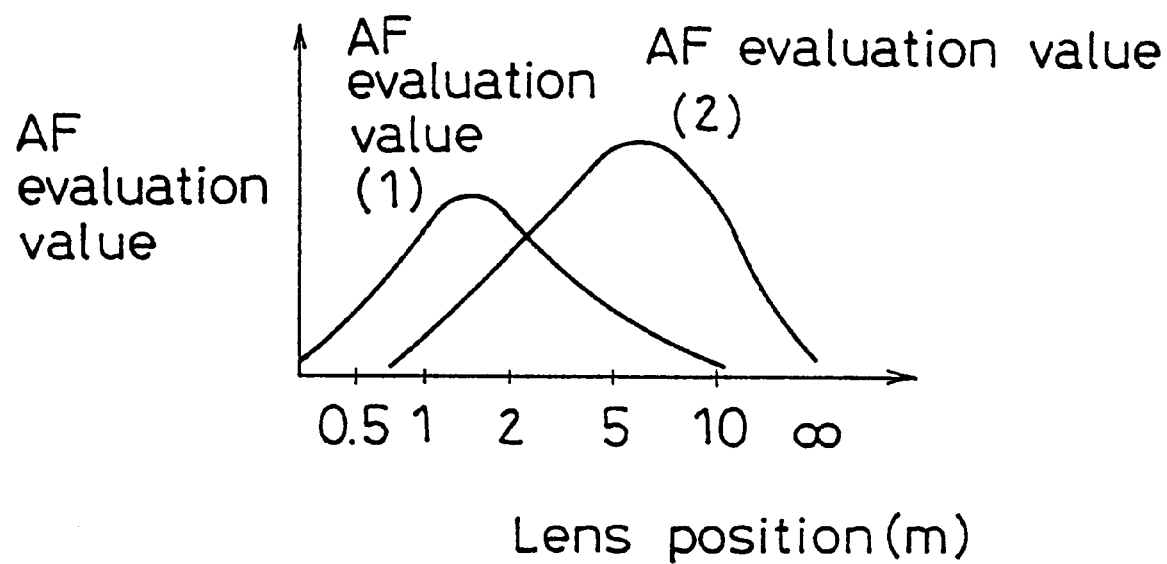
FIGS. 22, 23A and 23B are explanatory views of FIG. 21.

When there are plural skin-colored portions whose areas are equal to or larger than the predetermined area at step #140, an AF area signal is set for each portion, and an AF routine (2) shown in FIG. 21 is executed (the AF routine (2) shown in FIG. 21 is for a case where there are two skin-colored portions, that is, where the first AF area signal and the second AF area signal are set). FIG. 22 shows a relation between a lens position and an AF evaluation value when two people are located at different distances from the camera. In this case, the camera is focused on the person located closer in the operation of the AF routine (2).

Now, the AF routine (2) shown in FIG. 21 will be described. When the routine is called, first, the process waits until the AF evaluation value becomes stable at step #300. The lens 1 is not moved until then. This is in order to avoid an erroneous distance measurement due to a movement of an object. When the AF evaluation value becomes stable, a flag FLG is set (that is, FLG=1) at step #305. The flag FLG shows that the lens can be moved toward the near side. According to the setting of the flag FLG, the focusing lens is moved toward the near side at step #310. At the next step #315, whether or not an AF evaluation value (1) relating to the first AF area increases is determined.

When the AF evaluation value (1) increases, whether or not an AF evaluation value (2) relating to the second AF area increases is determined at step #320. When the AF evaluation value (2) also increases, the driving, toward the near side, of the focusing lens is continued. Then, at step #325, whether or not both of the AF evaluation values (1) and (2) decrease is determined at step #325. When they simultaneously decrease, determining that the peaks of the in-focus conditions are simultaneously over, it is detected that the objects in the first and second AF areas are at the same distance (step #330). Then, the focusing lens is returned to the in-focus position (step #355), and is stopped at step #360. Thereafter, a change of a condition of the object has changed is monitored at step #365 (specifically, the AF evaluation values (1) and (2) are monitored). When the condition has not changed, this routine is completed. When it has changed, determining that the object has moved, the process returns to step #300, and the flow from step #300 on is executed.

When neither of the AF evaluation values (1) and (2) increases at step #325, the process returns to step #315 while the focusing lens is being moved, and whether or not the AF evaluation value (1) increases is determined.

Next, a case will be described where the AF evaluation value (1) increases and the AF evaluation value (2) does not increase (when the AF evaluation value (2) does not increase at step #320). In this case, the object in the first AF area is located on the near side of the present in-focus position and the object in the second AF area is located on the infinity side of the present in-focus position. Since the camera is focused on the nearer object of the objects located in the first and second AF areas in this algorithm, the driving, toward the near side, of the focusing lens is continued.

The AF evaluation value (1) is monitored at step #335. When the AF evaluation value (1) starts to decrease, the condition of the flag FLG is determined at step #350. When FLG=1, the lens is being moved toward the near side. Hence, a position where the AF evaluation value (1) starts to decrease following the decrease of the AF evaluation value (2), that is, the peak of the AF evaluation value (1) of the object on the near side can be detected. The focusing lens is returned to the in-focus position (the peak position) at step #355, and is stopped at step #360.

When FLG≠1, the focusing lens is being moved toward the infinity side, and the position where the AF evaluation value (1) decreases following the decrease of the AF evaluation value (2) is a position where the peak of the AF evaluation value of the object on the infinity side is over. Hence, when FLG≠1, the process proceeds from step #350 to step #370, where the flag FLG is set (FLG=1), and the focusing lens is moved toward the near side at step #375. Then, the process returns to the first step #315.

When the AF evaluation value (1) does not increase at step #315, the process proceeds to step #340, where whether or not there is an in-focus position in the second AF area is determined by determining whether or not the AR evaluation value (2) increases. When the AF evaluation value (2) increases at step #340, whether or not the AF evaluation value (2) decreases is determined at the next step #345. When it decreases, whether or not FLG=1 is determined at step #350. When FLG=1, determining that the lens is at an in-focus position on the near side, the operation from step #355 on is executed. When FLG≠1, the process returns to step #315 through steps #370 and #375.

When the AF evaluation value (2) does not increase at step #340, the focusing lens is moved toward the infinity side at step #380, and the flag FLG is reset (FLG=0) at step #385. When both of the AF evaluation values (1) and (2) decrease at step #390, the process jumps to step #330, and the operation from step #330 on is executed. When neither of the AF evaluation values (1) and (2) decreases at step #390, the process returns to step #315, and the operation from step #315 on is executed.

As described above, in the AF routine (2), it is determined that the first and second AF areas are at the same distance when the AF evaluation values (1) and (2) simultaneously start to decrease. When the lens is moved toward the near side, the camera is focused on an object located in the area whose AF evaluation value starts to decrease later. When the lens is moved toward the infinity side, the camera is focused on an object located in the area whose AF evaluation value starts to decrease first. Moreover, in the AF routine (2), the driving direction of the focusing lens is determined by the flag FLG. When FLG=1, it is determined that the camera is focused on the nearer person, and the lens is returned to an in-focus position and is stopped.

Figure 16:
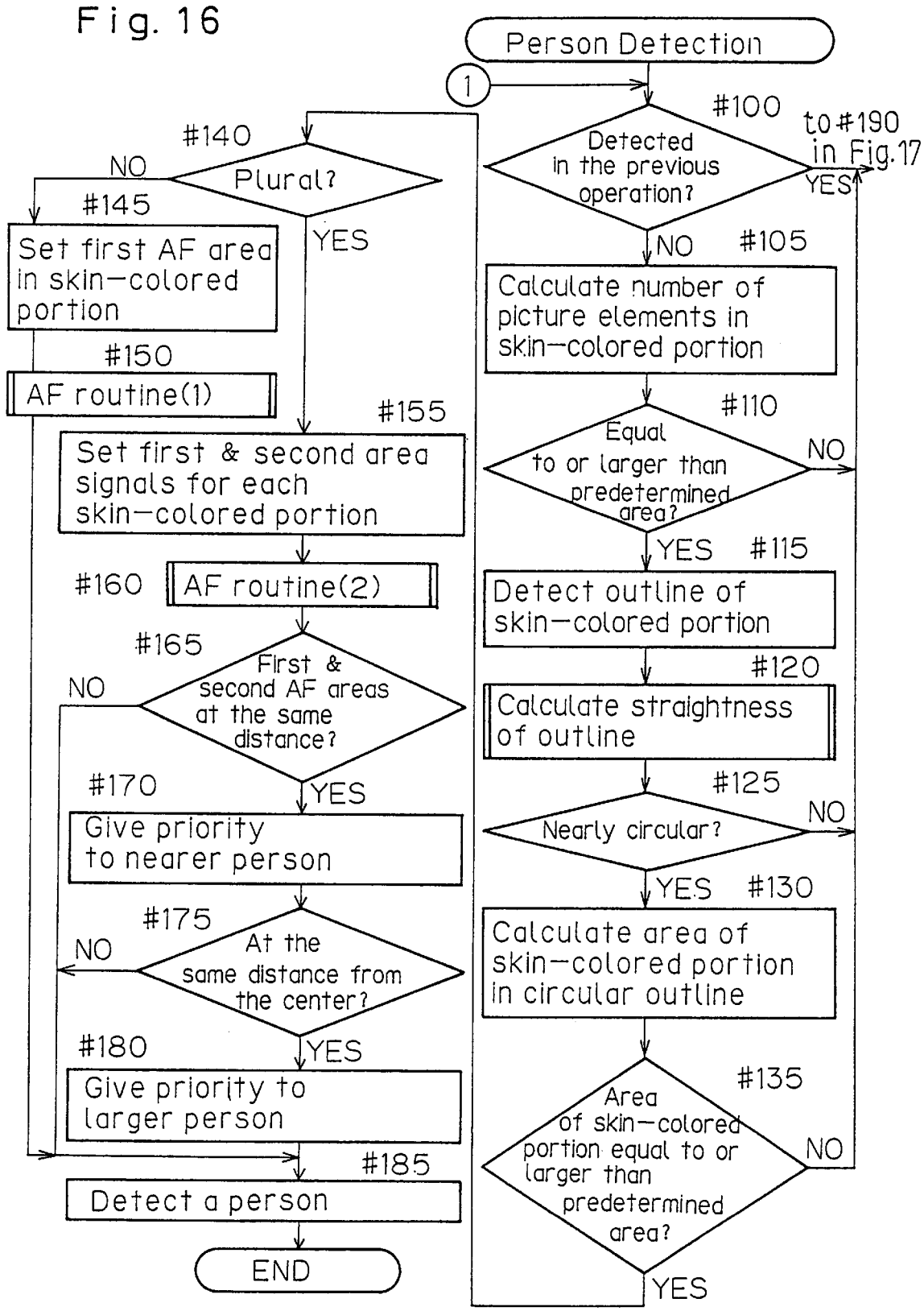
FIGS. 16 and 17 are flow charts of a person detection routine.
Figure 17:
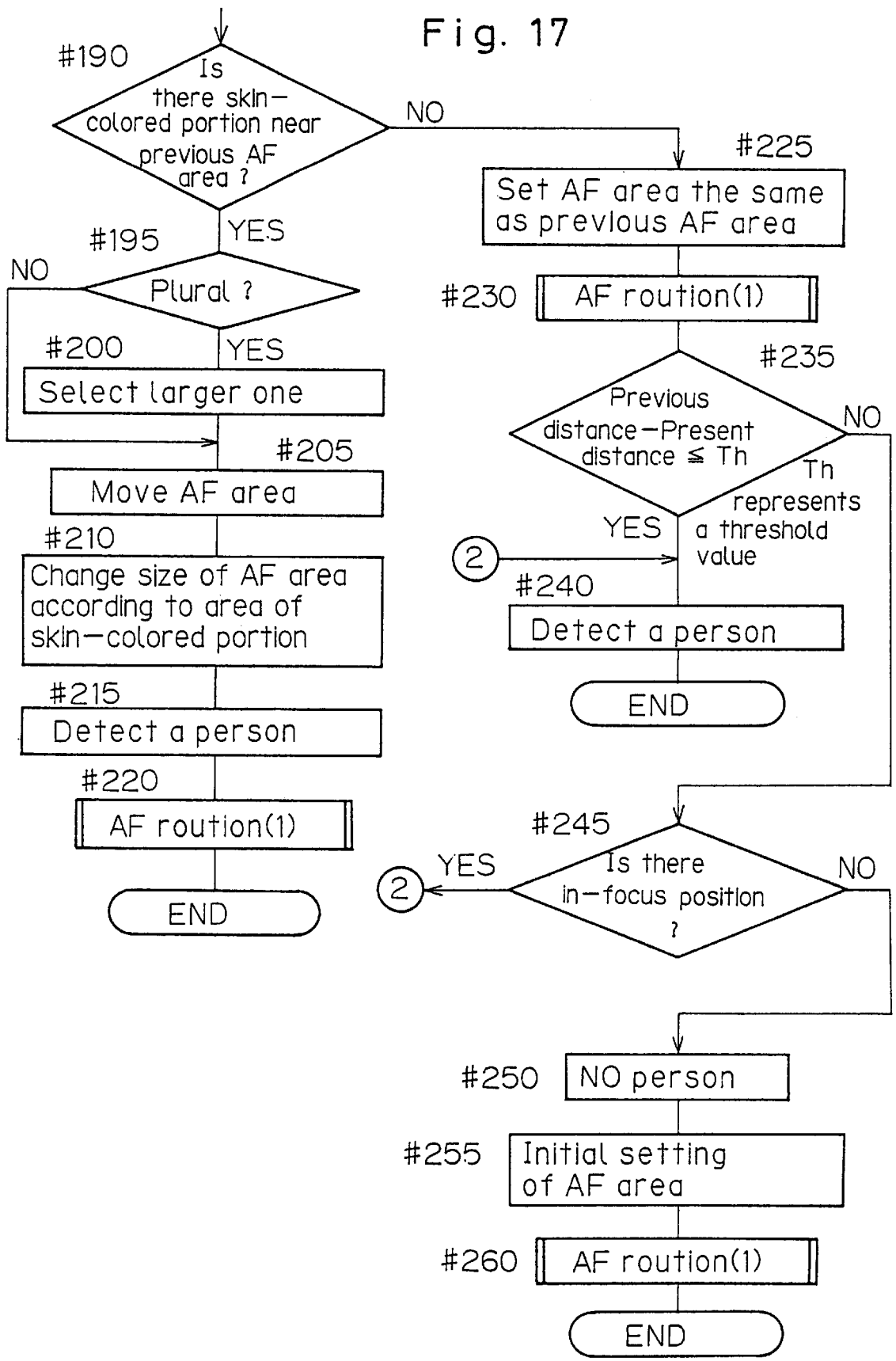

Returning to the flow chart shown in FIG. 16, when the above-described AF routine (2) is completed at step #160, steps from #165 to #180 are executed. This is to detect a person to be followed when the persons, in the first and second areas, located at the same distance move in different directions after the AF routine (2) is executed.

In this case, a person nearer to the center of the image plane is given priority (step #170). When the two persons in the first and second AF areas are located at the same distance from the center of the image plane, the person having a larger area is detected (steps #175 and #180). When the persons in the first and second AF areas are not at the same distance, since it is not required to detect a person to be followed, steps from #170 to #180 are skipped.

After the AF routine (1) at step #150 and steps from #160 to #180 are executed, a person is detected at step #185, and the flow is completed.

The above-described is a case where a person is detected for the first time, that is, a case where it is determined that no person is detected in the previous operation at step #100 and the process proceeds to the flow from step #105 on. When it is not the first time, it is determined that a person is detected in the previous operation at step #100, and the process proceeds to step #190 shown in FIG. 17. The process also proceeds to step #190 when a result of the determination is NO at the above-described steps #110, #125 and #135.

Figure 23A:
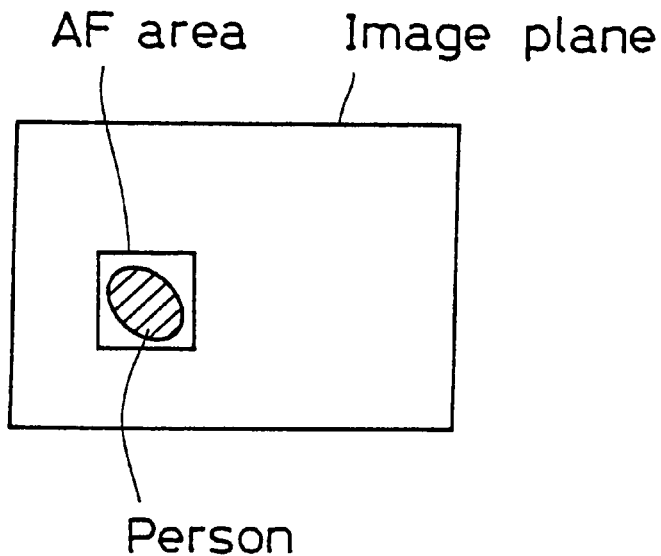
Figure 23B:
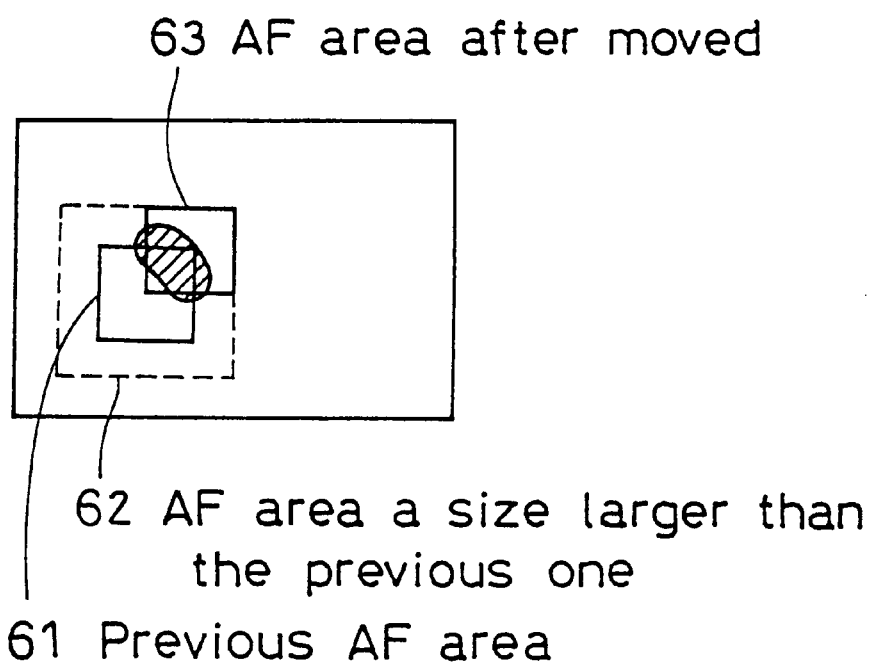

At step #190, whether or not there is a skin-colored portion near the previous AF area is detected. Specifically, as shown in FIG. 23B, the area of a skin-colored portion in an AF area 62 which is a size larger than a previous AF area 61 is calculated. When there are plural skin-colored portions, the largest one is detected (steps #195 and #200). An AF area as large as the previous AF area 61 is moved to a position, in the AF area 62 which is a size larger than the previous AF area 61, where the AF area includes the largest part of the skin-colored portion (step #205). When the skin-colored portion covers the whole of the AF area, the AF area is made a size larger (step #210). The AF area is detected as a person at step #215, and the camera is focused thereon in the AF routine (1) at step #220.

When there is no skin-colored portion near the previous AF area at step #190, the following two cases are considered:

(a) although the person is located at the same position, the skin-colored portion cannot be seen, for example, since the person turns back; and (b) the person is out of the image plane.

An AF area the same as the previous AF area is set (step #225), a focusing operation is performed in the AF routine (1) (step #230), and when the difference between the present distance and the previous distance is small, which is considered to be the case (a), a person is detected (steps #235 and #240).

When the present distance and the previous distance are different, whether or not there is a highly reliable in-focus position is determined by examining the AF evaluation value (step #245). When the AF evaluation value is equal to or higher than a predetermined value, it is determined that there is a highly reliable in-focus position, and the process proceeds from step #245 to step #240 to detect a person. When there is no in-focus position, it is determined that there is no person (step #250), and a focusing operation is performed in an initially set AF area in the AF routine (1) (steps #255 and #260).

Figure 24:
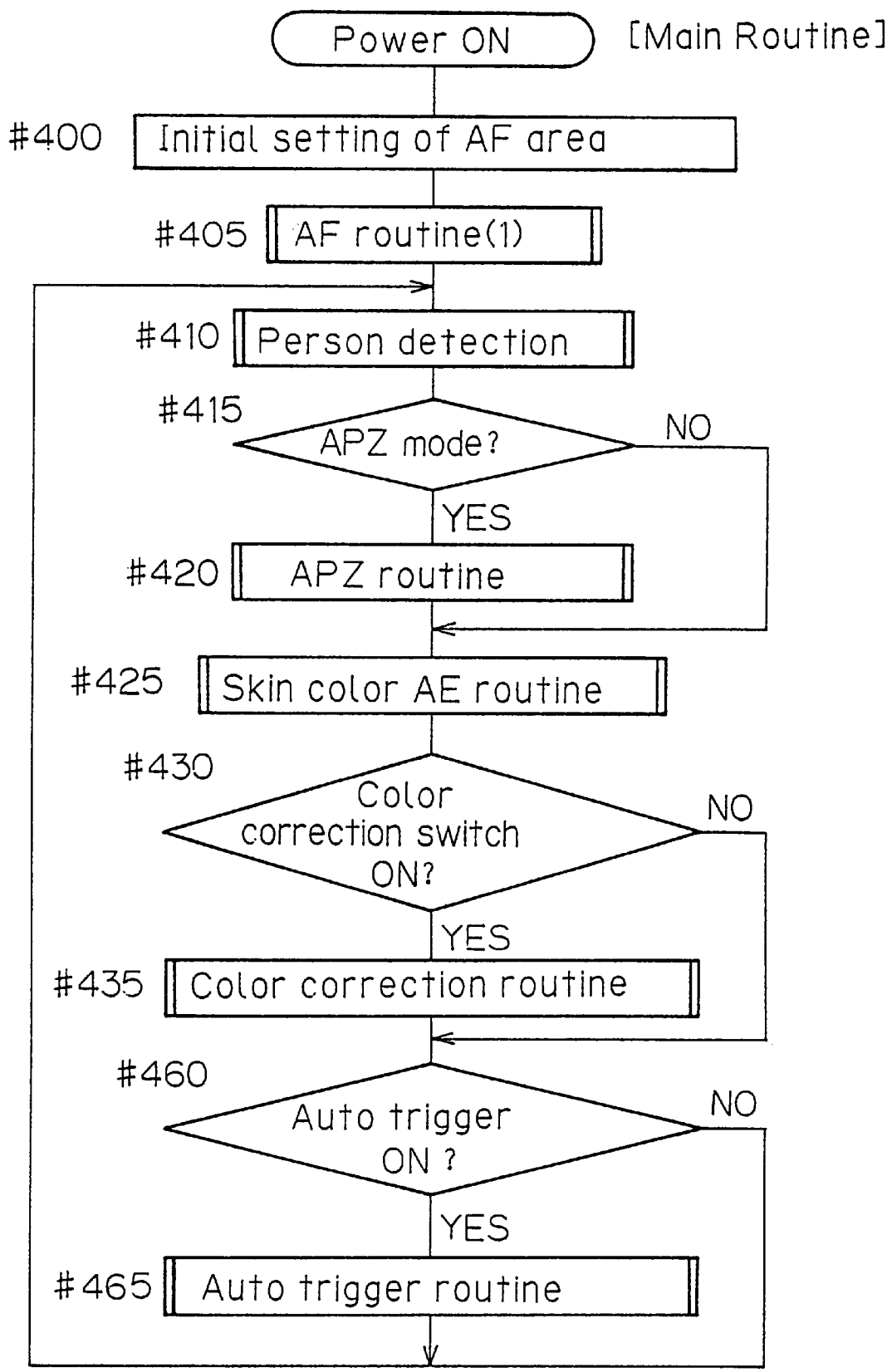
FIG. 24 is a flow chart of a main routine of the embodiment shown in FIG. 12A.

Next, a main routine shown in FIG. 24 will be described.

When the camera is activated, the initial setting of an AF area is performed at step #400. At the next step #405, a focusing operation is performed in the AF routine (1). Thereafter, a person is detected and a focusing operation is again performed in the person detection routine (described with reference to FIG. 16) at step #410. Then, the process proceeds to step #415, where whether or not an APZ mode has been set is determined. The APZ mode is set by an operation of the APZ switch. When the APZ mode has been set, driving direction and speed of the zoom lens are set so that the area of the skin-colored portion is constant in an APZ routine at step #420. The APZ routine is shown in FIG. 25.

Figure 25:
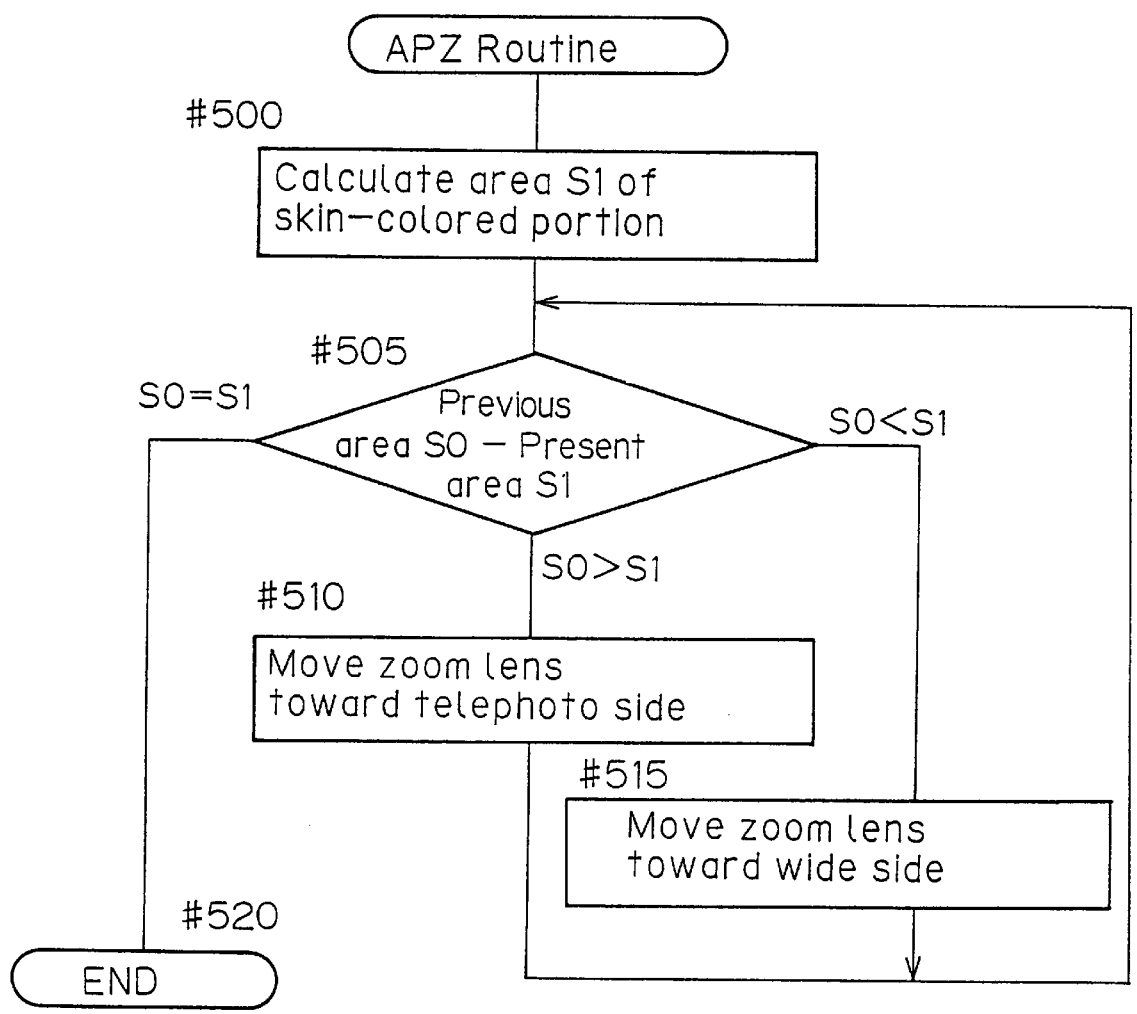
FIG. 25 is a flow chart of an A=Z routine.

In FIG. 25, first, a present area S1 of the skin-colored portion is calculated at step #500. Then, the present area S1 is compared with a previous area S0 at step #505. When S0>S1, the process proceeds to step #510, where the zoom lens is moved toward the telephoto side (longer focal length side). When S0<S1, the process proceeds to step #515, where the zoom lens is moved toward the wide side (shorter focal length side). In both cases, zooming is continued until S0=S1. When S0=S1, the process proceeds to step #520, and this routine is completed. Instead of the previous area S0, an area set by the user or an area set by the camera may be used as the area to be compared with the present area S1.

Figure 26:
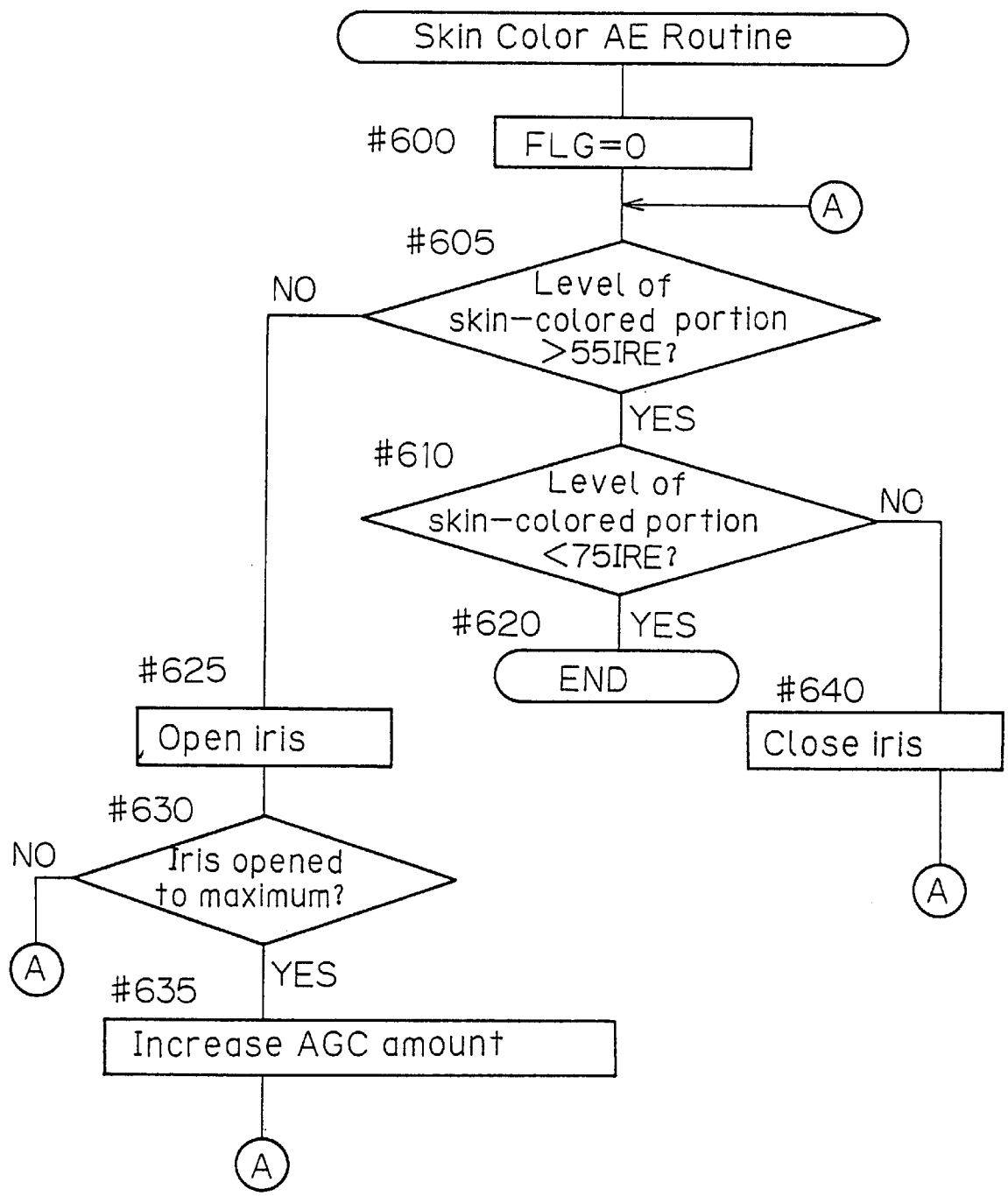
FIG. 26 is a flow chart of a skin-color AS routine.

Returning to FIG. 24, when the above-described APZ routine is completed at step #420, the process proceeds to the next step #425, where a skin color AE (automatic exposure) routine is executed. The skin color AE routine is shown in FIG. 26. When the skin color AE routine is called, first, the flag FLG for moving the lens 1 toward the near side is reset (FLG=0) at step #600. Then, whether or not the level of the skin-colored portion is equal to or higher than 55IRE is determined at step #605.

The level of the skin-colored portion is a level of a luminance signal, corresponding to a skin-colored portion, which, after gated by the splitting circuit 41, is averaged by the averaging circuit 42, A/D converted by the A/D converter 43 and inputted into the control microcomputer 21. When the level of the skin-colored portion is equal to or higher than 55IRE, whether or not it is equal to or lower than 75IRE is determined at step #610. When it is equal to or lower than 75IRE, the process proceeds to step #610, and this routine is completed. That is, since there is no problem when the level is between 55IRE and 75IRE, no correction is made.

However, when it is determined that the level is lower than 55IRE at step #605, since the picture is under-exposed, the iris 2 is opened by a predetermined amount at step #625. When the iris 2 is opened to the maximum as a result, since the exposure cannot be corrected any more by opening the iris 2, the amount of AGC is increased at step #635, and the process returns to step #605, and the flow from step #605 on is executed so that the level of the skin-colored portion is between 55IRE and 75IRE in the end. The increase of AGC amount at step #635 is performed by providing a signal representing an increase of gain as an AGC correction signal from the control microcomputer 21 to the AGC circuits 7, 8 and 9 through the D/A converter 45 and the adding circuit 46.

When it is determined that the level exceeds 75IRE at step #610, since the picture is over-exposed, the iris 2 is closed by a predetermined amount at step #640. Thereafter, the process returns to step #605, and the flow from step #605 on is executed so that the level of the skin-colored portion is between 55IRE and 75IRE in the end.

Returning to FIG. 24, when the above-described skin color AE routine is completed at step #425, whether or not the color correcting switch 50 is ON is determined at the next step #430. When it is ON, a color correction routine is executed at step #435. In the color correction routine, color reproduction of the selected skin-colored portion is corrected based on an operation of the color correction switch 50. To correct color reproduction, the control microcomputer 21 supplies the color reproduction correction data to the color reproduction correcting circuit 30 in synchronization with a signal representing a person detected by the person detection microcomputer 35. The color reproduction correcting circuit 30 changes the gain of the inputted signals R2, G2 and B2 so that a ratio of the signals based on the color reproduction correction data is obtained, and outputs signals R3, G3 and B3.

Figure 27:
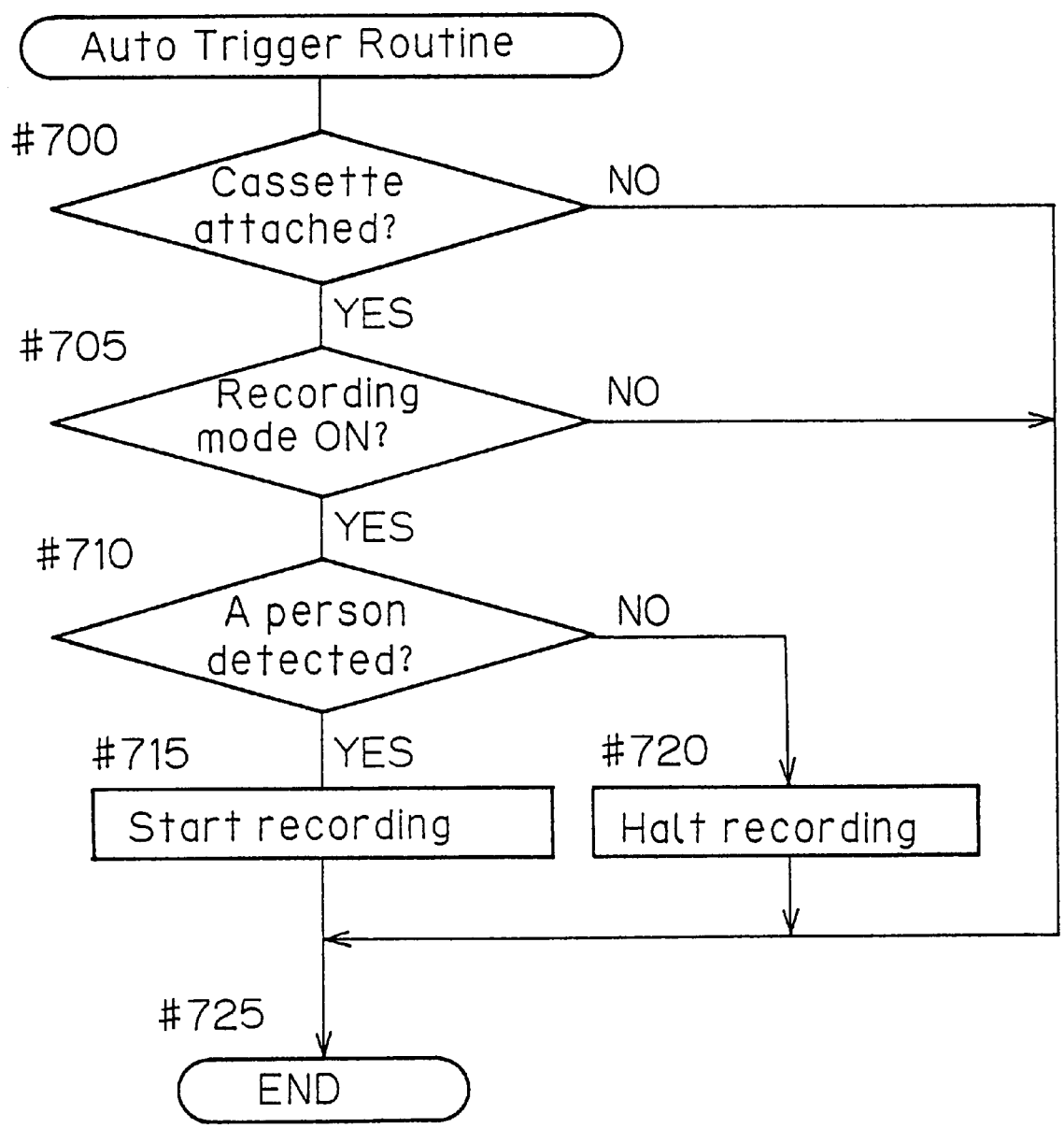
FIG. 27 is a flow chart of an auto trigger routine.

After the color reproduction correction routine is executed, the process proceeds to step #460, where whether or not the auto trigger is ON by the auto trigger switch 44 is determined. When the auto trigger is ON, after an auto trigger routine shown in FIG. 27 is executed at step #465, the process returns to step #410. When it is not ON, the process directly returns to step #410.

Now, the auto trigger routine will be described. In FIG. 27, first, whether or not a videocassette is attached to the deck portion 14 is determined at step #700. When it is not attached, the process proceeds to step #725, and this routine is completed. When it is attached, whether or not a recording mode has been set is determined at the next step #705. When the recording mode has not been set, this routine is completed at step #725. When the recording mode has been set, the process proceeds to step #710, where whether or not a person is detected is determined. When a person is detected, recording is performed at step #715, and the process proceeds to step #725. When no person is detected, recording is halted at step # 720, and the process proceeds to step #725. Since recording is performed only when a person is detected in the angle of view under a condition where a videocassette is attached and the recording mode is set and is automatically halted when the person is out of the angle of view, a chance of recording is never missed, and tape is hardly wasted.

Figure 28:
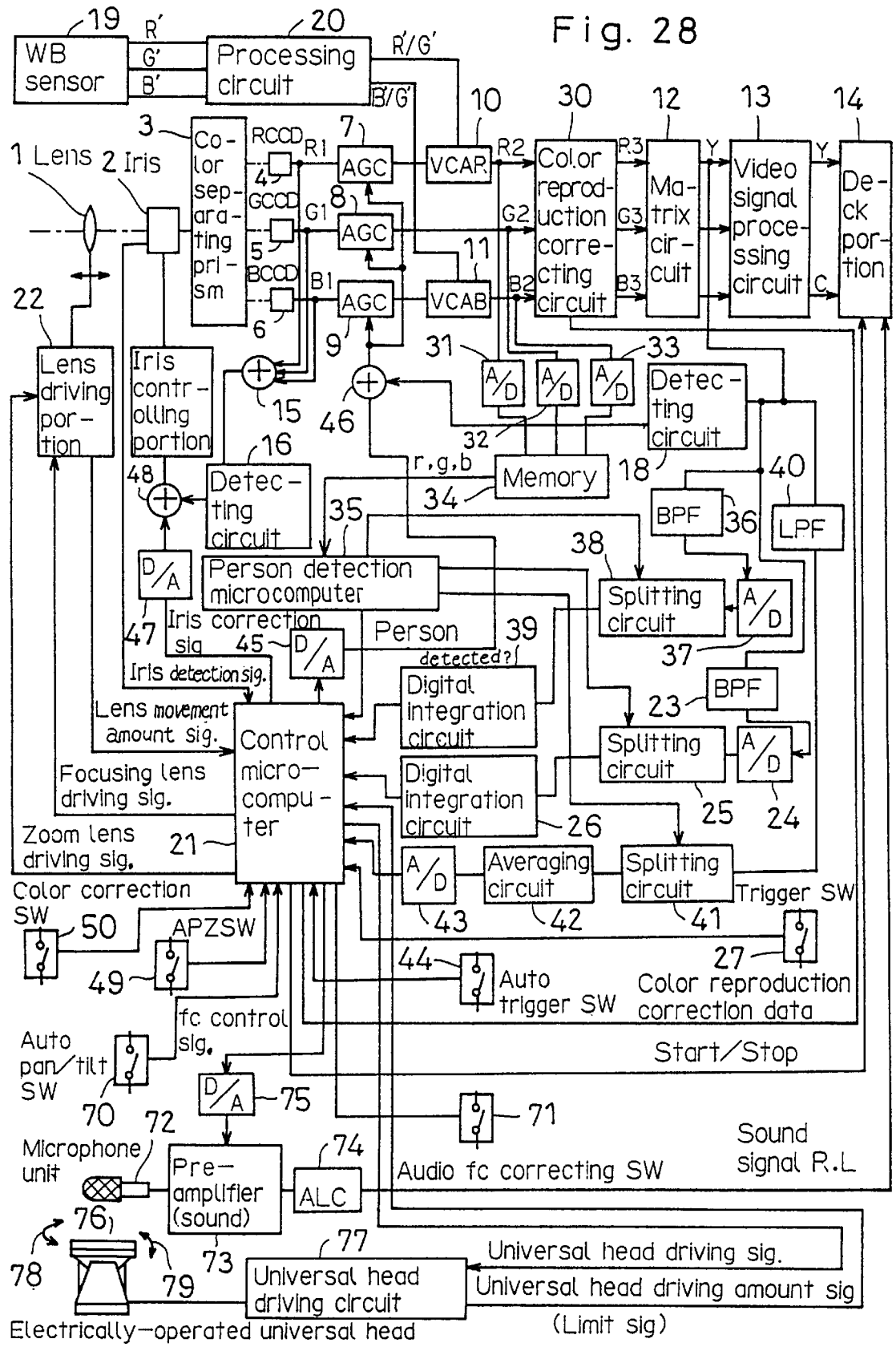
FIG. 28 is a block circuit diagram of a video camera in which another embodiment of the present invention is incorporated.

In the above-described embodiment shown in FIG. 12A, only a video system is shown and an audio system is omitted. In an embodiment shown in FIG. 28, an audio system is shown as well as a video system the same as that shown in FIG. 12A. In FIG. 28, an auto pan/tilt switch 70 is a switch for controlling an ON/OFF of auto pan/tilt. When it is ON, a universal head 76 is driven through a universal head driving circuit 77 by an electrically-operated universal head driving signal from the control microcomputer 21 to perform a panning/tilting. Arrows 78 and 79 show a movement of the universal head 76. A signal representing a movement amount of the universal head 76 is transmitted to the control microcomputer 21 through the universal head driving circuit 77. The control microcomputer 21 stops the universal head 76 based on the signal.

An audio fc correcting switch 71 is a switch for controlling an ON/OFF of frequency characteristic automatic control. When it is ON, frequency characteristic of a preamplifier 73 is controlled through a D/A converter 75 by a fc control signal from the control microcomputer 21, a sound signal from a microphone unit 72 is equalized. The equalized sound signal is transmitted to the deck portion 14 through an automatic level controlling circuit 74.

In the embodiment shown in FIG. 28, the controls performed in the embodiment shown in FIG. 12A are also performed. Omitting a description thereof, only the audio system which the embodiment shown in FIG. 12A does not have will hereinafter be described.

Figure 29:
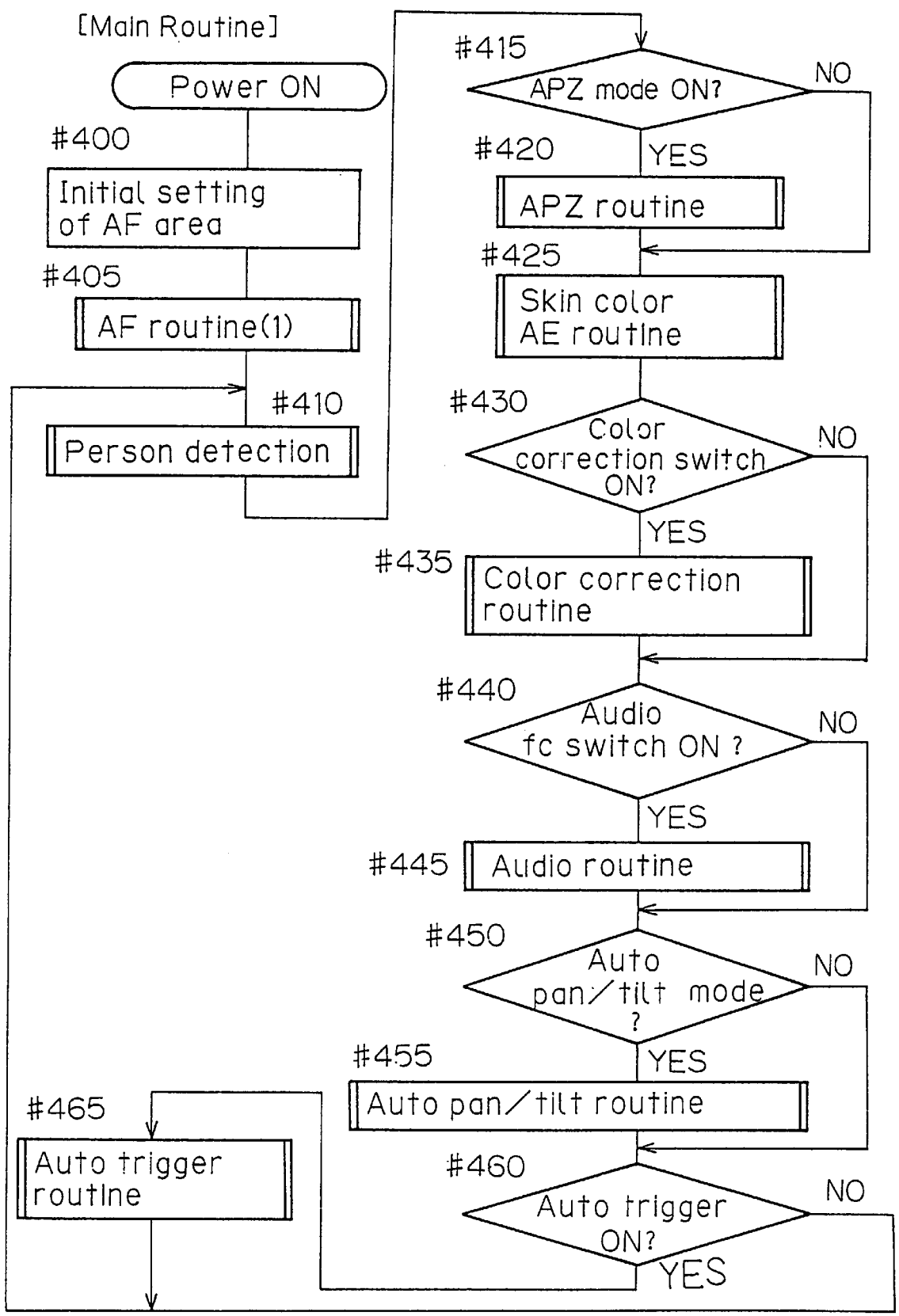
FIG. 29 is a flow chart of a main routine of the embodiment shown in FIG. 28.
Figure 30:
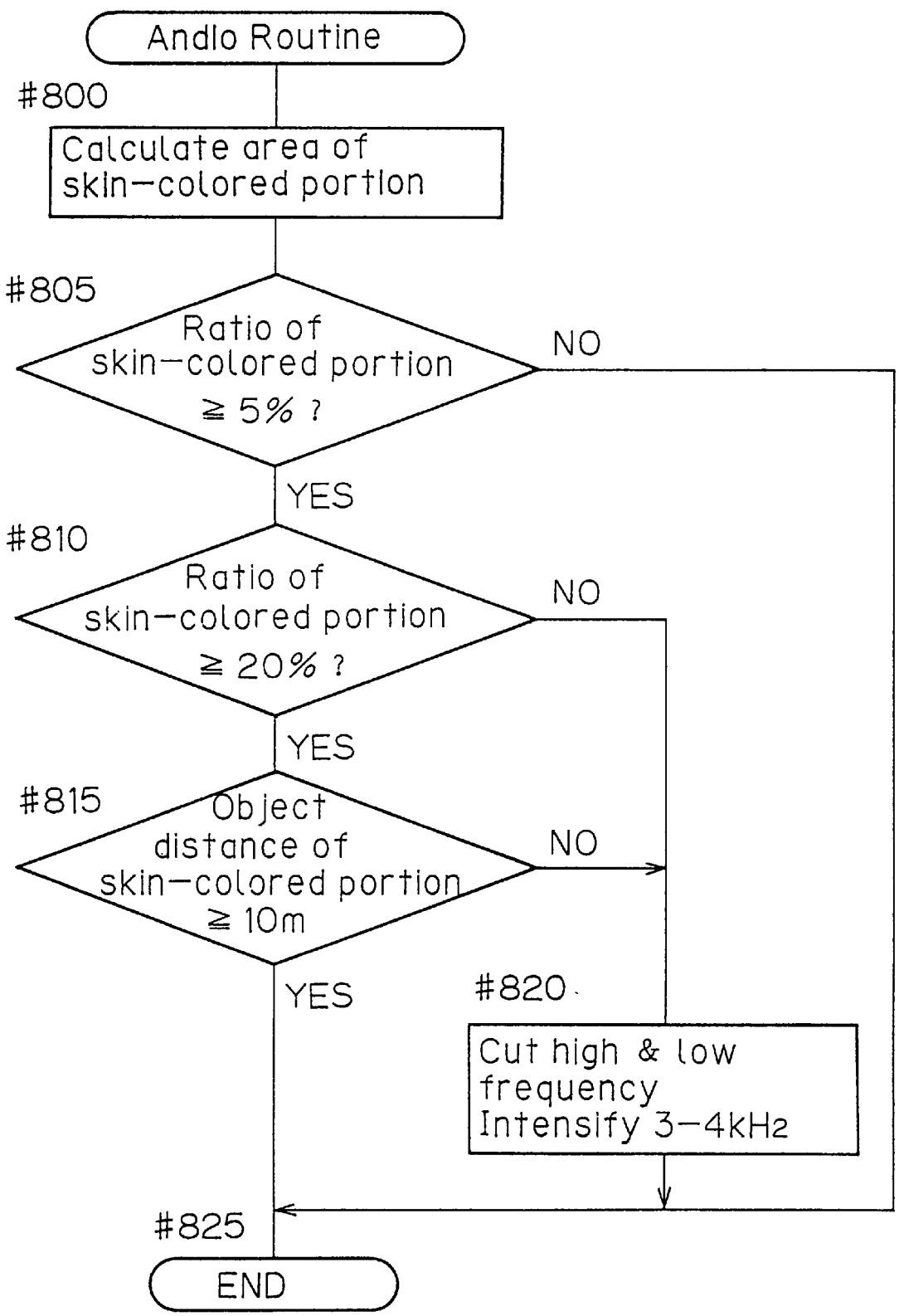
FIG. 30 is a flow chart of an audio routine.

In a flow chart of a main routine shown in FIG. 29, steps #400 to #435 have already been described with reference to FIG. 24. In FIG. 29, when the color correction routine at step #435 is completed, the process proceeds to step #440, where whether or not the audio fc correction switch 71 is ON is determined. When it is ON, an audio routine shown in FIG. 30 is executed at step #445 to control a voice band according to information on a person in the angle of view. When it is OFF, this routine is skipped.

Now, the audio routine will be described. In FIG. 30, first, a ratio of the number of picture elements of the skin-colored portion in the angle of view calculated in the above-described person detection routine to the total number of picture elements is calculated at step #800. Then, whether or not the ratio is equal to or higher than 5% is determined at step #805. When it is lower than 5%, the process proceeds to step #825, and this routine is completed. When it is equal to or higher than 5%, whether or not it is equal to or lower than 20% is determined at the next step #810. When it exceeds 20%, high frequency and low frequency components are cut at step #820, and after a frequency of 3 kHz to 4 kHz is intensified, the process proceeds to step #825.

When the ratio is equal to or lower than 20% (that is, between 5% and 20%), whether or not the object distance of the skin-colored portion is equal to or longer than 10 m is determined at step #815. When it is equal to or longer than 10 m, the process directly proceeds to step #825. When it is shorter than 10 m, after frequency characteristic is corrected at step #820, the process proceeds to step #825. As described above, in the audio routine, it is determined that a person is taken or there is a person near the object when the ratio of the number of picture elements in the skin-colored portion to the total number of picture elements is equal to or higher than 20% or when the ratio is between 5% and 20% and the object distance is shorter than 10 m, and the peak of frequency characteristic of the pre-amplifier 73 is set to 3 kHz to 4 kHz so that the voice of the person is recorded more clearly.

Figure 31:
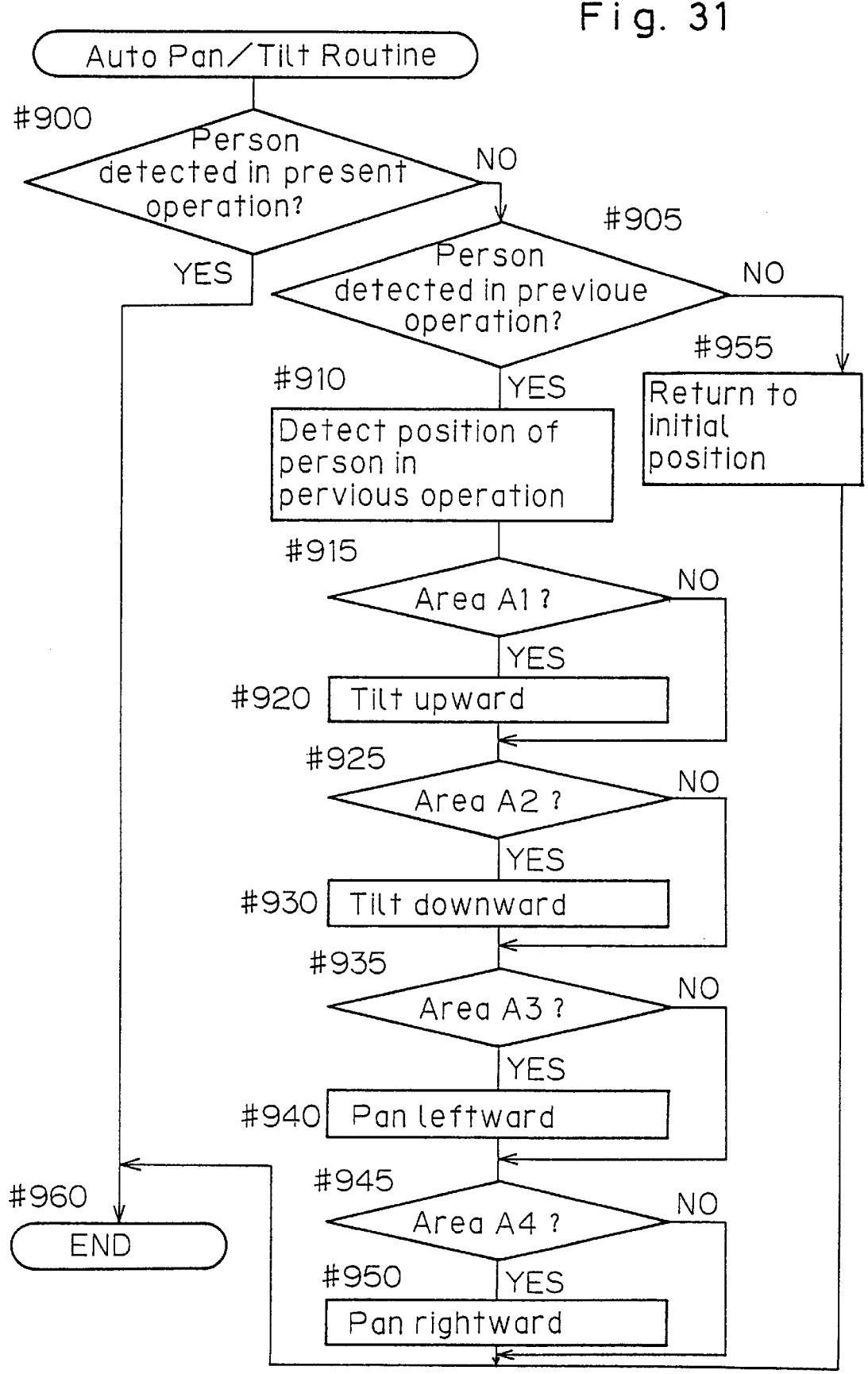
FIG. 31 is a flow chart of an auto pan/tilt routine.

Returning to FIG. 29, after the above-described audio routine is executed at step #445 or when it is determined that the audio fc switch 71 is not ON at step #440, whether or not an auto pan/tilt mode is ON is determined at step #450. When it is ON, an auto pan/tilt routine shown in FIG. 31 is executed at step #455.

Now, the auto pan/tilt routine shown in FIG. 31 will be described. In the auto pan/tilt routine, when a person is out of an angle of view, a panning/tilting motor is activated to follow the person. When the routine is called, first, whether or not a person is detected in the present operation is determined at step #900. When a person is detected, since there is a person in the angle of view and it is not required to follow the person, the process proceeds to step #960 with no operation executed, and this routine is completed. The determination of whether or not a person is detected is made based on the above-described person detection data.

Figure 32:
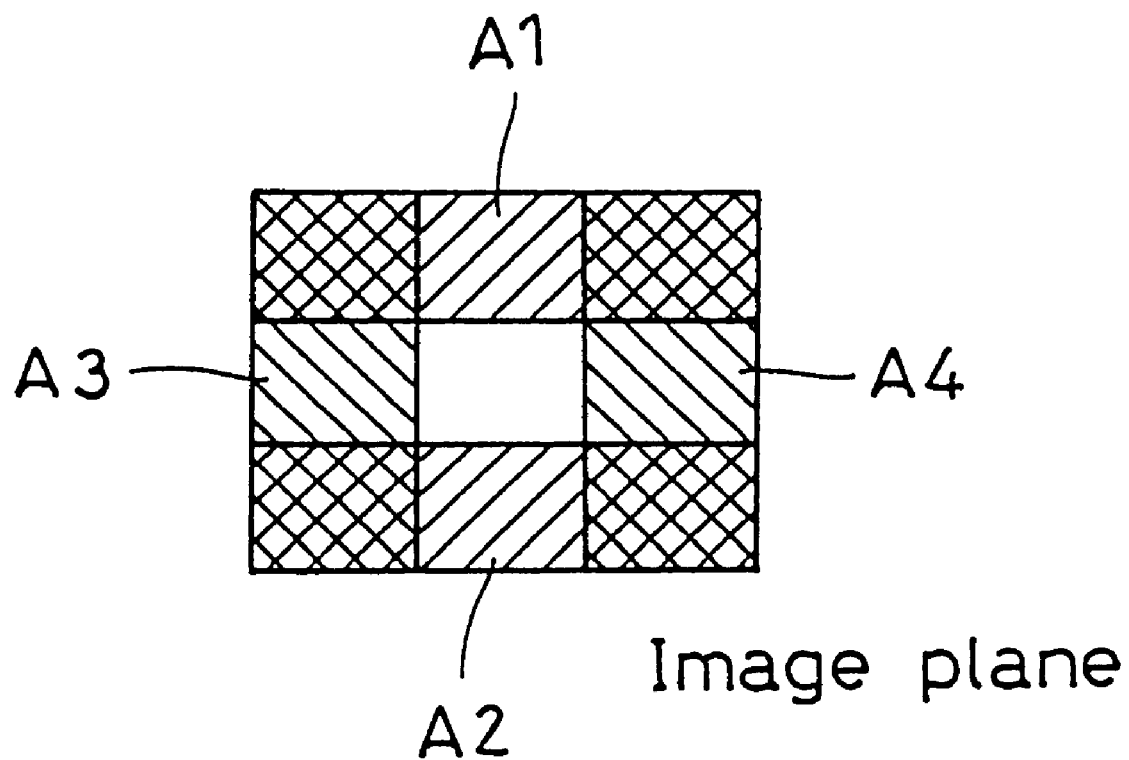
FIG. 32 is a explanatory view of FIG. 31.

When no person is detected in the present operation at step #900, the process proceeds to step #905, where whether or not a person was detected in the previous operation is determined. When no person was detected in the previous operation, since it is impossible to follow the person, after the universal head 76 is returned to an initial position at step #955, this routine is completed at step #960. When a person was detected in the previous operation, the position of the person in the previous operation is detected at step #910. As shown in FIG. 32, this embodiment is provided with four areas (areas A1 to A4). In which area the person was located is detected.

At steps #915, #925, #935 and #945, the detection of the position of the person is made in each of the areas A1 to A4. When the position is in the area A1, the universal head 76 is tilted upward (step #920), and when it is in the area A2, downward (step #930). When it is in the area A3, the universal head 76 is panned leftward (step #940), and when it is in the area A4, rightward (step #950).

Figure 33:
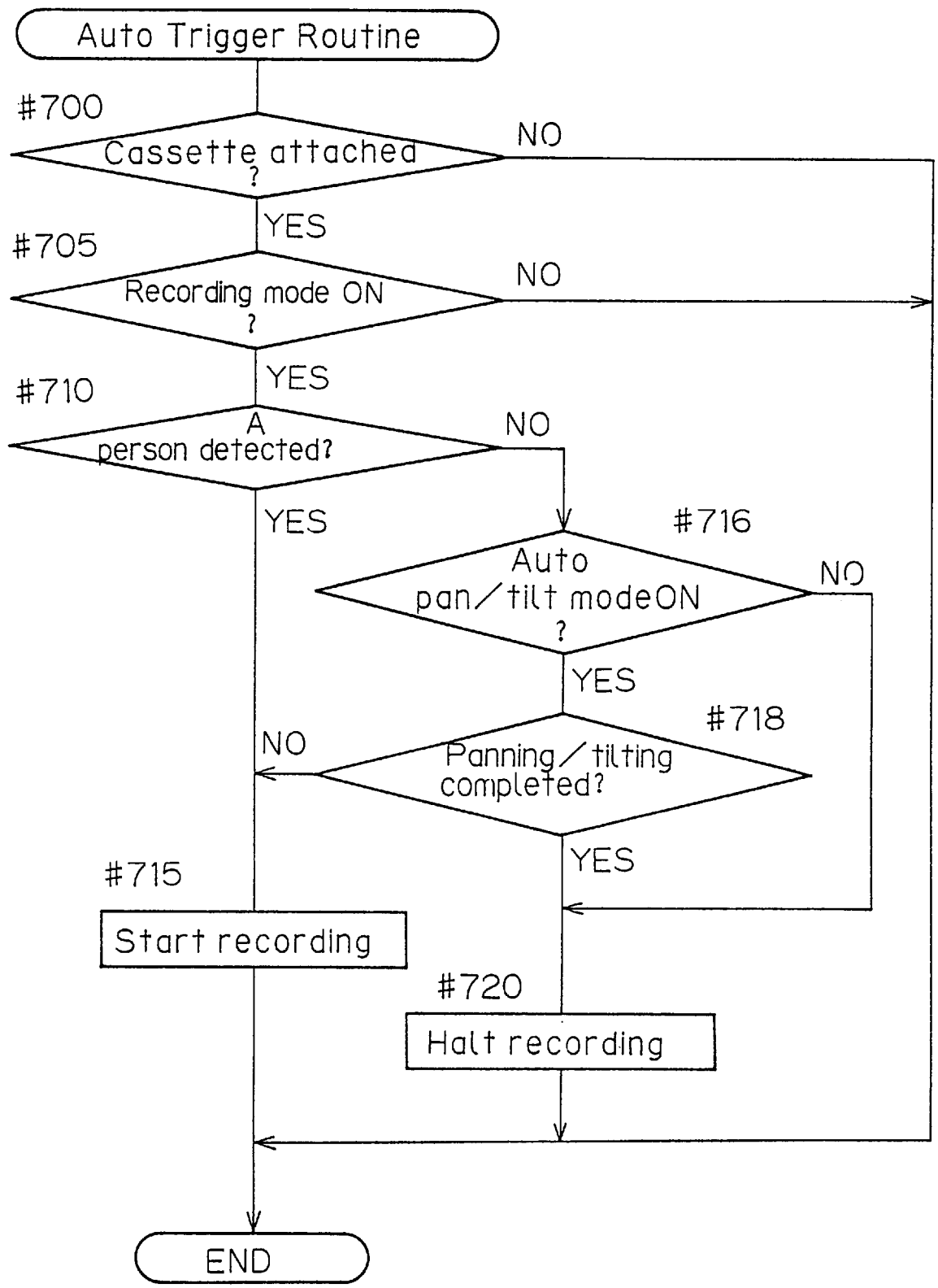
FIG. 33 is a flow chart of an auto trigger routine.

Returning to FIG. 29, after the auto pan/tilt routine is executed at step #455 or when it is determined that the auto pan/tilt mode is not ON at step #450, the process proceeds to step #460. The main routine shown in FIG. 24 also has steps #460 and #465. However, in the auto trigger routine of the main routine shown in FIG. 29, as shown in FIG. 33, when it is determined that there is no person at step #710, whether or not the auto pan/tilt mode is ON is determined at step #716. When the auto pan/tilt mode is not ON, recording is halted (step #720). When the auto pan/tilt mode is ON, whether or not an auto panning/tilting is completed is'determined (step #718). When it is completed, recording is halted. When it is not completed, recording is started (step #715).

Figure 34:
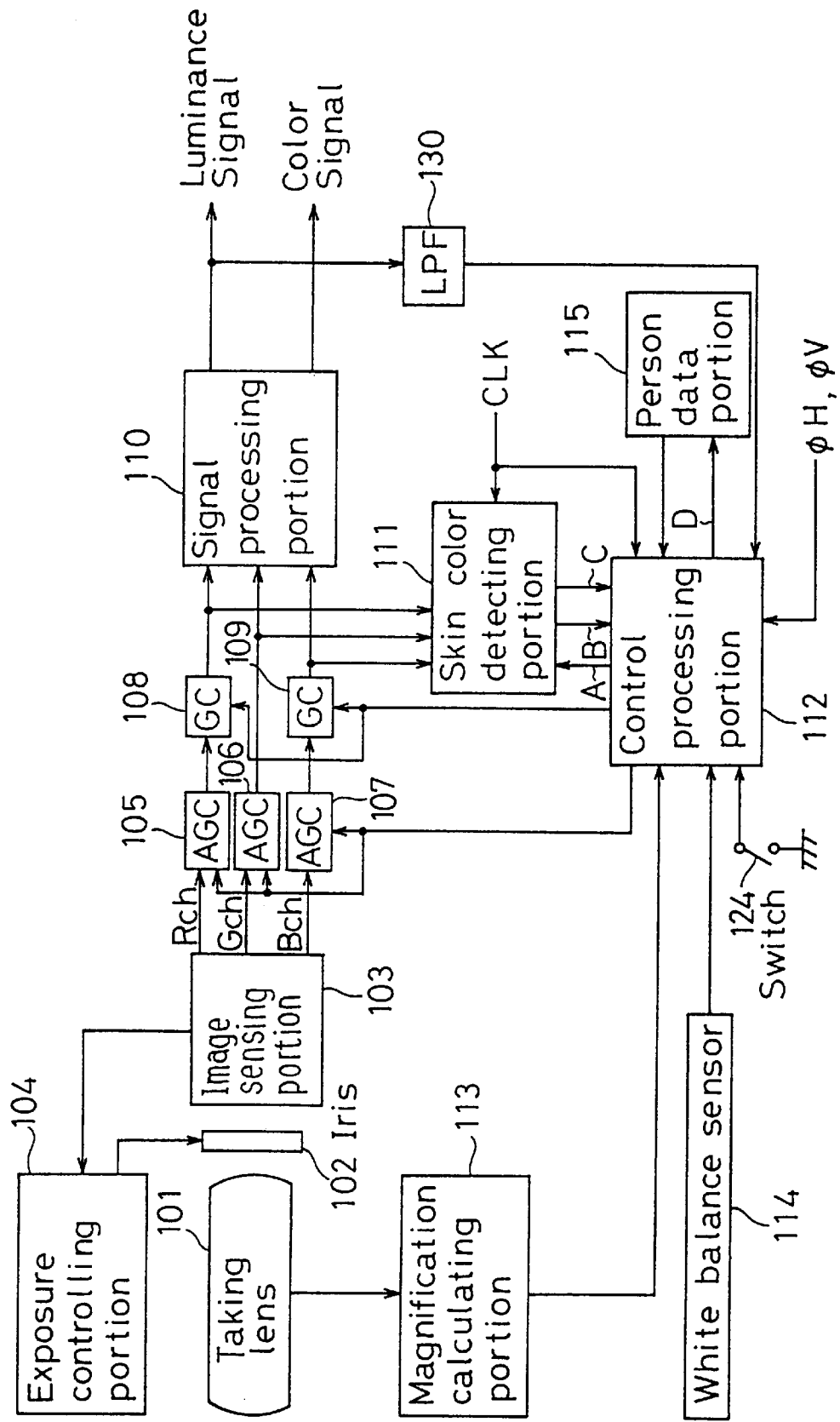
FIG. 34 is a block circuit diagram of a sixth embodiment of the present invention.

A sixth embodiment of the present invention will hereinafter be described. FIG. 34 is a block circuit diagram of a video camera in which a fifth embodiment of the present invention is incorporated. The numeral 101 is a taking lens, and the numeral 102 is an iris. The taking lens 101 outputs its zoom information and distance measurement information to a magnification calculating portion 113. The numeral 103 is an image sensing portion including an image sensor such as a CCD (charge couple device) and outputting red (R), green (G) and blue (B) signal components of images. The numeral 104 is an exposure controlling portion for detecting an average or a peak level of a video signal obtained by the image sensing portion 103 to control exposure by controlling the iris 102 so that the level of the video signal is constant.

The numerals 105, 106 and 107 are AGC (auto gain control) circuits which are gain-controlled by a control processing portion 112.

The numeral 108 and 109 are gain variable amplifiers, for white balance, inserted into a R channel and a B channel, respectively. The gain thereof is controlled through the control processing portion 112 based on color temperature information, of object lighting light, obtained by a white balance sensor 114 of external light type to realize a predetermined white balance. In this case, the control processing portion 112, which is provided with control data corresponding to color temperature information, outputs control data corresponding to the color temperature information provided by the white balance sensor 114 to the gain variable amplifiers 108 and 109. The control data are, after D/A (digital to analog)-converted, directed to the gain variable amplifiers 108 and 109.

The numeral 110 is a signal processing portion for producing a luminance signal Y by gamma-correcting and matrix-processing the inputted R, G and B signals and for producing and outputting a color signal CS. In this case, horizontal and vertical synchronizing signals are added to the luminance signal Y. The color signal CS is produced by balanced-modulating a color subcarrier (which is 3.58 MHz in NTSC (National Television System committee) standard) with signals R-Y and B-Y, and a color burst signal is added thereto. Part of the luminance signal Y outputted by the signal processing portion 110 is provided to a low-pass filter 130, and after its band is limited therein, the luminance signal Y is entered into the control processing portion 112.

When a low illumination state is detected from the level of the inputted luminance signal, the control processing portion 112 controls the AGC circuits 105, 106 and 107 so that the level becomes a predetermined level. This control is what is referred to as a normal exposure control in this specification, and is distinguished from a subsequently described exposure control where a main object is a person. In a person automatic exposure mode, the AGC circuits 105, 106 and 107 perform a predetermined operation according to a control signal from the control processing portion 112.

The numeral 111 is a skin color detecting portion for receiving the white-balanced signals R, G and B to produce skin color detection signals B and C. The skin color detecting portion 111 is provided with a clock CLK and receives an indicating signal A from the control processing portion 112. The skin color detection signal C is always outputted, whereas the skin color detecting signal B is outputted only when the indicating signal A is inputted. Both of the skin color detection signals B and C are provided to the control processing portion 112. The numeral 115 is a person data portion where person information is stored. When the control processing portion 112 outputs a request signal D, the person data portion 115 provides person data to the control processing portion 112.

The numeral 113 is a magnification calculating portion for calculating a magnification β. The magnification calculating portion 113 obtains a focal length f of the taking lens 1 from zoom information thereof, and a distance Ls from an object to a front principal point of the taking lens 101 from distance measurement information. The magnification calculating portion 113 also calculates the magnification β with the focal length f and distance Ls by β=f(Ls−f), and outputs it to the control processing portion 112. The numeral 124 is a manually-operated switch for setting the person automatic exposure mode. In response to a turning-on of the switch 124, the control processing portion 112 sets the person automatic exposure mode.

Figure 35:
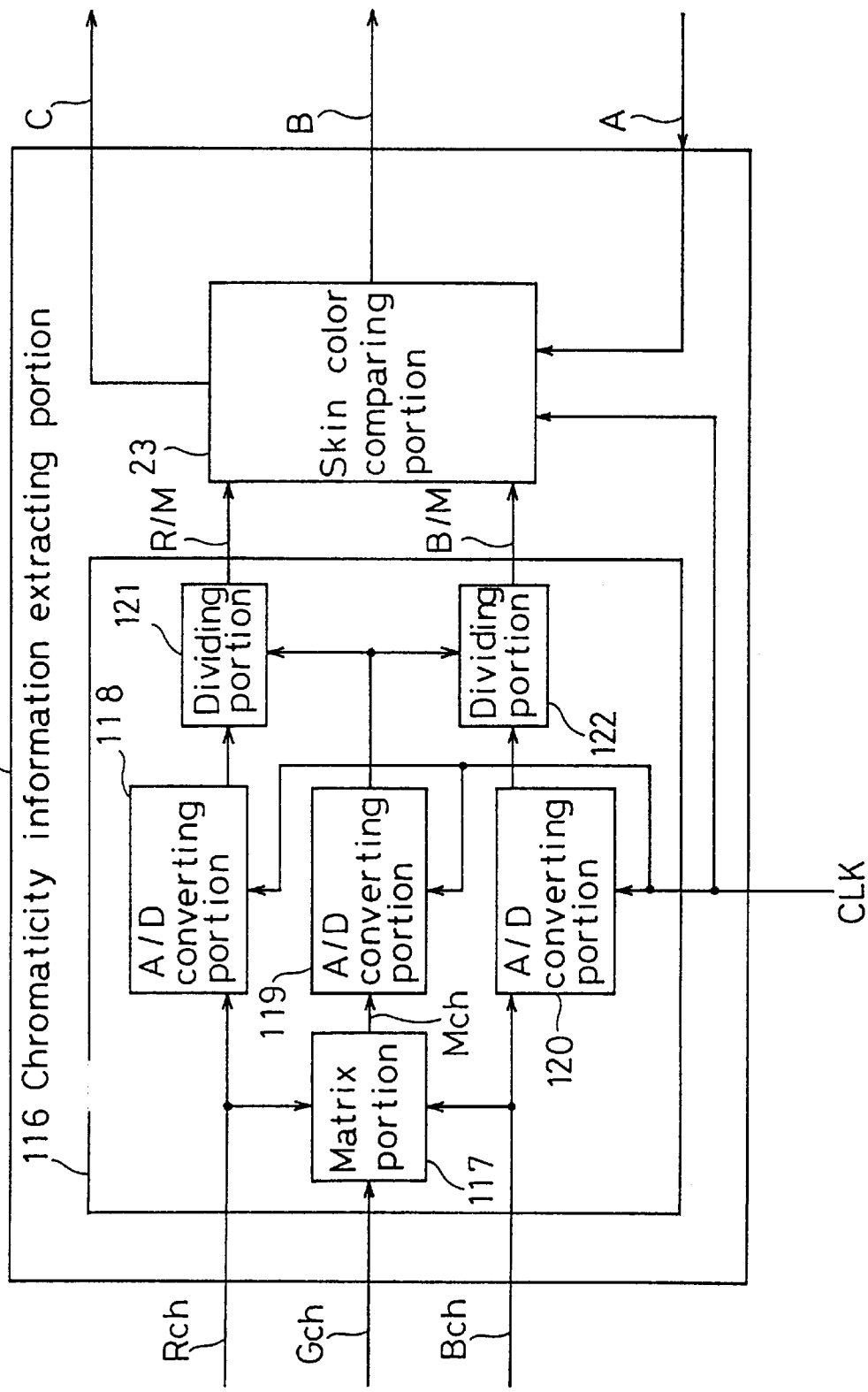
FIG. 35 a block diagram of a skin color detecting portion of the embodiment shown in FIG. 34.

The skin color detecting portion 111 is constructed as shown in FIG. 35. The numeral 116 is a chromaticity information extracting portion which extracts chromaticity information of an imaging video signal from each of the signals R, G and B and outputs it as quantized data. The output thereof is transmitted to a skin color comparing portion 123. The signals R, G and B are supplied to a matrix portion 117 and combined (mixed) by the following equation:

$$M=(R+1.8G+B)/3.8 \ (0 \leq M \leq 1: \text{normalized signal})$$

where M is a combined output signal of the matrix portion 117. The signals R, M and B are outputted to A/D (analog to digital) converting portions 118, 119 and 120, respectively, and are quantized by a period of a clock signal CLK (e.g. a color subcarrier in NTSC standard), having a frequency higher than that of horizontal synchronizing signal φH, which synchronizes horizontal and vertical synchronizing signals φH and φV. The quantized signals R, M and B are respectively provided to dividing portions 121 and 122, where a division result R/M signal where the R signal is a numerator and the M signal is a denominator and a division result B/M where the signal B is a numerator and the signal M is a denominator are obtained. Each of the A/D portions 118, 119 and 120 has, based on a theorem of sampling, band limiting means for preventing an reflected noise and a proper number of quantization bits. The dividing portions 121 and 122 may be constructed by the look-up table method where a memory is used, or they may be logical circuits.

A mixing ratio of the M signal (R:G:B=1:1.8:1), which is a value of U+V+W (representing a stimulus sum in the UVW colorimetric system) that is expressed with stimulus values of NTSC three primary colors R, G and B, is formally expressed as follows:

$$M=0.261R+0.469G+0.270B (0 \leq M \leq 1: \text{normalized signal}).$$

The ratio is used so as to give the dividing portions 121 and 122 the same construction.

Thus, when an image taking system constructed according to NTSC standard is used, the signals R/M and B/M enable a uniform quantization of a CIE (Commission Internationale de Elclairage) 1960UCS (uniform chromaticity scale) chromaticity diagram ((u, v) chromaticity diagram) or a CIE1976UCS chromaticity diagram ((u', v') chromaticity diagram), where the chromaticity information of an imaging video signal is a uniform perception chromaticity diagram, along a (G, R)-axis and a (G, B)-axis. The above quantization is shown in FIG. 36 (where the quantization bit of each of the signals R/M and BIM is 5 bits, and the (u', v') chromaticity diagram is used).

Since the quantization method enables a uniform processing of a quantization noise of human's chromaticity perception within an extraction range of chromaticity information, when the minimum quantization bit number is considered, data on a difference of chromaticity of skin color among people and a distinction between the chromaticity of skin color and those of other colors can be processed corresponding to the human's chromaticity perception.

The signals R/M and B/M of the chromaticity information extracting portion 116 are transmitted to the skin color comparing portion 123. The skin color comparing portion 123, which is provided with various skin color data, compares the inputted chromaticity information signals RIM and B/M with the skin color data to detect an existence of skin color in an imaging video signal. The detection result is outputted as skin color detection signals B and C. When skin color is detected, the skin color detection signal C is immediately transmitted to the control processing portion 112.

Figure 37A:
FIGS. 37A and 37B show a skin color pattern stored as a person.
Figure 37B:
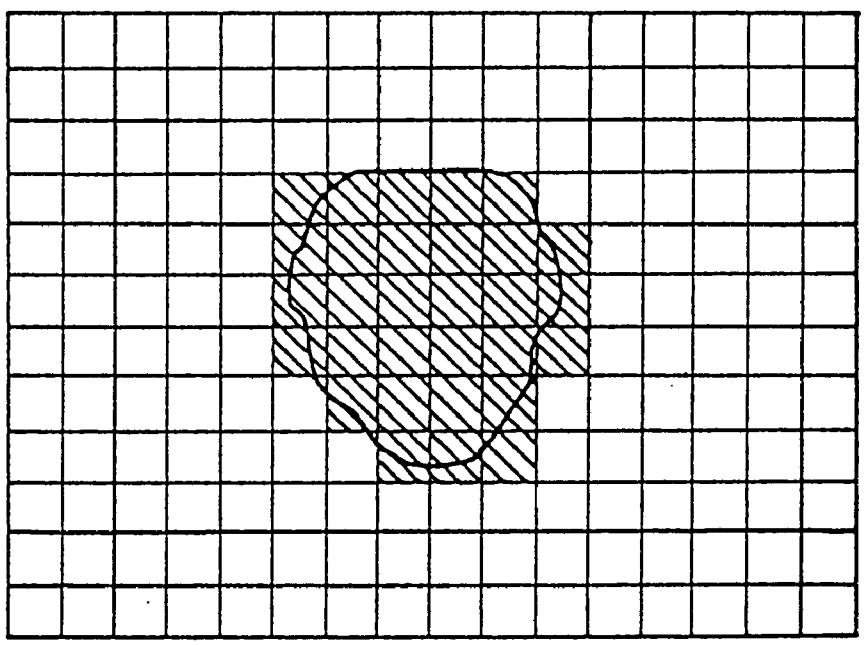

The control processing portion 112 has a memory (e.g. a memory of field memory structure), and after outputting the indicating signal A to the skin color comparing portion 123, it receives the skin color detection signal B from the skin color comparing portion 123 every period of the clock signal CLK to obtain with the horizontal and vertical signals φH and φV a field of pattern (referred to as skin color pattern) showing a position of a skin color chromaticity corresponding to a picture image. FIG. 37A shows a picture of a person, and FIG. 37B shows a skin color pattern stored in the memory with the above-described operation. In the pattern in FIG. 37B, skin color is shown by oblique lines, and other colors, by white picture elements.

The skin color detection signal B is provided to the memory as follows. The control processing portion 112 determines the skin color detection signal C at a timing, and outputs the indicating signal A to the skin color comparing portion 123 only when skin color is detected. Then, the skin color comparing portion 123 outputs the skin color signal B corresponding to the next field duration to the control processing portion 112 when it receives the indicating signal A, and the memory of the control processing portion 112 stores a field of the skin color signal B.

The person data portion 115 is provided with n sets of data corresponding to an area S of a person's face and a circularity K (referred to as person data H) as a parameter showing a feature of the person's face. The control processing portion 112 outputs an indicating signal D to the person data portion 115. According to the indicating signal D, the person data portion 115 outputs the person data H in sequence or outputs the data indicated by the signal D to the control processing portion 112.

Now, the circularity K will be described. The circularity is a coefficient of scale for expressing a complexity of shape of a figure, and is defined in the present embodiment as $$K=L^2/S (K \geq 4\pi),$$

where S is an area of a figure and L is a girth of the figure.

For example, the circularity of a circle is 47 (the minimum value), and that of a square is 16. The more complicated the shape of a figure is, the higher the value of the circularity is. The circularity K of a person' face (skin-colored portion) is relatively small since the shape of a person's face is circular and simple. Thus, the circularity K enables a distinction between a person and an object which has a chromaticity the same as that of human skin color.

The control processing portion 112 determines, from a skin color pattern, the magnification β and the person data H obtained by skin color detection signal B in a field, whether or not the skin-colored portion of the skin color pattern represents a person. When it determines that the portion represents a person, the control processing portion 112 controls the AGC circuits 105, 106 and 107 so that an average level of the luminance signal Y of the skin-colored portion becomes 65IRE. When it determines that the portion does not represent a person (that is, that the portion represents the background), the control processing portion 112 controls the AGC circuits 105, 106 and 107 as it has been controlling them.

Control operations of the control processing portion 112 of the present invention will hereinafter be described.

First, a determination of whether or not a skin-colored portion in a skin color pattern represent a person will be described with reference to the flow charts shown in FIGS. 38A and 38B. In the determination, assuming that there are plural skin-colored portions in the skin color pattern, whether or not there is a skin-colored portion corresponding to a face among them is determined. When the flow is called, first, whether the switch 124 is ON or OFF is determined at step S5 to determine whether or not the person automatic exposure mode is ON. When the switch 124 is OFF, the process proceeds to step S55, where a normal automatic exposure process is executed. When it is ON, an exposure process in the person automatic exposure mode from step S10 on is executed.

At step S10, the skin color detection signal C of the skin color comparing portion 123 is examined to determine whether or not there is a skin-colored portion. When there is no skin-colored portion, the process proceeds to step S55, where the normal exposure process is executed. When there is a skin-colored portion, a present magnification $\beta$ is provided from the magnification calculating portion 113 at step S15. At the next step S20, whether or not a previously received magnification $\beta$ is within a range of between $\beta1$ and $\beta2$ ($\beta1<\beta2$) is determined. $\beta1$ is a threshold constant by which it is determined that the background is being shot even if the object is a person when the size of the person's face is equal to or smaller than a predetermined value in a picture size of an image taking apparatus. $\beta2$ is a threshold constant at which the size of a person's face starts to unnaturally increase in a picture size.

When the magnification $\beta$ is not within the range of between $\beta1$ and $\beta2$, determining that the main object is the background, the process proceeds to step S55. When it is within the range of between $\beta1$ and $\beta2$, the process proceeds to step S25, where the indicating signal A is outputted to the skin color comparing portion 123 to obtain the skin color detection signal B. Then, at step S30, the skin color detection signal B is provided into the memory (field memory) of the control processing portion 112 from the skin color comparing portion 123, and is made into a skin color pattern.

At the next step S35, the skin color pattern is contraction/expansion-image-processed. The contraction-/expansion image processing, which is referred in "Image Processing Apparatuses and Usage Thereof" by Youji Marutani, published by Nikkan Kogyo Shinbunsha, is a process for converting a projected portion or an acute portion of a skin-colored portion in a skin color pattern into a portion having a relatively smooth outline. For example, when a skin color extraction is performed under a condition where hair is hanging over the forehead, a projected portion corresponding to the hair is detected in the skin-colored portion. Then, to convert the skin-colored portion having a complicated shape into a relatively simple shape, the projected portion is removed, so that the detection accuracy with respect to the face improves. This process is repeated until an optimal shape is obtained. Moreover, since extremely small skin-colored portions disappear in this process, a fewer number of comparisons with the person data H are required in a postprocessing.

After the process at step S35 is executed, the process proceeds to step S40, where a skin-colored portion has not been labeling-image-processed is selected (when there are plural portions, the portion located closer to the center of an image plane is selected) among the plural skin-colored portions in the skin color pattern. To select the portion located closer to the center is because when a main object is a person, a probability is high that the face of the person is located in the center of an image plane. At the next step S45, whether or not there is a skin-colored portion which can be selected at the previous step S40 is determined. When a result of the determination is YES, the process proceeds to step S50, and when it is NO, determining that the object is the background, the process proceeds to the above-described step S55.

At step S50, the skin-colored portion selected at step S40 is labeling-image-processed. The labeling image processing is a process where linked picture elements are labeled with the same number and different group of linked picture elements are labeled with different numbers to distinguish plural groups of linked picture elements from one another. A number N of picture elements constituting the skin-colored portion is simultaneously calculated. The number N of picture elements corresponds to the area of the skin-colored portion.

Figure 38A:
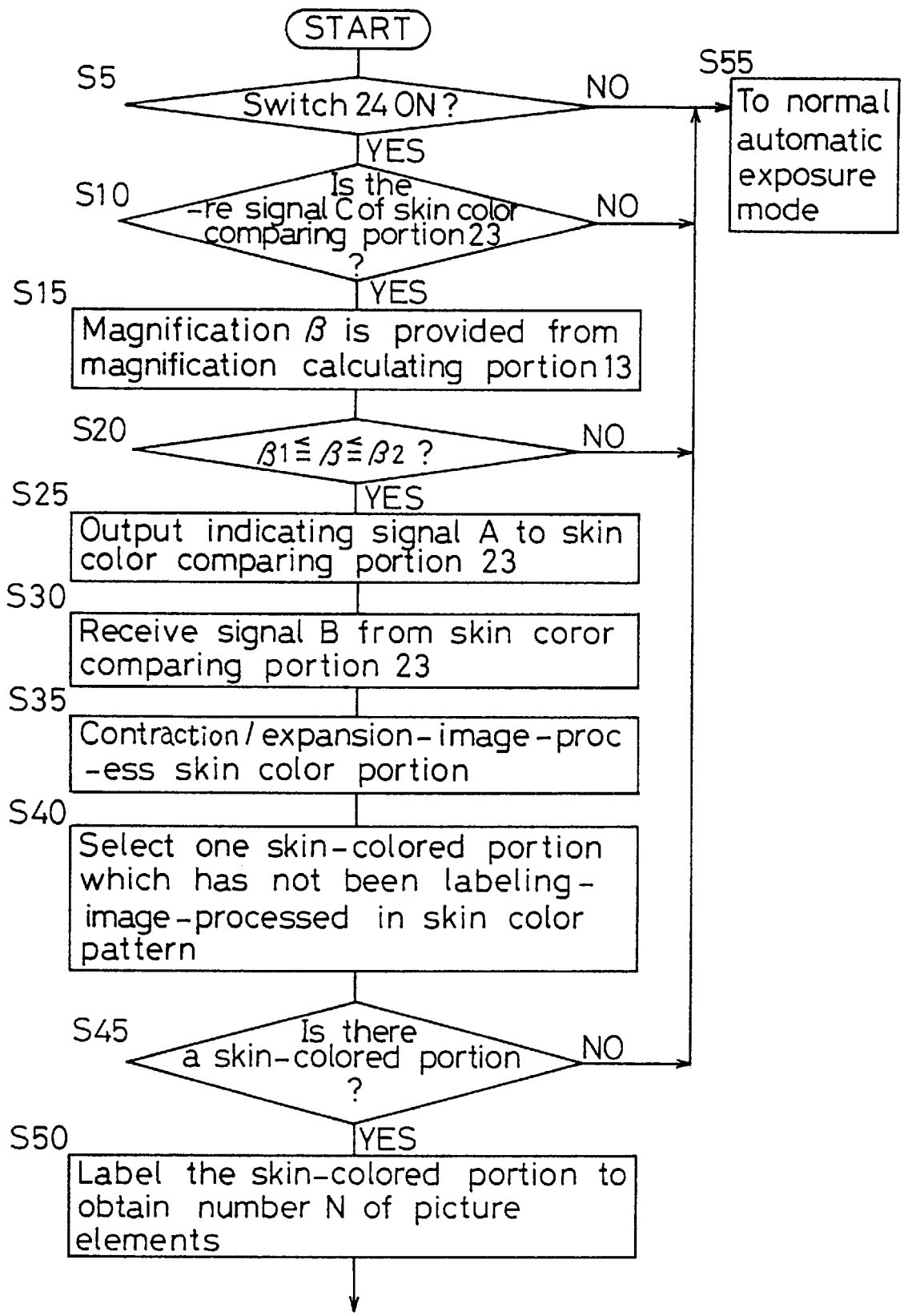
FIGS. 38A and 38B show a flow chart of a person detection-flow of the embodiment in FIG. 34.
Figure 38B:
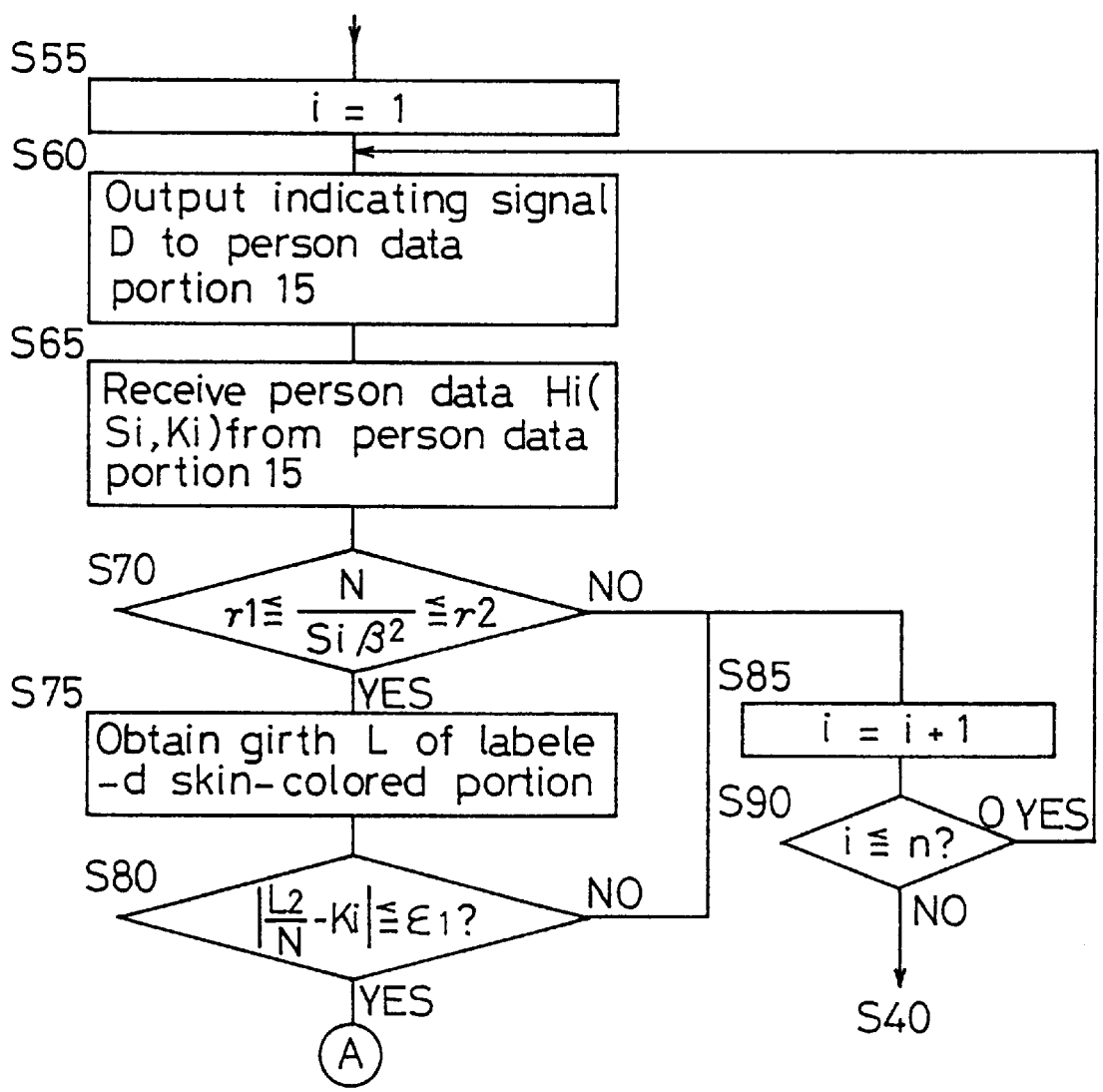

Then, the process proceeds to step S55 in FIG. 38A. At step S55, letting a variable for selecting a specific set of data among the n sets of person data be a variable i, a process for selecting a first set of data (referred to as Hi) is executed. Then, the indicating signal D including a variable i=1 is outputted to the person data portion 115 at the next step S60, and the person data Hi (Si, Ki) corresponding to the variable i=1 is provided from the person data portion 115 at step S65.

Thereafter, at step S70, $N/(Si \cdot \beta^2)$ is calculated and whether or not a result thereof is within a range of between $\gamma1$ and $\gamma2$ is determined. N is the number of picture elements and Si is person data. The process at step S70 is for determining whether the skin-colored portion is a person or the background by comparing a number N of picture elements of the skin-colored portion (corresponding to the area of the skin-colored portion) with an area $Si \cdot \beta^2$, of a person's face on the CCD, obtained by multiplying an area magnification $\beta^2$ at a present magnification $\beta$ by an area Si of a person's face.

When $N/(Si \cdot \beta^2)$ is not within the range of between $\gamma1$ and $\gamma2$, after incrementing the person data variable i by 1 at step S85, the process proceeds to step S90, and when the person data variable data i is equal to or smaller than the number n of sets of the person data, the process returns to step S60. When the person data variable data i is larger than the number n, the process returns to step S40. When $N/(Si \cdot \beta^2)$ is within the range of between $\gamma1$ and $\gamma2$ at step S70, the process proceeds to step S75, where the girth L of the skin-colored portion having been labeling-image-processed at step S50 is obtained. Data corresponding to the girth L are obtained by counting the number of picture elements constituting the outline of the skin-colored portion. Since a length represented by an outline picture element differs according to a manner in which the picture elements line, correction is made according to the manner.

Figure 39:
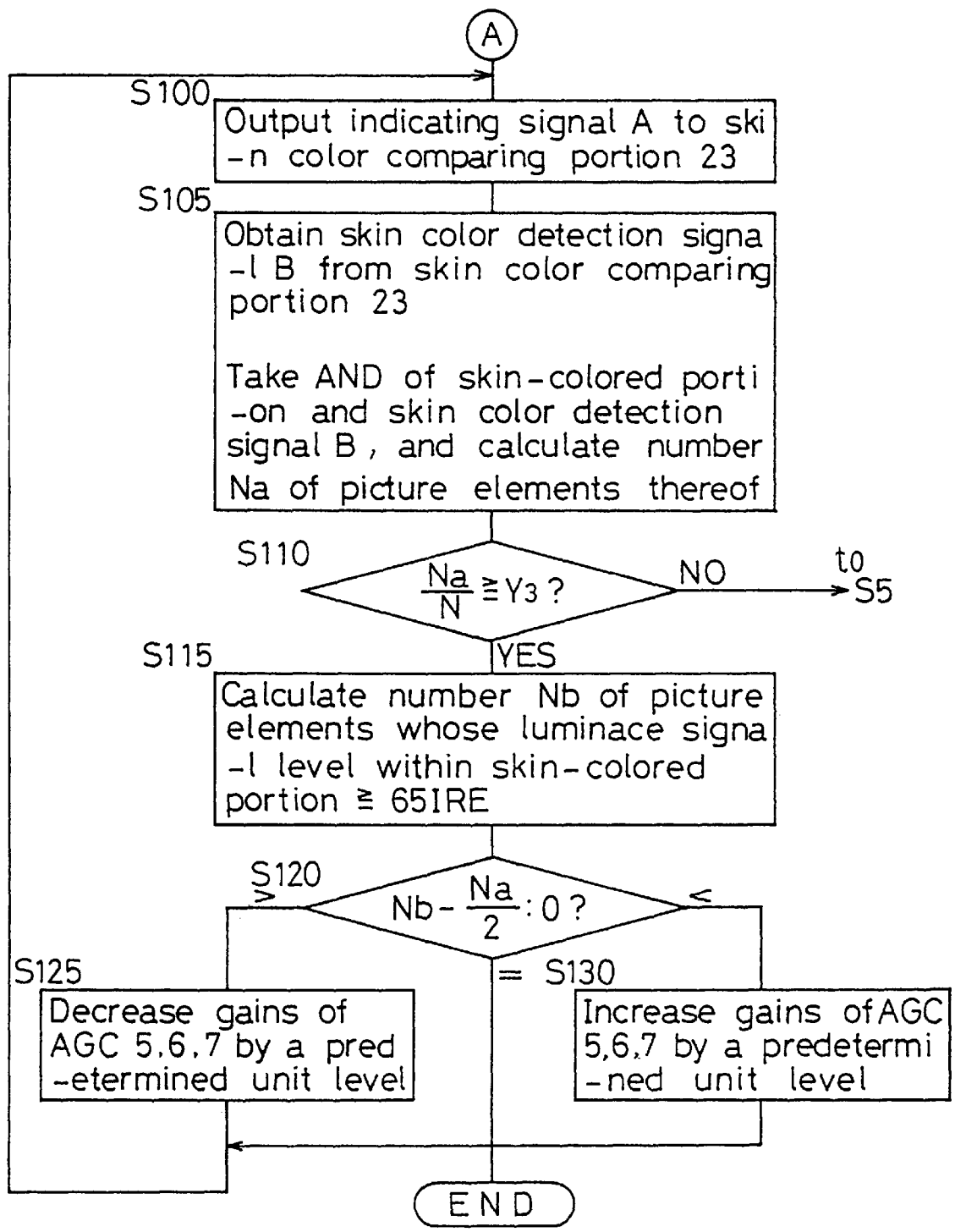
FIG. 39 is a flow chart of an exposure control of the embodiment in FIG. 34.

At the next step S80, $|L^2/N-Ki|$ (where N is the number of picture elements, Ki is person data and L is a girth) is calculated to determine whether or not it is equal to or smaller than a predetermined error $\epsilon1$. The process at step S80 is for determining whether or not the skin-colored portion is a person or the background by comparing a circularity $L^2/N$ of the skin-colored portion with a circularity Ki of a person's face. When the result of the determination is NO, the process proceeds to the above-described step S85. When it is YES, the process proceeds to step S100 in FIG. 39. When it is YES, it is determined that the main object is a person.

A person detection is performed in the above-described manner. Next, an exposure controlling method when the main object is a person is described with reference to FIG. 39. First, at step S100, the indicating signal A is outputted to the skin color comparing portion 123 to obtain the skin color detection signal B, and the process proceeds to the next step S105.

At step S105, the skin color detection signal B is obtained from the skin color comparing portion 123, and an AND of the signal B and the skin-colored portion which is determined to be a person's face in the above-described process is taken to calculate the number Na of picture elements of the result thereof. The reason why this process is executed is: since some time is required to make the determination whether or not the skin-colored portion is a person, a latest skin color detection signal B is obtained and an AND signal of the signal B and the skin-colored portion which is determined to be a person is regarded as a present skin-colored portion. After the process at step S105 is completed, the process proceeds to step S110, where a ratio Na/N of the number N of picture elements of the skin-colored portion obtained at step S50 to the number Na of picture elements obtained at step S105 is obtained, and is compared with a predetermined value $\gamma 3$.

Figure 40:
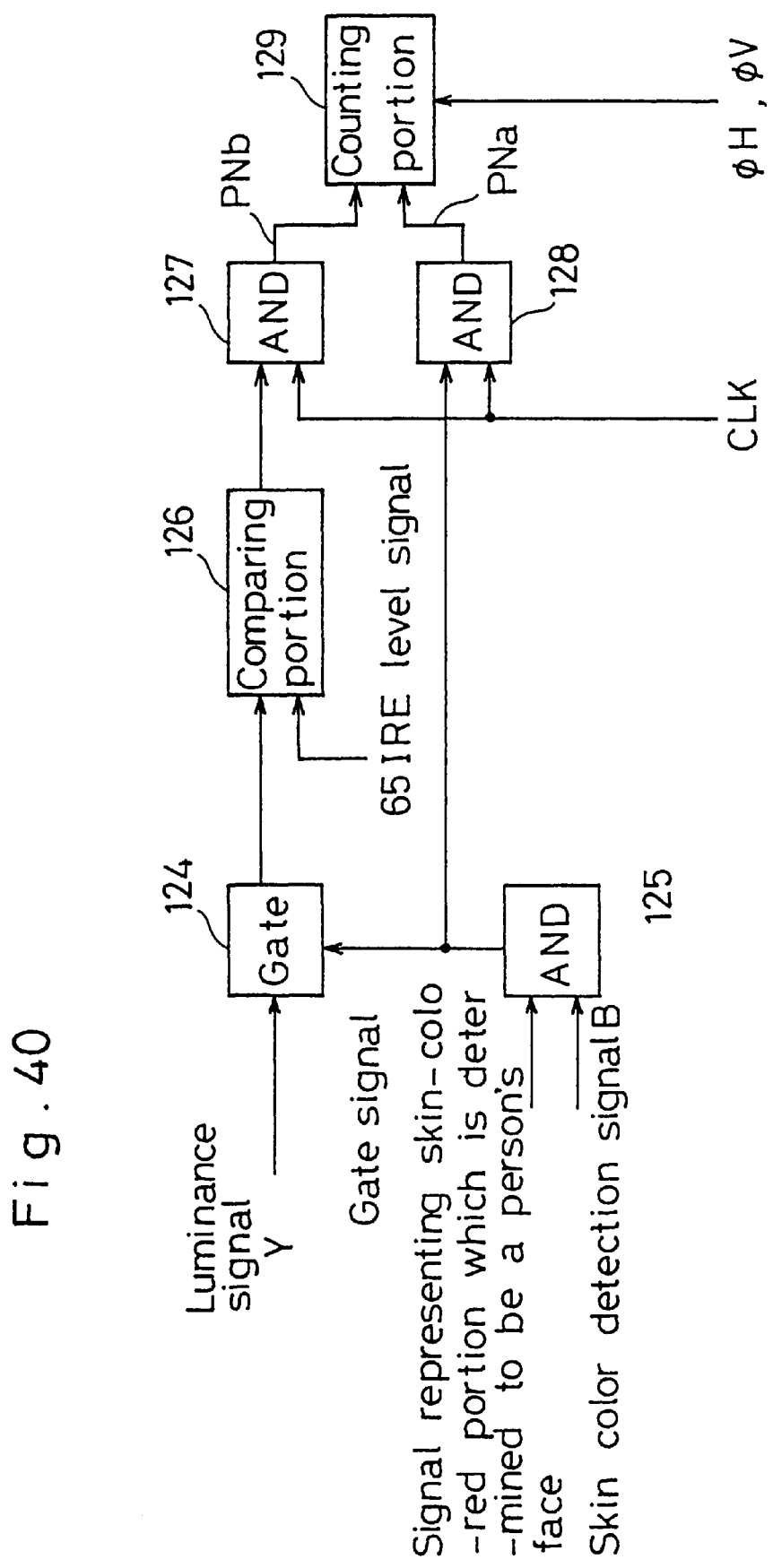
FIG. 40 is an explanatory view of the flow chart shown in FIG. 39.

When Na/N is smaller than $\gamma 3$, determining that the main object or a shooting condition has changed, the process returns to step S5. When Na/N is equal to or larger than $\gamma 3$, the process proceeds to step S115, where a number Nb of picture elements whose luminance signal level within the skin-colored portion is equal to or higher than 65IRE is calculated. This will be explained with reference to FIG. 40. Only a period, corresponding to a gate signal, of the luminance signal Y outputted to the control processing portion 112 is outputted to a comparing portion 126 through a gate 124. The gate signal is an AND signal obtained by an AND of a signal representing the skin-colored portion which is determined to be a person's face and the skin color detection signal B at an AND circuit 125. That is, the gate signal represents a present skin-colored portion. The gate signal is changed into a picture element signal pulse PNa of the skin-colored portion by taking an AND with the clock CLK at an AND circuit 128.

At the comparing portion 126, a signal level of an input luminance signal Y is compared with that of a reference luminance signal, and when the level of the luminance signal level Y is equal to or higher than that of the reference luminance signal level, the comparing portion 126 outputs a comparing output signal to an AND circuit 127. At the AND circuit 127, a picture element signal pulse PNb whose luminance signal Y level is equal to or higher than the reference luminance signal level is obtained by taking an AND of the output signal from the comparing portion 126 and the clock signal CLK. According to a result of a research on television systems, an appropriate reproduction luminance level of the skin color of a person is approximately 60IRE to 70IRE. In this embodiment, the reproduction luminance level is 65IRE.

The numeral 129 is a counting portion for counting the signal pulses PNa and PNb from the AND circuits 128 and 127. The counting portion 129 outputs the counted values Na and Nb of a field of the signal pulses PNa and PNb.

Returning to FIG. 39, when the process at the above-described step S115 is completed, at the next step S120, Nb−Na/2 (where Na is a number of picture elements of the skin-colored portion obtained by the process of the above-described steps S105 and S115, and Nb is a number of picture elements whose luminance signal level is equal to or higher than 65IRE) is calculated, and whether a result thereof is larger or smaller than 0 is determined.

This determination is made to set an average luminance signal level of the skin-colored portion to 65IRE by examining whether or not the number Nb of picture elements whose luminance signal level is higher than 65IRE and that of picture elements whose luminance signal level is lower than 65IRE are the same among the picture elements whose number is represented by Na, and according to a result of the comparison of the above expression with 0, gains of the AGC circuits 105, 106 and 107 are increased or decreased by a predetermined unit level. When a result of the above expression Nb−Na/2 is larger than 0, the process proceeds to step S125, where the gains of the AGC circuits 105, 106 and 107 are decreased by the predetermined unit level, and thereafter, the process returns to step S100. When a result of the above expression is smaller than 0, the process proceeds to step S130, where the gains of the AGC circuits 105, 106 and 107 are increased by the predetermined unit level, and thereafter, the process returns to step S100. When a result of the above expression is 0, the flow is finished.

Figure 41A:
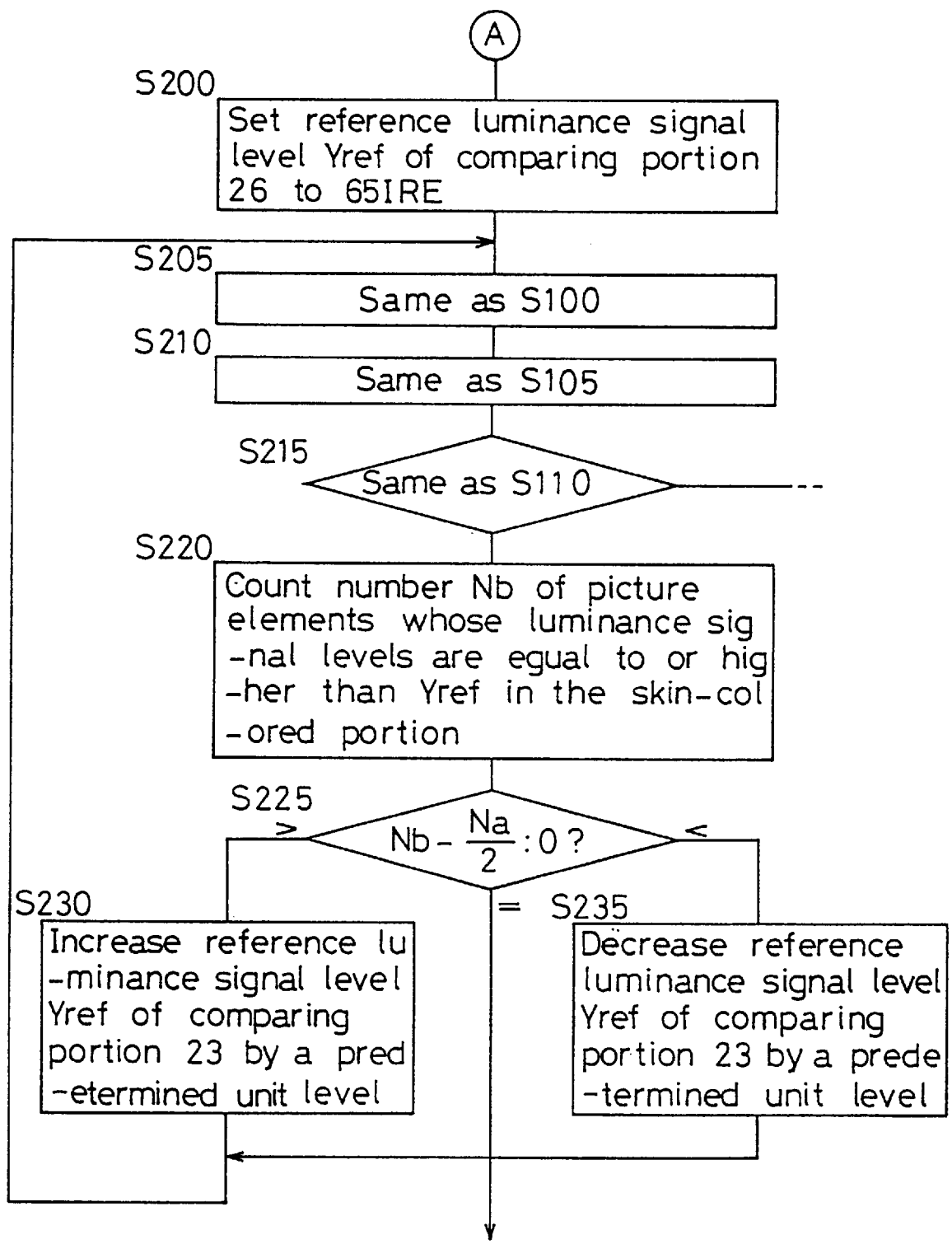
FIGS. 41A and 41B show a flow chart of an exposure control of another example of the embodiment in FIG. 34.
Figure 41B:
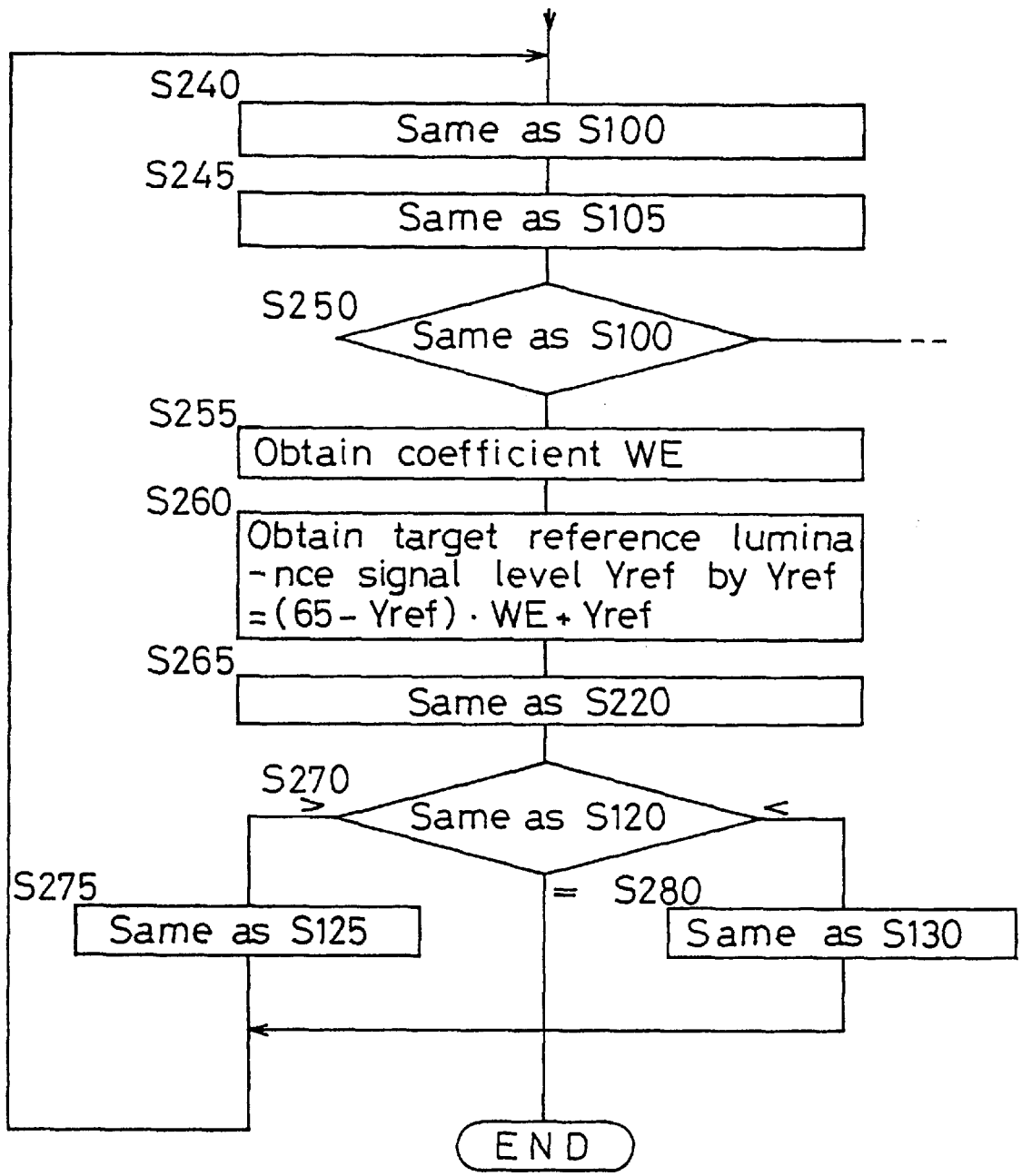

Next, another embodiment of exposure controlling method will be described with reference to FIGS. 41A and 41B. In the exposure controlling method shown in FIGS. 41A and 41B, when a main object is determined to be a person, an amount of the normal exposure control and that of the person automatic exposure control are weighted according to a relative ratio of the size of the person to the angle of view. As the proportion of the size of the person increases, an exposure control is continuously changed from the normal exposure control into the person automatic exposure control.

First, at step S200, an initial reference luminance signal level Yref of the comparing portion 126 is set to, for example, 65IRE. After the same processes as those at steps S100, S105 and S110 are executed at steps S205, S210 and S215, respectively, a number Nb of picture elements whose luminance signal levels are equal to or higher than Yref in the skin-colored portion is counted at step S220.

At the next step S225, Nb−Na/2 (where Na is a number of picture elements in the skin-colored portion and Nb is a number of picture elements whose luminance signal levels are equal to or higher than Yref) is obtained, and whether a result thereof is larger or smaller than 0 is determined. When Nb−Na/2>0, the process proceeds to step S230, where the reference luminance signal level is increased from Yref by a predetermined unit level, and when Nb−Na/2<0, the reference luminance signal level is decreased by a predetermined unit level at step S235. In both cases, the process returns to step S205. When Nb−Na/2=0, the process proceeds to step S240 in FIG. 41B. By the loop process up to step S240, an average luminance signal level Yref of the present skin-colored portion under the normal automatic exposure control is known.

In the succeeding process, a target value of the luminance signal level of the skin-colored portion is obtained. The target value is a composite value, of the luminance signal value Yref and 65IRE which is the reproduction luminance signal level of the skin-colored portion of a person, where the Yref and the reproduction luminance signal level are weighted according to the magnification $\beta$. First, after the same processes as those at the above-described steps S100, S105 and S110 are executed at steps S240, S245 and S250, the present magnification $\beta$ is obtained by the magnification calculating portion 113. Thereafter, a weight coefficient WE is determined according to the present magnification $\beta$. The weight coefficient WE is obtained with the magnification $\beta$ and the threshold constants $\beta 1$ and $\beta 2$ of the magnification, used in the process of step S20 of FIG. 54 by the following expression:

$$WE = (\beta - \beta 1)/(\beta 2 - \beta 1);$$

or $$WE = \{\beta^2 - (\beta 1)^2\}/\{(\beta 2)^2 - (\beta 1)^2\},$$

where WE=0 when β<β1 and WE=1 when β>β2. Thus, a range of the weight coefficient WE is 0≦WE≦1.

Then, at the next step S260, by use of the weight coefficient WE obtained at the above-described step S255, a composite value of the average luminance signal level Yref of the present skin-colored portion and 65IRE which is the reproduction luminance signal level of the skin-colored portion of a person, that is, the target reference luminance signal level is obtained by the following expression:

$$(65-Yref) \cdot WE + Yref.$$

A result thereof is set as a new value of Yref.

Thereafter, the same processes as those at the above-described steps S220, S120, S125 and S130 are executed at steps S265 to S280. When the process proceeds to steps S275 and S280, after executing the processes at those steps, the process returns to step S240.

As described above, according to the present invention, when a person is shot, an exposure control suitable for the shooting of a person can be performed, and when an object other than a person is shot, an exposure control suitable for the shooting thereof can be performed.

Moreover, when whether or not an object is a person is determined by comparing, by judging means, a configuration or area, on an imaging plane, of a chromaticity information obtained from the chromaticity information showing the skin color in an photographed image with a parameter showing the a person's face by use of the magnification β of a taking system, a chromaticity signal is produced which shows color information constant at any exposure levels and based on the chromaticity signal, the skin-colored portion is detected, whereby color detection accuracy improves. Consequently, an exposure control with a higher accuracy is realized.

Further, by setting a person parameter and comparing it with a skin-colored portion imaged by using the magnification β, a simple, highly accurate person detection can be performed.

The above is a description of a case where the invention is employed for a video camera. Some features of the embodiments may be employed for a videocassette recording/reproducing apparatus, a videocassette apparatus for recording which has only a recording function and a videocassette apparatus for reproducing which has only a reproducing function.

Obviously, many modifications and variations of the present invention are possible in light of the above teachings. It is therefore to be understood that within the scope of the appended claims, the invention may be practiced other than as specifically described.

We claim:

1. An image sensing device comprising:

an image sensing unit for sensing an image to generate a video signal;

a white balance correction unit for correcting the video signal according to a color temperature;

a selector unit for permitting a user to select one of a plurality of levels of color reproduction correction to be applied to the video signal corrected by the white balance correction unit;

a color reproduction correction unit for correcting colors which are reproduced based on said corrected video signal, including a lookup table which converts a part of the video signal into preset data stored therein, the color reproduction correction is performed by rewriting the lookup table in accordance with the level of color reproduction correction indicated by the selector unit; and a controller for controlling said color reproduction correction unit to change contents of color reproduction correction performed by said color reproduction correction unit, wherein said controller changes the contents of the color reproduction correction by rewriting said lookup table.

2. An image sensing device as claimed in claim 1, further comprising:

a color separation unit for separating the video signal generated by said image sensing unit into three signals for red, green, and blue colors, wherein said color reproduction correction unit adds together the signals for red, green, and blue colors to obtain a signal for white color and divides the signals for red and blue colors individually by the signal for white color to input resulting signals to said lookup table, and wherein said lookup table converts the signals inputted thereto into preset data stored therein.

3. A method of correcting only colors corresponding to skin color among colors which are reproduced based on a video signal obtained by sensing an image, comprising the steps of:

(1) separating said video signal into three color signals for red, green, and blue colors;

(2) adding together the signals for red, green, and blue colors to obtain a signal for white color;

(3) dividing the signals for red and blue colors individually by the signal for white color;

(4) converting the signals resulting from the division in step (3) into preset data;

(5) multiplying signals resulting from the conversion in step (4) individually by the signal for white color;

(6) subtracting signals resulting from the multiplication in step (5) from the signal for white color; and (7) outputting signals resulting from the conversion in step (4) and a signal resulting from the subtraction in step (6) as corrected R, G, and B signals.

4. A method of performing color correction on a sensed image, comprising the steps of:

generating a video signal;

correcting the video signal according to a color temperature;

selecting one of a plurality of types of color correction to be performed on the video signal corrected according to the color temperature;

performing color correction on said corrected video signal according to a lookup table having preset data stored herein; and controlling said color correction by rewriting said lookup table, the color correction is performed by rewriting the preset data in the lookup table according to the selected type of color correction.

5. An image sensing device comprising:

an image sensing unit for sensing an image to generate a video signal;

a white balance correction unit for correcting the video signal according to a color temperature;

a selector unit for selecting a level of skin color correction, from a plurality of levels each representative of a different type of skin color, to be applied to the video signal corrected by the white balance correction unit;

a skin color correction unit for correcting colors corresponding to skin color among colors which are reproduced based on the video signal and rewriting preset data according to the level selected by the selector unit, said skin color correction unit generates a color signal corresponding to skin color from said corrected video signal, and converts the generated color signal into preset data stored therein; and a controller for controlling said skin color correction unit to change contents of skin color correction performed by said skin color correction unit, said controller changes the contents of the skin color correction by rewriting said preset data.

6. An image sensing device comprising:

an image sensing unit for sensing an image to generate a video signal;

a color reproduction correction unit for correcting colors which are reproduced based on the video signal including a lookup table;

a controller for controlling said color reproduction correction unit to change contents of color reproduction correction performed by said color reproduction correction unit; and a color separation unit for separating the video signal generated by said image sensing unit into three signals for red, green, and blue colors, wherein said color reproduction correction unit adds together the signals for red, green, and blue colors to obtain a signal for white color and divides the signals for red and blue colors individually by the signal for white color to input resulting signals to said lookup table, and wherein said lookup table converts the signals inputted thereto into preset data stored therein.

* * * * *